(12) United States Patent
Guo et al.

(10) Patent No.: US 10,009,158 B2
(45) Date of Patent: Jun. 26, 2018

(54) RESOURCE MAPPING AND RECEIVING METHODS AND DEVICES AND SIGNALLING NOTIFICATION AND ACQUISITION METHODS AND DEVICES

(71) Applicant: ZTE Corporation, Shenzhen (CN)

(72) Inventors: Senbao Guo, Shenzhen (CN); Yunfeng Sun, Shenzhen (CN); Bo Dai, Shenzhen (CN); Junfeng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 157 days.

(21) Appl. No.: 14/772,844

(22) PCT Filed: Dec. 31, 2013

(86) PCT No.: PCT/CN2013/091082
§ 371 (c)(1),
(2) Date: Sep. 4, 2015

(87) PCT Pub. No.: WO2014/134966
PCT Pub. Date: Sep. 12, 2014

(65) Prior Publication Data
US 2016/0013906 A1    Jan. 14, 2016

(30) Foreign Application Priority Data

Mar. 4, 2013 (CN) .......................... 2013 1 0068255

(51) Int. Cl.
*H04W 72/04* (2009.01)
*H04L 5/00* (2006.01)
(Continued)

(52) U.S. Cl.
CPC ........... *H04L 5/0048* (2013.01); *H04B 7/068* (2013.01); *H04B 7/0626* (2013.01);
(Continued)

(58) Field of Classification Search
CPC ..... H04B 7/0626; H04B 7/068; H04L 5/0048; H04L 5/0057; H04L 5/0073; H04L 72/04; H04W 24/10
See application file for complete search history.

(56) References Cited

U.S. PATENT DOCUMENTS

| 9,344,299 B2 * | 5/2016 | Seo ........................ H04L 5/0023 |
| 2011/0222588 A1 * | 9/2011 | Ko ........................ H04B 7/0689 |
| | | 375/135 |

(Continued)

FOREIGN PATENT DOCUMENTS

| CN | 102118340 A | 7/2011 |
| CN | 102300244 A | 12/2011 |
| CN | 102771069 A | 11/2012 |

OTHER PUBLICATIONS

International Search Report dated Mar. 6, 2014 re: Application No. PCT/CN2013/091082; citing: CN 102771069 A, CN 102118340 A and CN 102300244 A.

*Primary Examiner* — Mohamed Kamara
(74) *Attorney, Agent, or Firm* — Cantor Colburn LLP

(57) ABSTRACT

Provided are resource mapping and receiving methods and devices and signalling notification and acquisition methods and devices. The resource mapping method includes that: an evolved NodeB (eNB) maps a Channel State Information Reference Signal (CSI-RS) onto multiple resource elements in a manner of frequency division multiplexing and/or time division multiplexing and/or code division multiplexing; and/or the eNB maps an Interference Measure Resource (IMR) onto multiple resource elements in a manner of frequency division multiplexing and/or time division multiplexing. By the technical solution, the effects of improving measurement performance of a system, ensuring more accurate adaptive transmission and improving spectral efficiency of the system are further achieved.

44 Claims, 12 Drawing Sheets

(51) Int. Cl.
  *H04B 7/06*    (2006.01)
  *H04W 24/10*   (2009.01)
(52) U.S. Cl.
  CPC ........... *H04L 5/0073* (2013.01); *H04W 24/10* (2013.01); *H04L 5/0057* (2013.01)

(56) References Cited

U.S. PATENT DOCUMENTS

| | | | |
|---|---|---|---|
| 2012/0208547 A1* | 8/2012 | Geirhofer | H04B 7/0626 455/452.2 |
| 2012/0243500 A1* | 9/2012 | Chandrasekhar | H04W 72/02 370/330 |
| 2012/0307928 A1* | 12/2012 | Jia | H04B 7/0667 375/267 |
| 2013/0083681 A1* | 4/2013 | Ebrahimi Tazeh Mahalleh | H04L 5/0057 370/252 |
| 2013/0208604 A1* | 8/2013 | Lee | H04L 25/0226 370/252 |
| 2013/0242882 A1* | 9/2013 | Blankenship | H04W 72/042 370/329 |
| 2015/0289249 A1* | 10/2015 | Noh | H04J 11/0053 370/280 |

* cited by examiner

Available CSI-RS/IMR resource element pairs

RESOURCE MAPPING AND RECEIVING METHODS AND DEVICES AND SIGNALLING NOTIFICATION AND ACQUISITION METHODS AND DEVICES

TECHNICAL FIELD

The present disclosure relates to the field of communication, and in particular to resource mapping and receiving methods and devices and signalling notification and acquisition methods and devices.

BACKGROUND

In LTE Release 8/9 (R8/9) of a Long Term Evolution Advanced (LTE-Advanced) system, in order to measure quality of a channel and demodulate a received data symbol, a Common Reference Signal (CRS) is designed. User Equipment (UE) may measure the channel according to the CRS to determine to perform cell reselection and handover to a target cell. In addition, the quality of the channel may be measured in a connected state of the UE, and when the level of interference is relatively high, a connection may be disconnected at the physical layer through high-layer related radio link connection failure signalling. In LTE R10, in order to further increase an average spectrum utilization rate of a cell and an edge spectrum utilization rate of the cell as well as throughput of each UE, two reference signals are defined respectively: a Channel State Information Reference Signal (CSI-RS) and a Demodulation Reference Signal (DMRS). The CSI-RS is used for channel measurement, and by the measurement of the CSI-RS, a Precoding Matrix Indicator (PMI), a Channel Quality Indicator (COI) and a Rank Indicator (RI), which are required to be fed back to an evolved NodeB (eNB) by the UE, may be calculated. The DMRS may enable the UE to transparently receive downlink data without knowing a precoding weight applied at an eNB side, so that a load of a Physical Downlink Control Channel (PDCCH) may be reduced, and in addition, limitations of a codebook to the weight can be reduced. In addition, dynamic and transparent switching between Single User-Multiple Input Multiple Output (SU-MIMO) and Multiple User-Multiple Input Multiple Output (MU-MIMO) is supported by the DMRS, and DMRS-based interference estimation is supported, so that interference cancellation performance of a receiving side can be greatly improved.

In later R11, a New Carrier Type (NCT) is introduced. The introduced NCT mainly adopts an enhanced Physical Downlink Control Channel (ePDCCH) for the sending of a control channel, so that there is no compatible carrier control channel area as defined in R10. During original designing of a reference signal, the first four Orthogonal Frequency Division Multiplexing (OFDM) symbols are mainly considered to be used for a control channel area, and the first four OFDM symbols are unsuitable to carry various reference signals (except a CRS for demodulating a PDCCH). For DMRS enhancement, demodulation performance of a DMRS may be influenced by the limitations of a control channel during designing, but preliminary simulation shows that the performance of the DMRS is just slightly influenced, so that necessity in DMRS enhancement needs to be further researched. In a later discussion period of R11, in subjects under discussion about Coordinate Multiple Point Transmission (CoMP) and a heterogeneous network, it is necessary to provide more multiplexing factors for a CSI-RS to ensure orthogonality of the CSI-RS as much as possible under the deployment of special Transmission Points (TP) such as the heterogeneous network and a small cell. In addition, conventional CSI-RS resources are obviously insufficient due to the problems that a part of CSI-RS are required to be dedicated to interference measurement of Interference Measure Resources (IMR), and that different IMRs may be configured to different terminals and the like. Therefore, in discussion about evolution situations of gradual replacement of a compatible carrier with an NCT in early and later NCT periods, it is definitely necessary to design a CSI-RS pattern with a large multiplexing factor.

For the problem of a lack of a CSI-RS pattern with a large multiplexing factor in evolution situations of gradual replacement of a compatible carrier with an NCT and the like in a related technology, there is yet no effective solution.

SUMMARY

The embodiments of the present disclosure provide resource mapping and receiving methods and devices and signalling notification and acquisition methods and devices, so as to at least solve the problem.

According to one aspect of the embodiments of the present disclosure, a resource mapping method is provided, which includes that: an eNB maps a CSI-RS onto multiple resource elements in a manner of frequency division multiplexing and/or time division multiplexing and/or code division multiplexing; and/or the eNB maps an IMR onto multiple resource elements in a manner of frequency division multiplexing and/or time division multiplexing.

According to another aspect of the embodiments of the present disclosure, a resource receiving method is provided, which includes that: a terminal receives a CSI-RS, wherein the CSI-RS is mapped onto multiple resource elements by an eNB in a manner of frequency division multiplexing and/or time division multiplexing and/or code division multiplexing; and/or the terminal receives an IMR, wherein the IMR is mapped onto multiple resource elements by the eNB in a manner of frequency division multiplexing and/or time division multiplexing.

According to another aspect of the embodiments of the present disclosure, a resource mapping device is provided, which is located in an eNB and includes: a mapping component, configured to map a CSI-RS onto multiple resource elements in a manner of frequency division multiplexing and/or time division multiplexing and/or code division multiplexing, and/or map an IMR onto multiple resource elements in a manner of frequency division multiplexing and/or time division multiplexing.

According to another aspect of the embodiments of the present disclosure, a resource receiving device is provided, which is located in a terminal and includes: a receiving component, configured to receive a CSI-RS, wherein the CSI-RS is mapped onto multiple resource elements by an eNB in a manner of frequency division multiplexing and/or time division multiplexing and/or code division multiplexing, and/or receive an IMR, wherein the IMR is mapped onto multiple resource elements by the eNB in a manner of frequency division multiplexing and/or time division multiplexing.

According to another aspect of the embodiments of the present disclosure, a signalling notification method is provided, which includes that: an eNB notifies a time-domain location or frequency-domain location of a CSI-RS and/or an IMR to a terminal through high-layer signalling, and/or a Primary Synchronization Signal/Secondary Synchronization Signal (PSS/SSS) and/or a Physical Broadcast Channel (PBCH), wherein a pattern and a resource location of the CRI-RS are a pattern and a resource location of the CRI-RS adopted in the abovementioned resource mapping method.

According to another aspect of the embodiments of the present disclosure, a signalling acquisition method is provided, which includes that: a terminal acquires, through high-layer signalling, and/or a PSS/SSS and/or a PBCH, a time-domain location or frequency-domain location of a CSI-RS and/or an IMR sent by an eNB, wherein a pattern and a resource location of the CRI-RS are a pattern and a resource location of the CRI-RS adopted in the abovementioned resource receiving method; and the CSI-RS is used for executing one of the following measurement: channel measurement, Reference Signal Received Power (RSRP) measurement, Reference Signal Received Quality (RSRQ) measurement, Received Signal Strength Indicator (RSSI) measurement and Radio Link Management (RLM) measurement.

According to another aspect of the present disclosure, a signalling notification device is provided, which is located in an eNB and includes: a notification component, configured to notify a time-domain location or frequency-domain location of a CSI-RS and/or an IMR to a terminal through high-layer signalling, and/or a PSS/SSS and/or a PBCH, wherein a pattern and a resource location of the CRI-RS are a pattern and a resource location of the CRI-RS adopted in the abovementioned resource mapping method; and the CSI-RS is used for executing one of the following measurement: channel measurement, RSRP measurement, RSRQ measurement, RSSI measurement and RLM measurement.

According to another aspect of the embodiments of the present disclosure, a signalling acquisition method is provided, which is located in a terminal and includes: an acquisition component, configured to acquire, through high-layer signalling, and/or a PSS/SSS and/or a PBCH, a time-domain location or frequency-domain location of a CSI-RS and/or an IMR sent by an eNB, wherein a pattern and a resource location of the CRI-RS are a pattern and a resource location of the CRI-RS adopted in the abovementioned resource receiving method; and the CSI-RS is used for executing one of the following measurement: channel measurement, RSRP measurement, RSRQ measurement, RSSI measurement and RLM measurement.

According to the embodiments of the present disclosure, multiplexing of the CSI-RS and the IMR may be expanded, collision of the CSI-RS with another channel or signal such as a DMRS and an RCRS is avoided, accuracy of channel measurement, RSRP measurement, RSRQ measurement, RLM measurement and interference measurement is ensured, and the effects of improving measurement performance of a system, ensuring more accurate adaptive transmission and improving spectral efficiency of the system are further achieved.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings:

FIG. 5 is a diagram of a mapping pattern 1 of a normal Cyclic Prefix (CP) CSI-RS according to example embodiment 1 of the present disclosure;

FIG. 6 is a diagram of a mapping pattern 2 of a normal CP CSI-RS according to example embodiment 2 of the present disclosure;

FIG. 15 is a diagram of a mapping pattern 11 of a normal CP CSI-RS according to example embodiment 11 of the present disclosure;

FIG. 16 is a diagram of a mapping pattern 12 of a normal CP CSI-RS according to example embodiment 12 of the present disclosure;

DETAILED DESCRIPTION OF THE EMBODIMENTS

The present disclosure is described below with reference to the drawings and embodiments in detail. It is important to note that the embodiments in the present disclosure and characteristics in the embodiments can be combined under the condition of no conflicts.

First of all, for easy understanding, some concepts involved in the embodiments of the present disclosure are properly introduced. One resource element consists of two dimensions, i.e. the time domain and the frequency domain, wherein the time domain is the length of one OFDM symbol, and the frequency domain is the interval of one subcarrier. An OFDM symbol pair {x,y} consists of two OFDM symbols, wherein the index of one OFDM symbol is x, and the index of the other OFDM symbol is y, where x is more than or equal to 0 and less than y which is less than or equal to 13.

It is important to note that all OFDM symbol pairs and corresponding carriers described in the embodiments of the present disclosure form a set selectable for CSI-RS and/or IMR. When configuring one set of CSI-RS, an eNB may select, from the set, one OFDM symbol pair and its corresponding subcarriers. When receiving one set of CRI-RS, a terminal may further select, from the set according to configuration information of the eNB, one OFDM symbol pair and its corresponding subcarriers as the CSI-RS to be received.

Figure 1:
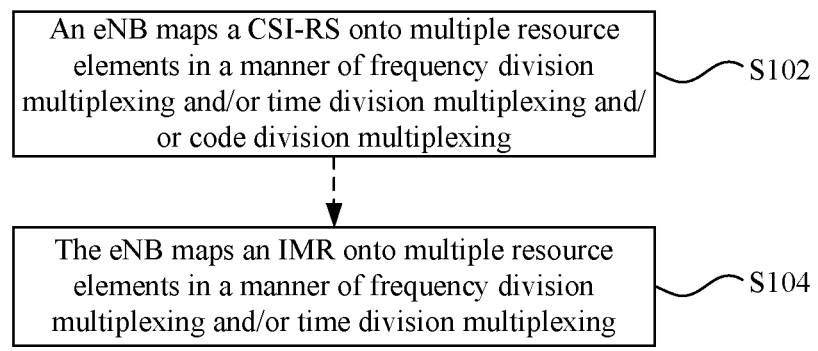
FIG. 1 is a flowchart of a resource mapping method according to an embodiment of the present disclosure.

FIG. 1 is a flowchart of a resource mapping method according to an embodiment of the present disclosure, and as shown in FIG. 1, the method mainly includes the following steps (Step 102 to Step 104):

Step 102: an eNB maps a CSI-RS onto multiple resource elements in a manner of frequency division multiplexing and/or time division multiplexing and/or code division multiplexing; and/or Step 104: the eNB maps an IMR onto multiple resource elements in a manner of frequency division multiplexing and/or time division multiplexing.

It is important to specially note here that Step 102 and Step 104 are not limited by any time sequence in their execution process, the two steps may be executed at the same time, or may also be executed with one after the other, or only one of the two steps may be executed. In FIG. 1, only the condition of executing Step 104 after the execution of Step 102 is provided.

In the embodiment, when the type of a CP of a sub-frame is a normal CP, the eNB maps the CSI-RS and/or the IMR on one of the following OFDM symbol pairs: {0,1}, {3,4}, {5,6}, {7,8}, {9,10} and {12,13}.

In the embodiment, the eNB maps the CSI-RS and/or the IMR onto one or two or four subcarriers in subcarriers {0,1,2,3,4,5,6,7,8,9,10,11} of the OFDM symbol pair {0,1}; or, the eNB maps the CSI-RS and/or the IMR onto one or two or four subcarriers in subcarriers {0,1,2,3,4,5,6,7,8,9,10,11} of the OFDM symbol pair {3,4}; or, the eNB maps the CSI-RS and/or the IMR onto one or two or four subcarriers in subcarriers {0,1,2,3,4,5,6,7,8,9,10,11} of the OFDM symbol pair {7,8}; or, the eNB maps the CSI-RS and/or the IMR onto one or two or four subcarriers in subcarriers {0,1,2,3,4,5,6,7,8,9,10,11} of the OFDM symbol pair {9,10}; or, the eNB maps the CSI-RS and/or the IMR onto one or two or four subcarriers in subcarriers {2,3,4,7,8,9} of the OFDM symbol pair {5,6}; or, the eNB maps the CSI-RS and/or the IMR onto one or two or four subcarriers in subcarriers {2,3,4,7,8,9} of the OFDM symbol pair {12,13}, wherein all the OFDM symbol pairs and all the subcarriers corresponding to the OFDM symbol pairs form a candidate resource set for mapping the CSI-RS by the eNB.

In the embodiment, the eNB maps the CSI-RS and/or the IMR onto one or two or four subcarriers in subcarriers {0,1,2,3,4,5,6,7,8,9,10,11} of the OFDM symbol pair {0,1}; or, the eNB maps the CSI-RS and/or the IMR onto one or two or four subcarriers in subcarriers {0,1,2,3,4,5,6,7,8,9,10,11} of the OFDM symbol pair {3,4}; or, the eNB maps the CSI-RS and/or the IMR onto one or two or four subcarriers in subcarriers {0,1,2,3,4,5,6,7,8,9,10,11} of the OFDM symbol pair {7,8}; or, the eNB maps the CSI-RS and/or the IMR onto one or two or four subcarriers in subcarriers {0,1,2,3,4,5,6,7,8,9,10,11} of the OFDM symbol pair {9,10}; or, the eNB maps the CSI-RS and/or the IMR onto one or two or four subcarriers in subcarriers {2,3,8,9} of the OFDM symbol pair {5,6}; or, the eNB maps the CSI-RS and/or the IMR onto one or two or four subcarriers in subcarriers {2,3,8,9} of the OFDM symbol pair {12,13}, wherein all the OFDM symbol pairs and all the subcarriers corresponding to the OFDM symbol pairs form a candidate resource set for mapping the CSI-RS by the eNB.

In the embodiment, when a type of a CP of a sub-frame is a normal CP, the eNB maps the CSI-RS and/or the IMR onto one of the following OFDM symbol pairs: {1,2}, {5,6}, {9,10} and {12,13}.

In the embodiment, the eNB maps the CSI-RS and/or the IMR onto one or two or four subcarriers in subcarriers {0,1,2,3,4,5,6,7,8,9,10,11} of the OFDM symbol pair {1,2}; or, the eNB maps the CSI-RS and/or the IMR onto one or two or four subcarriers in subcarriers {2,3,8,9} of the OFDM symbol pair {5,6}; or, the eNB maps the CSI-RS and/or the IMR onto one or two or four subcarriers in subcarriers {0,1,2,3,4,5,6,7,8,9,10,11} of the OFDM symbol pair {9,10}; or, the eNB maps the CSI-RS and/or the IMR onto one or two or four subcarriers in subcarriers {2,3,8,9} of the OFDM symbol pair {12,13}, wherein all the OFDM symbol pairs and all the subcarriers corresponding to the OFDM symbol pairs form a candidate resource set for mapping the CSI-RS by the eNB.

In the embodiment, the eNB maps the CSI-RS and/or the IMR onto one or two or four subcarriers in subcarriers {2,3,8,9} of the OFDM symbol pair {1,2}; or, the eNB maps the CSI-RS and/or the IMR onto one or two or four subcarriers in subcarriers {0,1,2,3,4,5,6,7,8,9,10,11} of the OFDM symbol pair {5,6}; or, the eNB maps the CSI-RS and/or the IMR onto one or two or four subcarriers in subcarriers {0,1,2,3,4,5,6,7,8,9,10,11} of the OFDM symbol pair {9,10}; or, the eNB maps the CSI-RS and/or the IMR onto one or two or four subcarriers in subcarriers {2,3,8,9} of the OFDM symbol pair {12,13}, wherein all the OFDM symbol pairs and all the subcarriers corresponding to the OFDM symbol pairs form a candidate resource set for mapping the CSI-RS by the eNB.

In the embodiment, when a type of a CP of a sub-frame is a normal CP, the eNB maps the CSI-RS and/or the IMR onto one of the following OFDM symbol pairs: {0,1}, {2,3}, {5,6}, {7,8}, {9,10} and {12,13}.

In the embodiment, the eNB maps the CSI-RS and/or the IMR onto one or two or four subcarriers in subcarriers {2,3,4,5,8,9,10,11} of the OFDM symbol pair {0,1}; or, the eNB maps the CSI-RS and/or the IMR onto one or two or four subcarriers in subcarriers {2,3,8,9} of the OFDM symbol pair {2,3}; or, the eNB maps the CSI-RS and/or the IMR onto one or two or four subcarriers in subcarriers {0,1,2,3,4,5,6,7,8,9,10,11} of the OFDM symbol pair {5,6};

or, the eNB maps the CSI-RS and/or the IMR onto one or two or four subcarriers in subcarriers {2,3,4,5,8,9,10,11} of the OFDM symbol pair {7,8}; or, the eNB maps the CSI-RS and/or the IMR onto one or two or four subcarriers in subcarriers {0,1,2,3,4,5,6,7,8,9,10,11} of the OFDM symbol pair {9,10}; or, the eNB maps the CSI-RS and/or the IMR onto one or two or four subcarriers in subcarriers {2,3,8,9} of the OFDM symbol pair {12,13}, wherein all the OFDM symbol pairs and all the subcarriers corresponding to the OFDM symbol pairs form a candidate resource set for mapping the CSI-RS by the eNB.

In the embodiment, the eNB maps the CSI-RS and/or the IMR onto one or two or four subcarriers in subcarriers {0,1,4,5,6,7,10,11} of the OFDM symbol pair {0,1}; or, the eNB maps the CSI-RS and/or the IMR onto one or two or four subcarriers in subcarriers {2,3,8,9} of the OFDM symbol pair {2,3}; or, the eNB maps the CSI-RS and/or the IMR onto one or two or four subcarriers in subcarriers {0,1,2,3,4,5,6,7,8,9,10,11} of the OFDM symbol pair {5,6}; or, the eNB maps the CSI-RS and/or the IMR onto one or two or four subcarriers in subcarriers {0,1,4,5,6,7,10,11} of the OFDM symbol pair {7,8}; or, the eNB maps the CSI-RS and/or the IMR onto one or two or four subcarriers in subcarriers {0,1,2,3,4,5,6,7,8,9,10,11} of the OFDM symbol pair {9,10}; or, the eNB maps the CSI-RS and/or the IMR onto one or two or four subcarriers in subcarriers {2,3,8,9} of the OFDM symbol pair {12,13}, wherein all the OFDM symbol pairs and all the subcarriers corresponding to the OFDM symbol pairs form a candidate resource set for mapping the CSI-RS by the eNB.

In the embodiment, the eNB maps the CSI-RS and/or the IMR onto one or two or four subcarriers in subcarriers {0,1,2,3,6,7,8,9} of the OFDM symbol pair {0,1}; or, the eNB maps the CSI-RS and/or the IMR onto one or two or four subcarriers in subcarriers {2,3,8,9} of the OFDM symbol pair {2,3}; or, the eNB maps the CSI-RS and/or the IMR onto one or two or four subcarriers in subcarriers {0,1,2,3,4,5,6,7,8,9,10,11} of the OFDM symbol pair {5,6}; or, the eNB maps the CSI-RS and/or the IMR onto one or two or four subcarriers in subcarriers {0,1,2,3,6,7,8,9} of the OFDM symbol pair {7,8}; or, the eNB maps the CSI-RS and/or the IMR onto one or two or four subcarriers in subcarriers {0,1,2,3,4,5,6,7,8,9,10,11} of the OFDM symbol pair {9,10}; or, the eNB maps the CSI-RS and/or the IMR onto one or two or four subcarriers in subcarriers {2,3,8,9} of the OFDM symbol pair {12,13}, wherein all the OFDM symbol pairs and all the subcarriers corresponding to the OFDM symbol pairs form a candidate resource set for mapping the CSI-RS by the eNB.

In the embodiment, when a type of a CP of a sub-frame is a normal CP, the eNB maps the CSI-RS and/or the IMR onto one of the following OFDM symbol pairs: {2,3}, {5,6}, {7,8}, {9,10} and {12,13}.

In the embodiment, the eNB maps the CSI-RS and/or the IMR onto one or two or four subcarriers in subcarriers {0,1,2,3,4,5,6,7,8,9,10,11} of the OFDM symbol pair {2,3}; or, the eNB maps the CSI-RS and/or the IMR onto one or two or four subcarriers in subcarriers {0,1,2,3,4,5,6,7,8,9,10,11} of the OFDM symbol pair {5,6}; or, the eNB maps the CSI-RS and/or the IMR onto one or two or four subcarriers in subcarriers {0,1,4,5,6,7,10,11} of the OFDM symbol pair {7,8}; or, the eNB maps the CSI-RS and/or the IMR onto one or two or four subcarriers in subcarriers {0,1,2,3,4,5,6,7,8,9,10,11} of the OFDM symbol pair {9,10}; or, the eNB maps the CSI-RS and/or the IMR onto one or two or four subcarriers in subcarriers {2,3,8,9} of the OFDM symbol pair {12,13}, wherein all the OFDM symbol pairs and all the subcarriers corresponding to the OFDM symbol pairs form a candidate resource set for mapping the CSI-RS by the eNB.

In the embodiment, when a type of a CP of a sub-frame is a normal CP, the eNB maps the CSI-RS and/or the IMR onto one of the following OFDM symbol pairs: {2,3}, {5,6}, {9,10} and {12,13}.

In the embodiment, the eNB maps the CSI-RS and/or the IMR onto one or two or four subcarriers in subcarriers {0,1,2,3,4,5,6,7,8,9,10,11} of the OFDM symbol pair {2,3}; or, the eNB maps the CSI-RS and/or the IMR onto one or two or four subcarriers in subcarriers {0,1,2,3,4,5,6,7,8,9,10,11} of the OFDM symbol pair {5,6}; or, the eNB maps the CSI-RS and/or the IMR onto one or two or four subcarriers in subcarriers {0,1,2,3,4,5,6,7,8,9,10,11} of the OFDM symbol pair {9,10}; or, the eNB maps the CSI-RS and/or the IMR onto one or two or four subcarriers in subcarriers {2,3,8,9} of the OFDM symbol pair {12,13}, wherein all the OFDM symbol pairs and all the subcarriers corresponding to the OFDM symbol pairs form a candidate resource set for mapping the CSI-RS by the eNB.

In the embodiment, the eNB maps the CSI-RS and/or the IMR onto one or two or four subcarriers in subcarriers {2,3,8,9} of the OFDM symbol pair {2,3}; or, the eNB maps the CSI-RS and/or the IMR onto one or two or four subcarriers in subcarriers {0,1,2,3,4,5,6,7,8,9,10,11} of the OFDM symbol pair {5,6}; or, the eNB maps the CSI-RS and/or the IMR onto one or two or four subcarriers in subcarriers {0,1,2,3,4,5,6,7,8,9,10,11} of the OFDM symbol pair {9,10}; or, the eNB maps the CSI-RS and/or the IMR onto one or two or four subcarriers in subcarriers {2,3,8,9} of the OFDM symbol pair {12,13}, wherein all the OFDM symbol pairs and all the subcarriers corresponding to the OFDM symbol pairs form a candidate resource set for mapping the CSI-RS by the eNB.

In the embodiment, when a type of a CP of a sub-frame is a normal CP, the eNB maps the CSI-RS and/or the IMR onto one of the following OFDM symbol pairs: {1,2}, {4,5}, {7,8}, {9,10} and {12,13}.

In the embodiment, the eNB maps the CSI-RS and/or the IMR onto one or two or four subcarriers in subcarriers {2,3,8,9} of the OFDM symbol pair {1,2}; or, the eNB maps the CSI-RS and/or the IMR onto one or two or four subcarriers in subcarriers {0,1,4,5,6,7,10,11} of the OFDM symbol pair {4,5}; or, the eNB maps the CSI-RS and/or the IMR onto one or two or four subcarriers in subcarriers {2,3,4,5,8,9,10,11} of the OFDM symbol pair {7,8}; or, the eNB maps the CSI-RS and/or the IMR onto one or two or four subcarriers in subcarriers {0,1,2,3,4,5,6,7,8,9,10,11} of the OFDM symbol pair {9,10}; or, the eNB maps the CSI-RS and/or the IMR onto one or two or four subcarriers in subcarriers {2,3,8,9} of the OFDM symbol pair {12,13}, wherein all the OFDM symbol pairs and all the subcarriers corresponding to the OFDM symbol pairs form a candidate resource set for mapping the CSI-RS by the eNB.

In the embodiment, one resource element pair on the same subcarriers of one OFDM symbol pair is able to bear one CSI-RS port or multiplex two CSI-RS ports in a manner of Orthogonal Covering Code (OCC) code division; when the number of borne CSI-RS ports is 1 or 2, the eNB selects one subcarrier from multiple optional subcarriers of one OFDM symbol pair to map the CSI-RS; when the number of the borne CSI-RS ports is 4, the eNB selects two subcarriers for bearing the CSI-RS from multiple optional subcarriers of one OFDM symbol pair in a manner as follows: one resource element pair on the Nth subcarrier of one OFDM symbol pair bears CSI-RS port {15,16}, and one resource element pair on the (N−6)th subcarrier of the OFDM symbol pair bears CSI-RS port {17,18}; and when the number of the borne ports is 8, the eNB selects four subcarriers for bearing the CSI-RS from multiple optional subcarriers of one OFDM symbol pair in a manner as follows: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}, wherein each resource element pair includes two resource elements, and N is a value within a range from 0 to 11.

In the embodiment, when a type of a CP of a sub-frame is an extended CP, the eNB maps the CSI-RS and/or the IMR onto one of the following OFDM symbol pairs: {1,2}, {4,5}, {7,8} and {10,11}.

In the embodiment, the eNB maps the CSI-RS and/or the IMR onto one or two or four subcarriers in subcarriers {0,1,2,3,4,5,6,7,8,9,10,11} of the OFDM symbol pair {1,2}; or, the eNB maps the CSI-RS and/or the IMR onto one or two or four subcarriers in subcarriers {0,2,3,5,6,8,9,11} of the OFDM symbol pair {4,5}; or, the eNB maps the CSI-RS and/or the IMR onto one or two or four subcarriers in subcarriers {0,1,2,3,4,5,6,7,8,9,10,11} of the OFDM symbol pair {7,8}; or, the eNB maps the CSI-RS and/or the IMR onto one or two or four subcarriers in subcarriers {0,1,3,4,6,7,9,10} of the OFDM symbol pair {10,11}, wherein all the OFDM symbol pairs and all the subcarriers corresponding to the OFDM symbol pairs form a candidate resource set for mapping the CSI-RS by the eNB.

In the embodiment, the eNB maps the CSI-RS and/or the IMR onto one or two or four subcarriers in subcarriers {0,2,3,5,6,8,9,11} of the OFDM symbol pair {1,2}; or, the eNB maps the CSI-RS and/or the IMR onto one or two or four subcarriers in subcarriers {0,1,2,3,4,5,6,7,8,9,10,11} of the OFDM symbol pair {4,5}; or, the eNB maps the CSI-RS and/or the IMR onto one or two or four subcarriers in subcarriers {0,1,2,3,4,5,6,7,8,9,10,11} of the OFDM symbol pair {7,8}; or, the eNB maps the CSI-RS and/or the IMR onto one or two or four subcarriers in subcarriers {0,1,3,4,6,7,9,10} of the OFDM symbol pair {10,11}, wherein all the OFDM symbol pairs and all the subcarriers corresponding to the OFDM symbol pairs form a candidate resource set for mapping the CSI-RS by the eNB.

In the embodiment, one resource element pair on one subcarrier in the same subcarriers of one OFDM symbol pair is able to bear one CSI-RS port or multiplex two CSI-RS ports in a manner of OCC code division; when the number of borne CSI-RS ports is 1 or 2, the eNB selects one subcarrier from multiple optional subcarriers of one OFDM symbol pair to map the CSI-RS; when the number of the borne CSI-RS ports is 4, the eNB selects two subcarriers for bearing the CSI-RS from multiple optional subcarriers of one OFDM symbol pair in a manner as follows: one resource element pair on the Nth subcarrier of one OFDM symbol pair bears CSI-RS port {15,16}, and one resource element pair on the (N−3)th subcarrier of the OFDM symbol pair bears CSI-RS port {17,18}; and when the number of the borne ports is 8, the eNB selects four subcarriers for bearing the CSI-RS from multiple optional subcarriers of one OFDM symbol pair in a manner as follows: one resource element pair on the Nth subcarrier of one OFDM symbol pair bears CSI-RS port {15,16}, one resource element pair on the (N−3)th subcarrier of the OFDM symbol pair bears CSI-RS port {17,18}, one resource element pair on the (N−6)th subcarrier of the OFDM symbol pair bears CSI-RS port {19,20}, and one resource element pair on the (N−9)th subcarrier of the OFDM symbol pair bears CSI-RS port {21,22}, wherein each resource element pair includes two resource elements, and N is a value within a range from 0 to 11.

In the embodiment, when a type of a CP of a sub-frame is a normal CP, the eNB maps the CSI-RS and/or the IMR onto one of the following OFDM symbol pairs: {1,3}, {5,6}, {7,8}, {9,10} and {12,13}.

In the embodiment, the eNB maps the CSI-RS and/or the IMR onto one or two or four subcarriers in subcarriers {2,3,8,9} of the OFDM symbol pair {1,3}; or, the eNB maps the CSI-RS and/or the IMR onto one or two or four subcarriers in subcarriers {0,1,2,3,4,5,6,7,8,9,10,11} of the OFDM symbol pair {5,6}; or, the eNB maps the CSI-RS and/or the IMR onto one or two or four subcarriers in subcarriers {2,3,4,5,8,9,10,11} of the OFDM symbol pair {7,8}; or, the eNB maps the CSI-RS and/or the IMR onto one or two or four subcarriers in subcarriers {0,1,2,3,4,5,6,7,8,9,10,11} of the OFDM symbol pair {9,10}; or, the eNB maps the CSI-RS and/or the IMR onto one or two or four subcarriers in subcarriers {2,3,8,9} of the OFDM symbol pair {12,13}, wherein all the OFDM symbol pairs and all the subcarriers corresponding to the OFDM symbol pairs form a candidate resource set for mapping the CSI-RS by the eNB.

In the embodiment, when a type of a CP of a sub-frame is a normal CP, the eNB maps the CSI-RS and/or the IMR onto one of the following OFDM symbol pairs: {1,3}, {5,6}, {8,9} and {12,13}.

In the embodiment, the eNB maps the CSI-RS and/or the IMR onto one or two or four subcarriers in subcarriers {2,3,8,9} of the OFDM symbol pair {1,3}; or, the eNB maps the CSI-RS and/or the IMR onto one or two or four subcarriers in subcarriers {0,1,2,3,4,5,6,7,8,9,10,11} of the OFDM symbol pair {5,6}; or, the eNB maps the CSI-RS and/or the IMR onto one or two or four subcarriers in subcarriers {0,1,2,3,4,5,6,7,8,9,10,11} of the OFDM symbol pair {8,9}; or, the eNB maps the CSI-RS and/or the IMR onto one or two or four subcarriers in subcarriers {2,3,8,9} of the OFDM symbol pair {12,13}, wherein all the OFDM symbol pairs and all the subcarriers corresponding to the OFDM symbol pairs form a candidate resource set for mapping the CSI-RS by the eNB.

In the embodiment, when a type of a CP of a sub-frame is a normal CP, the eNB maps the CSI-RS and/or the IMR onto one of the following OFDM symbol pairs: {1,3}, {5,6}, {8,9} and {10,12}.

In the embodiment, the eNB maps the CSI-RS and/or the IMR onto one or two or four subcarriers in subcarriers {2,3,8,9} of the OFDM symbol pair {1,3}; or, the eNB maps the CSI-RS and/or the IMR onto one or two or four subcarriers in subcarriers {0,1,2,3,4,5,6,7,8,9,10,11} of the OFDM symbol pair {5,6}; or, the eNB maps the CSI-RS and/or the IMR onto one or two or four subcarriers in subcarriers {0,1,2,3,4,5,6,7,8,9,10,11} of the OFDM symbol pair {8,9}; or, the eNB maps the CSI-RS and/or the IMR onto one or two or four subcarriers in subcarriers {2,3,8,9} of the OFDM symbol pair {10,12}, wherein all the OFDM symbol pairs and all the subcarriers corresponding to the OFDM symbol pairs form a candidate resource set for mapping the CSI-RS by the eNB.

Figure 2:
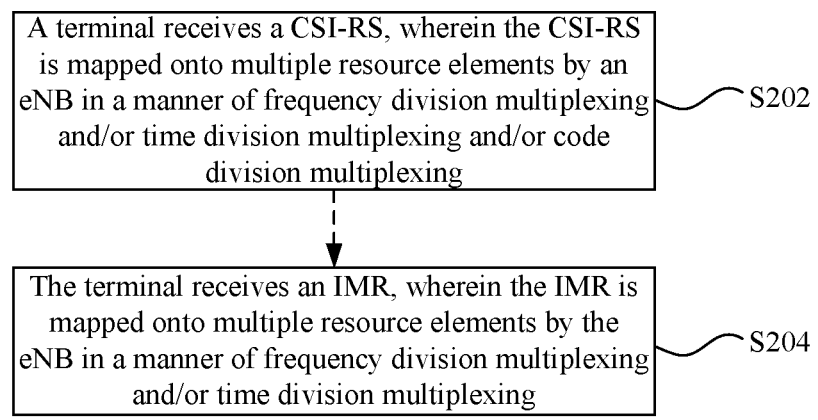
FIG. 2 is a flowchart of a resource receiving method according to an embodiment of the present disclosure.

FIG. 2 is a flowchart of a resource receiving method according to an embodiment of the present disclosure, and as shown in FIG. 2, the method mainly includes the following steps (Step 202 to Step 204):

Step 202: a terminal receives a CSI-RS, wherein the CSI-RS is mapped onto multiple resource elements by an eNB in a manner of frequency division multiplexing and/or time division multiplexing and/or code division multiplexing; and/or Step 204: the terminal receives an IMR, wherein the IMR is mapped onto multiple resource elements by the eNB in a manner of frequency division multiplexing and/or time division multiplexing.

It is important to specially note here that Step 202 and Step 204 are not limited by any time sequence in their execution process, for example, the two steps may be executed at the same time, or may also be executed with one after the other, or only one of the two steps may be executed. In FIG. 2, only the condition of executing Step 204 after the execution of Step 202 is provided.

In the embodiment, when the terminal detects that the type of a CP of a sub-frame is a normal CP, the terminal receives the CSI-RS and/or the IMR on one of the following OFDM symbol pairs: {0,1}, {3,4}, {5,6}, {7,8}, {9,10} and {12,13}.

In the embodiment, the terminal receives the CSI-RS and/or the IMR on one or two or four subcarriers in subcarriers {0,1,2,3,4,5,6,7,8,9,10,11} of the OFDM symbol pair {0,1}; or, the terminal receives the CSI-RS and/or the IMR on one or two or four subcarriers in subcarriers {0,1,2,3,4,5,6,7,8,9,10,11} of the OFDM symbol pair {3,4}; or, the terminal receives the CSI-RS and/or the IMR on one or two or four subcarriers in subcarriers {0,1,2,3,4,5,6,7,8,9,10,11} of the OFDM symbol pair {7,8}; or, the terminal receives the CSI-RS and/or the IMR on one or two or four subcarriers in subcarriers {0,1,2,3,4,5,6,7,8,9,10,11} of the OFDM symbol pair {9,10}; or, the terminal receives the CSI-RS and/or the IMR on one or two or four subcarriers in subcarriers {2,3,8,9} of the OFDM symbol pair {5,6}, wherein all the OFDM symbol pairs and all the subcarriers corresponding to the OFDM symbol pairs form a candidate resource set used for receiving the CSI-RS by the terminal.

In the embodiment, the terminal receives the CSI-RS and/or the IMR on one or two or four subcarriers in subcarriers {0,1,2,3,4,5,6,7,8,9,10,11} of the OFDM symbol pair {0,1}; or, the terminal receives the CSI-RS and/or the IMR on one or two or four subcarriers in subcarriers {0,1,2,3,4,5,6,7,8,9,10,11} of the OFDM symbol pair {3,4}; or, the terminal receives the CSI-RS and/or the IMR on one or two or four subcarriers in subcarriers {0,1,2,3,4,5,6,7,8,9,10,11} of the OFDM symbol pair {7,8}; or, the terminal receives the CSI-RS and/or the IMR on one or two or four subcarriers in subcarriers {0,1,2,3,4,5,6,7,8,9,10,11} of the OFDM symbol pair {9,10}; or, the terminal receives the CSI-RS and/or the IMR on one or two or four subcarriers in subcarriers {2,3,8,9} of the OFDM symbol pair {5,6}, wherein all the OFDM symbol pairs and all the subcarriers corresponding to the OFDM symbol pairs form a candidate resource set used for receiving the CSI-RS by the terminal.

In the embodiment, when the terminal detects that a type of a CP of a sub-frame is a normal CP, the terminal receives the CSI-RS and/or the IMR on one of the following OFDM symbol pairs: {1,2}, {5,6}, {9,10} and {12,13}.

In the embodiment, the terminal receives the CSI-RS and/or the IMR on one or two or four subcarriers in subcarriers {0,1,2,3,4,5,6,7,8,9,10,11} of the OFDM symbol pair {1,2}; or, the terminal receives the CSI-RS and/or the IMR on one or two or four subcarriers in subcarriers {2,3,8,9} of the OFDM symbol pair {5,6}; or, the terminal receives the CSI-RS and/or the IMR on one or two or four subcarriers in subcarriers {0,1,2,3,4,5,6,7,8,9,10,11} of the OFDM symbol pair {9,10}; or, the terminal receives the CSI-RS and/or the IMR on one or two or four subcarriers in subcarriers {2,3,8,9} of the OFDM symbol pair {12,13}, wherein all the OFDM symbol pairs and all the subcarriers corresponding to the OFDM symbol pairs form a candidate resource set used for receiving the CSI-RS by the terminal.

In the embodiment, the terminal receives the CSI-RS and/or the IMR on one or two or four subcarriers in subcarriers {2,3,8,9} of the OFDM symbol pair {1,2}; or, the terminal receives the CSI-RS and/or the IMR on one or two or four subcarriers in subcarriers {0,1,2,3,4,5,6,7,8,9,10,11} of the OFDM symbol pair {5,6}; or, the terminal receives the CSI-RS and/or the IMR on one or two or four subcarriers in subcarriers {0,1,2,3,4,5,6,7,8,9,10,11} of the OFDM symbol pair {9,10}; or, the terminal receives the CSI-RS and/or the IMR on one or two or four subcarriers in subcarriers {2,3,8,9} of the OFDM symbol pair {12,13}, wherein all the OFDM symbol pairs and all the subcarriers corresponding to the OFDM symbol pairs form a candidate resource set used for receiving the CSI-RS by the terminal.

In the embodiment, when the terminal detects that a type of a CP of a sub-frame is a normal CP, the terminal receives the CSI-RS and/or the IMR on one of the following OFDM symbol pairs: {0,1}, {2,3}, {5,6}, {7,8}, {9,10} and {12,13}.

In the embodiment, the terminal receives the CSI-RS and/or the IMR on one or two or four subcarriers in subcarriers {2,3,4,5,8,9,10,11} of the OFDM symbol pair {0,1}; or, the terminal receives the CSI-RS and/or the IMR on one or two or four subcarriers in subcarriers {2,3,8,9} of the OFDM symbol pair {2,3}; or, the terminal receives the CSI-RS and/or the IMR on one or two or four subcarriers in subcarriers {0,1,2,3,4,5,6,7,8,9,10,11} of the OFDM symbol pair {5,6}; or, the terminal receives the CSI-RS and/or the IMR on one or two or four subcarriers in subcarriers {2,3,4,5,8,9,10,11} of the OFDM symbol pair {7,8}; or, the terminal receives the CSI-RS and/or the IMR on one or two or four subcarriers in subcarriers {0,1,2,3,4,5,6,7,8,9,10,11} of the OFDM symbol pair {9,10}; or, the terminal receives the CSI-RS and/or the IMR on one or two or four subcarriers in subcarriers {2,3,8,9} of the OFDM symbol pair {12,13}, wherein all the OFDM symbol pairs and all the subcarriers corresponding to the OFDM symbol pairs form a candidate resource set used for receiving the CSI-RS by the terminal.

In the embodiment, the terminal receives the CSI-RS and/or the IMR on one or two or four subcarriers in subcarriers {0,1,4,5,6,7,10,11} of the OFDM symbol pair {0,1}; or, the terminal receives the CSI-RS and/or the IMR on one or two or four subcarriers in subcarriers {2,3,8,9} of the OFDM symbol pair {2,3}; or, the terminal receives the CSI-RS and/or the IMR on one or two or four subcarriers in subcarriers {0,1,2,3,4,5,6,7,8,9,10,11} of the OFDM symbol pair {5,6}; or, the terminal receives the CSI-RS and/or the IMR on one or two or four subcarriers in subcarriers {0,1,4,5,6,7,10,11} of the OFDM symbol pair {7,8}; or, the terminal receives the CSI-RS and/or the IMR on one or two or four subcarriers in subcarriers {0,1,2,3,4,5,6,7,8,9,10,11} of the OFDM symbol pair {9,10}; or, the terminal receives the CSI-RS and/or the IMR on one or two or four subcarriers in subcarriers {2,3,8,9} of the OFDM symbol pair {12,13}, wherein all the OFDM symbol pairs and all the subcarriers corresponding to the OFDM symbol pairs form a candidate resource set used for receiving the CSI-RS by the terminal.

In the embodiment, the terminal receives the CSI-RS and/or the IMR on one or two or four subcarriers in subcarriers {0,1,2,3,6,7,8,9} of the OFDM symbol pair {0,1}; or, the terminal receives the CSI-RS and/or the IMR on one or two or four subcarriers in subcarriers {2,3,8,9} of the OFDM symbol pair {2,3}; or, the terminal receives the CSI-RS and/or the IMR on one or two or four subcarriers in subcarriers {0,1,2,3,4,5,6,7,8,9,10,11} of the OFDM symbol pair {5,6}; or, the terminal receives the CSI-RS and/or the IMR on one or two or four subcarriers in subcarriers {0,1,2,3,6,7,8,9} of the OFDM symbol pair {7,8}; or, the terminal receives the CSI-RS and/or the IMR on one or two or four subcarriers in subcarriers {0,1,2,3,4,5,6,7,8,9,10,11} of the OFDM symbol pair {9,10}; or, the terminal receives the CSI-RS and/or the IMR on one or two or four subcarriers in subcarriers {2,3,8,9} of the OFDM symbol pair {12,13}, wherein all the OFDM symbol pairs and all the subcarriers corresponding to the OFDM symbol pairs form a candidate resource set used for receiving the CSI-RS by the terminal.

In the embodiment, when the terminal detects that a type of a CP of a sub-frame is a normal CP, the terminal receives the CSI-RS and/or the IMR on one of the following OFDM symbol pairs: {2,3}, {5,6}, {7,8}, {9,10} and {12,13}.

In the embodiment, the terminal receives the CSI-RS and/or the IMR on one or two or four subcarriers in subcarriers {0,1,2,3,4,5,6,7,8,9,10,11} of the OFDM symbol pair {2,3}; or, the terminal receives the CSI-RS and/or the IMR on one or two or four subcarriers in subcarriers {0,1,2,3,4,5,6,7,8,9,10,11} of the OFDM symbol pair {5,6}; or, the terminal receives the CSI-RS and/or the IMR on one or two or four subcarriers in subcarriers {0,1,4,5,6,7,10,11} of the OFDM symbol pair {7,8}; or, the terminal receives the CSI-RS and/or the IMR on one or two or four subcarriers in subcarriers {0,1,2,3,4,5,6,7,8,9,10,11} of the OFDM symbol pair {9,10}; or, the terminal receives the CSI-RS and/or the IMR on one or two or four subcarriers in subcarriers {2,3,8,9} of the OFDM symbol pair {12,13}, wherein all the OFDM symbol pairs and all the subcarriers corresponding to the OFDM symbol pairs form a candidate resource set used for receiving the CSI-RS by the terminal.

In the embodiment, when the terminal detects that a type of a CP of a sub-frame is a normal CP, the terminal receives the CSI-RS and/or the IMR on one of the following OFDM symbol pairs: {2,3}, {5,6}, {9,10} and {12,13}.

In the embodiment, the terminal receives the CSI-RS and/or the IMR on one or two or four subcarriers in subcarriers {0,1,2,3,4,5,6,7,8,9,10,11} of the OFDM symbol pair {2,3}; or, the terminal receives the CSI-RS and/or the IMR on one or two or four subcarriers in subcarriers {0,1,2,3,4,5,6,7,8,9,10,11} of the OFDM symbol pair {5,6}; or, the terminal receives the CSI-RS and/or the IMR on one or two or four subcarriers in subcarriers {0,1,2,3,4,5,6,7,8,9,10,11} of the OFDM symbol pair {9,10}; or, the terminal receives the CSI-RS and/or the IMR on one or two or four subcarriers in subcarriers {2,3,8,9} of the OFDM symbol pair {12,13}, wherein all the OFDM symbol pairs and all the subcarriers corresponding to the OFDM symbol pairs form a candidate resource set used for receiving the CSI-RS by the terminal.

In the embodiment, the terminal receives the CSI-RS and/or the IMR on one or two or four subcarriers in subcarriers {2,3,8,9} of the OFDM symbol pair {2,3}; or, the terminal receives the CSI-RS and/or the IMR on one or two or four subcarriers in subcarriers {0,1,2,3,4,5,6,7,8,9,10,11} of the OFDM symbol pair {5,6}; or, the terminal receives the CSI-RS and/or the IMR on one or two or four subcarriers in subcarriers {0,1,2,3,4,5,6,7,8,9,10,11} of the OFDM symbol pair {9,10}; or, the terminal receives the CSI-RS and/or the IMR on one or two or four subcarriers in subcarriers {2,3,8,9} of the OFDM symbol pair {12,13}, wherein all the OFDM symbol pairs and all the subcarriers corresponding to the OFDM symbol pairs form a candidate resource set used for receiving the CSI-RS by the terminal.

In the embodiment, when the terminal detects that a type of a CP of a sub-frame is a normal CP, the terminal receives the CSI-RS and/or the IMR on one of the following OFDM symbol pairs: {1,2}, {4,5}, {7,8}, {9,10} and {12,13}.

In the embodiment, the terminal receives the CSI-RS and/or the IMR on one or two or four subcarriers in subcarriers {2,3,8,9} of the OFDM symbol pair {1,2}; or, the terminal receives the CSI-RS and/or the IMR on one or two or four subcarriers in subcarriers {0,1,4,5,6,7,10,11} of the OFDM symbol pair {4,5}; or, the terminal receives the CSI-RS and/or the IMR on one or two or four subcarriers in subcarriers {2,3,4,5,8,9,10,11} of the OFDM symbol pair {7,8}; or, the terminal receives the CSI-RS and/or the IMR on one or two or four subcarriers in subcarriers {0,1,2,3,4,5,6,7,8,9,10,11} of the OFDM symbol pair {9,10}; or, the terminal receives the CSI-RS and/or the IMR on one or two or four subcarriers in subcarriers {2,3,8,9} of the OFDM symbol pair {12,13}, wherein all the OFDM symbol pairs and all the subcarriers corresponding to the OFDM symbol pairs form a candidate resource set used for receiving the CSI-RS by the terminal.

In the embodiment, one resource element pair on the same subcarriers of one OFDM symbol pair is able to bear one CSI-RS port or multiplex two CSI-RS ports in a manner of OCC code division; when the number of borne CSI-RS ports is 1 or 2, the terminal selects one subcarrier from multiple optional subcarriers of one OFDM symbol pair to receive the CSI-RS; when the number of the borne CSI-RS ports is 4, the terminal selects two subcarriers for receiving the CSI-RS from multiple optional subcarriers of one OFDM symbol pair in a manner as follows: one resource element pair on the Nth subcarrier of one OFDM symbol pair bears CSI-RS port {15,16}, and one resource element pair on the (N−6)th subcarrier of the OFDM symbol pair bears CSI-RS port {17,18}; and when the number of the borne ports is 8, the terminal selects four subcarriers for receiving the CSI-RS from multiple optional subcarriers of one OFDM symbol pair in a manner as follows: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}, wherein each resource element pair includes two resource elements, and N is a value within a range from 0 to 11.

In the embodiment, when the terminal detects that a type of a CP of a sub-frame is an extended CP, the terminal receives the CSI-RS and/or the IMR on one of the following OFDM symbol pairs: {1,2}, {4,5}, {7,8} and {10,11}.

In the embodiment, the terminal receives the CSI-RS and/or the IMR on one or two or four subcarriers in subcarriers {0,1,2,3,4,5,6,7,8,9,10,11} of the OFDM symbol pair {1,2}; or, the terminal receives the CSI-RS and/or the IMR on one or two or four subcarriers in subcarriers {0,2,3,5,6,8,9,11} of the OFDM symbol pair {4,5}; or, the terminal receives the CSI-RS and/or the IMR on one or two or four subcarriers in subcarriers {0,1,2,3,4,5,6,7,8,9,10,11} of the OFDM symbol pair {7,8}; or, the terminal receives the CSI-RS and/or the IMR on one or two or four subcarriers in subcarriers {0,1,3,4,6,7,9,10} of the OFDM symbol pair {10,11}, wherein all the OFDM symbol pairs and all the subcarriers corresponding to the OFDM symbol pairs form a candidate resource set used for receiving the CSI-RS by the terminal.

In the embodiment, the terminal receives the CSI-RS and/or the IMR on one or two or four subcarriers in subcarriers {0,2,3,5,6,8,9,11} of the OFDM symbol pair {1,2}; or, the terminal receives the CSI-RS and/or the IMR on one or two or four subcarriers in subcarriers {0,1,2,3,4,5,6,7,8,9,10,11} of the OFDM symbol pair {4,5}; or, the terminal receives the CSI-RS and/or the IMR on one or two or four subcarriers in subcarriers {0,1,2,3,4,5,6,7,8,9,10,11} of the OFDM symbol pair {7,8}; or, the terminal receives the CSI-RS and/or the IMR on one or two or four subcarriers in subcarriers {0,1,3,4,6,7,9,10} of the OFDM symbol pair {10,11}, wherein all the OFDM symbol pairs and all the subcarriers corresponding to the OFDM symbol pairs form a candidate resource set used for receiving the CSI-RS by the terminal.

In the embodiment, one resource element pair on one subcarrier in the same subcarriers of one OFDM symbol pair is able to bear one CSI-RS port or multiplex two CSI-RS ports in a manner of OCC code division; when the number of borne CSI-RS ports is 1 or 2, the terminal selects one subcarrier from multiple optional subcarriers of one OFDM symbol pair to receive the CSI-RS; when the number of the borne CSI-RS ports is 4, the terminal selects two subcarriers for receiving the CSI-RS from multiple optional subcarriers of one OFDM symbol pair in a manner as follows: one resource element pair on the Nth subcarrier of one OFDM symbol pair bears CSI-RS port {15,16}, and one resource element pair on the (N−3)th subcarrier of the OFDM symbol pair bears CSI-RS port {17,18}; and when the number of the borne ports is 8, the terminal selects four subcarriers for receiving the CSI-RS from multiple optional subcarriers of one OFDM symbol pair in a manner as follows: one resource element pair on the Nth subcarrier of one OFDM symbol pair bears CSI-RS port {15,16}, one resource element pair on the (N−3)th subcarrier of the OFDM symbol pair bears CSI-RS port {17,18}, one resource element pair on the (N−6)th subcarrier of the OFDM symbol pair bears CSI-RS port {19,20}, and one resource element pair on the (N−9)th subcarrier of the OFDM symbol pair bears CSI-RS port {21,22}, wherein each resource element pair includes two resource elements, and N is a value within a range from 0 to 11.

In the embodiment, when the terminal detects that a type of a CP of a sub-frame is a normal CP, the terminal receives the CSI-RS and/or the IMR on one of the following OFDM symbol pairs: {1,3}, {5,6}, {7,8}, {9,10} and {12,13}.

In the embodiment, the terminal receives the CSI-RS and/or the IMR on one or two or four subcarriers in subcarriers {2,3,8,9} of the OFDM symbol pair {1,3}; or, the terminal receives the CSI-RS and/or the IMR on one or two or four subcarriers in subcarriers {0,1,2,3,4,5,6,7,8,9,10,11} of the OFDM symbol pair {5,6}; or, the terminal receives the CSI-RS and/or the IMR on one or two or four subcarriers in subcarriers {2,3,4,5,8,9,10,11} of the OFDM symbol pair {7,8}; or, the terminal receives the CSI-RS and/or the IMR on one or two or four subcarriers in subcarriers {0,1,2,3,4,5,6,7,8,9,10,11} of the OFDM symbol pair {9,10}; or, the terminal receives the CSI-RS and/or the IMR on one or two or four subcarriers in subcarriers {2,3,8,9} of the OFDM symbol pair {12,13}, wherein all the OFDM symbol pairs and all the subcarriers corresponding to the OFDM symbol pairs form a candidate resource set used for receiving the CSI-RS by the terminal.

In the embodiment, when the terminal detects that a type of a CP of a sub-frame is a normal CP, the terminal receives the CSI-RS and/or the IMR on one of the following OFDM symbol pairs: {1,3}, {5,6}, {8,9} and {12,13}.

In the embodiment, the terminal receives the CSI-RS and/or the IMR on one or two or four subcarriers in subcarriers {2,3,8,9} of the OFDM symbol pair {1,3}; or, the terminal receives the CSI-RS and/or the IMR on one or two or four subcarriers in subcarriers {0,1,2,3,4,5,6,7,8,9,10,11} of the OFDM symbol pair {5,6}; or, the terminal receives the CSI-RS and/or the IMR on one or two or four subcarriers in subcarriers {0,1,2,3,4,5,6,7,8,9,10,11} of the OFDM symbol pair {8,9}; or, the terminal receives the CSI-RS and/or the IMR on one or two or four subcarriers in subcarriers {2,3,8,9} of the OFDM symbol pair {12,13}, wherein all the OFDM symbol pairs and all the subcarriers corresponding to the OFDM symbol pairs form a candidate resource set used for receiving the CSI-RS by the terminal.

In the embodiment, when the terminal detects that a type of a CP of a sub-frame is a normal CP, the terminal receives the CSI-RS and/or the IMR on one of the following OFDM symbol pairs: {1,3}, {5,6}, {8,9} and {10,12}.

In the embodiment, the terminal receives the CSI-RS and/or the IMR on one or two or four subcarriers in subcarriers {2,3,8,9} of the OFDM symbol pair {1,3}; or, the terminal receives the CSI-RS and/or the IMR on one or two or four subcarriers in subcarriers {0,1,2,3,4,5,6,7,8,9,10,11} of the OFDM symbol pair {5,6}; or, the terminal receives the CSI-RS and/or the IMR on one or two or four subcarriers in subcarriers {0,1,2,3,4,5,6,7,8,9,10,11} of the OFDM symbol pair {8,9}; or, the terminal receives the CSI-RS and/or the IMR on one or two or four subcarriers in subcarriers {2,3,8,9} of the OFDM symbol pair {10,12}, wherein all the OFDM symbol pairs and all the subcarriers corresponding to the OFDM symbol pairs form a candidate resource set used for receiving the CSI-RS by the terminal.

Figure 3:
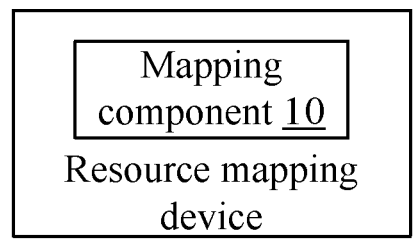
FIG. 3 is a structure diagram of a resource mapping device according to an embodiment of the present disclosure.

FIG. 3 is a structure diagram of a resource mapping device according to an embodiment of the present disclosure, the device is located in an eNB, and is configured to implement the resource mapping method provided by the abovementioned embodiment. As shown in FIG. 3, the device mainly includes: a mapping component 10, configured to map a CSI-RS onto multiple resource elements in a manner of frequency division multiplexing and/or time division multiplexing and/or code division multiplexing, and/or map an IMR onto multiple resource elements in a manner of frequency division multiplexing and/or time division multiplexing.

In the embodiment, when the type of a CP of a sub-frame is a normal CP, the mapping component 10 maps the CSI-RS and/or the IMR onto one of the following OFDM symbol pairs: {0,1}, {3,4}, {5,6}, {7,8}, {9,10} and {12,13}.

In the embodiment, when a type of a CP of a sub-frame is a normal CP, the mapping component 10 maps the CSI-RS and/or the IMR onto one of the following OFDM symbol pairs: {1,2}, {5,6}, {9,10} and {12,13}.

In the embodiment, when a type of a CP of a sub-frame is a normal CP, the mapping component 10 maps the CSI-RS and/or the IMR onto one of the following OFDM symbol pairs: {0,1}, {2,3}, {5,6}, {7,8}, {9,10} and {12,13}.

In the embodiment, when a type of a CP of a sub-frame is a normal CP, the mapping component 10 maps the CSI-RS and/or the IMR onto one of the following OFDM symbol pairs: {2,3}, {5,6}, {7,8}, {9,10} and {12,13}.

In the embodiment, when a type of a CP of a sub-frame is a normal CP, the mapping component 10 maps the CSI-RS and/or the IMR onto one of the following OFDM symbol pairs: {2,3}, {5,6}, {9,10} and {12,13}.

In the embodiment, when a type of a CP of a sub-frame is a normal CP, the mapping component 10 maps the CSI-RS and/or the IMR onto one of the following OFDM symbol pairs: {1,2}, {4,5}, {7,8}, {9,10} and {12,13}.

In the embodiment, when a type of a CP of a sub-frame is an extended CP, the mapping component 10 maps the CSI-RS and/or the IMR onto one of the following OFDM symbol pairs: {1,2}, {4,5}, {7,8} and {10,11}.

In the embodiment, when a type of a CP of a sub-frame is a normal CP, the mapping component 10 maps the CSI-RS and/or the IMR onto one of the following OFDM symbol pairs: {1,3}, {5,6}, {7,8}, {9,10} and {12,13}.

In the embodiment, when a type of a CP of a sub-frame is a normal CP, the mapping component 10 maps the CSI-RS and/or the IMR onto one of the following OFDM symbol pairs: {1,3}, {5,6}, {8,9} and {12,13}.

In the embodiment, when a type of a CP of a sub-frame is a normal CP, the mapping component 10 maps the CSI-RS and/or the IMR onto one of the following OFDM symbol pairs: {1,3}, {5,6}, {8,9} and {10,12}.

Figure 4:
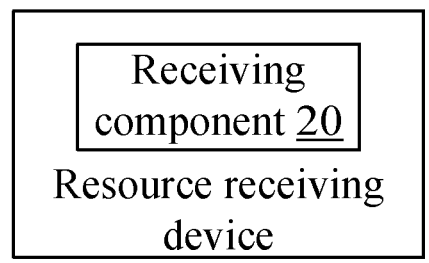
FIG. 4 is a structure diagram of a resource receiving device according to an embodiment of the present disclosure.

FIG. 4 is a structure diagram of a resource receiving device according to an embodiment of the present disclosure, the device is located in a terminal, and is configured to implement the resource receiving method provided by the abovementioned embodiment. As shown in FIG. 4, the device mainly includes: a receiving component 20, configured to receive a CSI-RS, wherein the CSI-RS is mapped onto multiple resource elements by an eNB in a manner of frequency division multiplexing and/or time division multiplexing and/or code division multiplexing, and/or receive an IMR, wherein the IMR is mapped onto multiple resource elements by the eNB in a manner of frequency division multiplexing and/or time division multiplexing.

In the embodiment, when the terminal detects that the type of a CP of a sub-frame is a normal CP, the receiving component 20 receives the CSI-RS and/or the IMR on one of the following OFDM symbol pairs: {0,1}, {3,4}, {5,6}, {7,8}, {9,10} and {12,13}.

In the embodiment, when the terminal detects that a type of a CP of a sub-frame is a normal CP, the receiving component 20 receives the CSI-RS and/or the IMR on one of the following OFDM symbol pairs: {1,2}, {5,6}, {9,10} and {12,13}.

In the embodiment, when the terminal detects that a type of a CP of a sub-frame is a normal CP, the receiving component 20 receives the CSI-RS and/or the IMR on one of the following OFDM symbol pairs: {0,1}, {2,3}, {5,6}, {7,8}, {9,10} and {12,13}.

In the embodiment, when the terminal detects that a type of a CP of a sub-frame is a normal CP, the receiving component 20 receives the CSI-RS and/or the IMR on one of the following OFDM symbol pairs: {2,3}, {5,6}, {7,8}, {9,10} and {12,13}.

In the embodiment, when the terminal detects that a type of a CP of a sub-frame is a normal CP, the receiving component 20 receives the CSI-RS and/or the IMR on one of the following OFDM symbol pairs: {2,3}, {5,6}, {9,10} and {12,13.}

In the embodiment, when the terminal detects that a type of a CP of a sub-frame is a normal CP, the receiving component 20 receives the CSI-RS and/or the IMR on one of the following OFDM symbol pairs: {1,2}, {4,5}, {7,8}, {9,10} and {12,13}.

In the embodiment, when the terminal detects that a type of a CP of a sub-frame is an extended CP, the receiving component 20 receives the CSI-RS and/or the IMR on one of the following OFDM symbol pairs: {1,2}, {4,5}, {7,8} and {10,11}.

In the embodiment, when the terminal detects that a type of a CP of a sub-frame is a normal CP, the receiving component 20 receives the CSI-RS and/or the IMR on one of the following OFDM symbol pairs: {1,3}, {5,6}, {7,8}, {9,10} and {12,13}.

In the embodiment, when the terminal detects that a type of a CP of a sub-frame is a normal CP, the receiving component 20 receives the CSI-RS and/or the IMR on one of the following OFDM symbol pairs: {1,3}, {5,6}, {8,9} and {12,13}.

In the embodiment, when the terminal detects that a type of a CP of a sub-frame is a normal CP, the receiving component 20 receives the CSI-RS and/or the IMR on one of the following OFDM symbol pairs: {1,3}, {5,6}, {8,9} and {10,12}.

The resource mapping method provided by the abovementioned embodiments and the resource receiving method provided by the abovementioned embodiments are further described below with reference to FIG. 5 to FIG. 18 and example embodiment 1 to example embodiment 13.

It is important to note that OFDM indexes in each of the following example embodiments are numbered as 0 to 13 according to sub-frames, and carrier serial numbers are 0 to 11 in one Physical Resource Block (PRB) pair. A CSI-RS mapping and/or receiving pattern in only one PRB pair is described in the example embodiments, while in a practical system, CSI-RS may be mapped onto each PRB pair in a full bandwidth or a part of the bandwidth by the same mapping method; alternatively, the CSI-RS may also be mapped onto a part of PRB pairs in the full bandwidth or a part of the bandwidth by the same mapping method, and the CSI-RS may be not mapped onto the other PRB pairs, wherein the eNB may notify locations of the part of PRB pairs, onto which the CSI-RS is mapped, to the terminal in a high-layer signalling notification and/or predetermined manner, and the terminal may obtain the locations of the part of PRB pairs in the high-layer signalling notification and/or predetermined manner. A set of OFDM symbols and a set of optional subcarriers corresponding to the OFDM symbols mentioned in the embodiments of the present disclosure include the locations which may be configured to send and receive the CSI-RS, and other unmentioned OFDM symbols and subcarriers may not be configured to send and receive the CSI-RS. For various patterns provided in the embodiments of the present disclosure, considerations should be given to avoid collisions with an RCRS, a CRS, a DMRS and a PSS/SSS as much as possible.

Example Embodiment 1

Figures 5, 6:
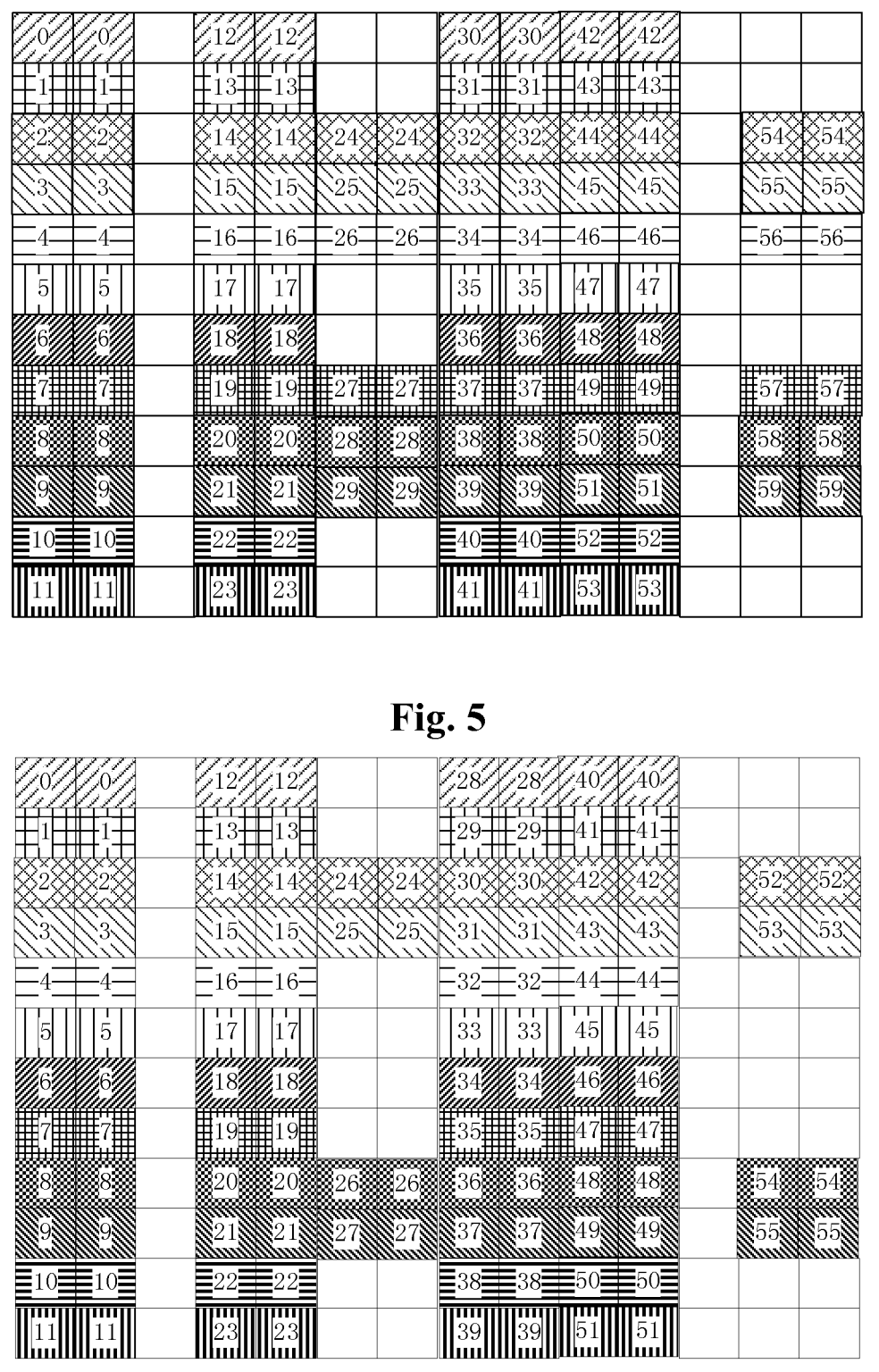

FIG. 5 is a diagram of a mapping pattern 1 of a normal CP CSI-RS according to example embodiment 1 of the present disclosure. FIG. 5 specifically shows a pattern of a group of pilots of the CSI-RS on one PRB pair in a CSI-RS sub-frame with a normal CP. An eNB sends the CSI-RS at a location bearing the CSI-RS, and a terminal receives and detects the CSI-RS at the location bearing the CSI-RS.

The eNB maps the CSI-RS and/or an IMR on at least one of the following OFDM symbol pairs, wherein the OFDM symbol pairs include: OFDM symbol pairs {0,1}, {3,4}, {5,6}, {7,8}, {9,10} and {12,13}.

The eNB maps one set of CSI-RS and/or IMR onto one or two or four subcarriers in subcarriers {0,1,2,3,4,5,6,7,8,9,10,11} of the OFDM symbol pair {0,1}.

Or, the eNB maps one set of CSI-RS and/or IMR onto one or two or four subcarriers in subcarriers {0,1,2,3,4,5,6,7,8,9,10,11} of the OFDM symbol pair {3,4}.

Or, the eNB maps one set of CSI-RS and/or IMR onto one or two or four subcarriers in subcarriers {0,1,2,3,4,5,6,7,8,9,10,11} of the OFDM symbol pair {7,8}.

Or, the eNB maps one set of CSI-RS and/or IMR onto one or two or four subcarriers in subcarriers {0,1,2,3,4,5,6,7,8,9,10,11} of the OFDM symbol pair {9,10}.

Or, the eNB maps one set of CSI-RS and/or IMR onto one or two or four subcarriers in subcarriers {2,3,4,7,8,9} of the OFDM symbol pair {5,6}.

Or, the eNB maps one set of CSI-RS and/or IMR onto one or two or four subcarriers in subcarriers {2,3,4,7,8,9} of the OFDM symbol pair {12,13}.

The terminal receives the CSI-RS and/or the IMR on at least one of the following OFDM symbol pairs, wherein the OFDM symbol pairs include: OFDM symbol pairs {0,1}, {3,4}, {5,6}, {7,8}, {9,10} and {12,13}.

The terminal receives the CSI-RS and/or the IMR on one or two or four subcarriers in subcarriers {0,1,2,3,4,5,6,7,8,9,10,11} of the OFDM symbol pair {0,1}.

Or, the terminal receives the CSI-RS and/or the IMR on one or two or four subcarriers in subcarriers {0,1,2,3,4,5,6,7,8,9,10,11} of the OFDM symbol pair {3,4}.

Or, the terminal receives the CSI-RS and/or the IMR on one or two or four subcarriers in subcarriers {0,1,2,3,4,5,6,7,8,9,10,11} of the OFDM symbol pair {7,8}.

Or, the terminal receives the CSI-RS and/or the IMR on one or two or four subcarriers in subcarriers {0,1,2,3,4,5,6,7,8,9,10,11} of the OFDM symbol pair {9,10}.

Or, the terminal receives the CSI-RS and/or the IMR on one or two or four subcarriers in subcarriers {2,3,4,7,8,9} of the OFDM symbol pair {5,6}.

Or, the terminal receives the CSI-RS and/or the IMR on one or two or four subcarriers in subcarriers {2,3,4,7,8,9} of the OFDM symbol pair {12,13}.

One resource element pair (two resource elements on the same subcarriers) on the same subcarriers of one OFDM symbol pair is able to bear one CSI-RS port or multiplex two CSI-RS ports in a manner of OCC code division. When the number of borne CSI-RS ports is 4, the CSI-RS occupies four resource elements on two same subcarriers of one OFDM symbol pair, one resource element pair on the Nth subcarrier of one OFDM symbol pair bears CSI-RS port {15,16}, and one resource element pair on the (N−6)th subcarrier of the OFDM symbol pair bears CSI-RS port {17,18}. When the number of the borne ports is 8, the CSI-RS occupies eight resource elements on four same subcarriers of one OFDM symbol pair, one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}.

Numbers in FIG. 5 represent indexes of resource element pairs for CSI-RS mapping and receiving, and the sum of a maximum identification index number and 1 is a maximum multiplexing factor of the pattern for two CSI-RS ports as well as the maximum number of the resource element pairs multiplexing the two CSI-RS ports in one sub-frame. A practical index sequence may be different from that shown in FIG. 5, and what is shown in the figure is not intended to limit the inventive idea of the embodiments of the present disclosure.

Example Embodiment 2

FIG. 6 is a diagram of a mapping pattern 2 of a normal CP CSI-RS according to example embodiment 2 of the present disclosure. FIG. 6 specifically shows a pattern of a group of pilots of the CSI-RS on one PRB pair in a CSI-RS sub-frame with a normal CP. An eNB sends the CSI-RS at a location bearing the CSI-RS, and a terminal receives and detects the CSI-RS at the location bearing the CSI-RS.

The eNB maps the CSI-RS and/or an IMR on at least one of the following OFDM symbol pairs, wherein the OFDM symbol pairs include: OFDM symbol pairs {0,1}, {3,4}, {5,6}, {7,8}, {9,10} and {12,13}.

The eNB maps one set of CSI-RS and/or IMR onto one or two or four subcarriers in subcarriers {0,1,2,3,4,5,6,7,8,9,10,11} of the OFDM symbol pair {0,1}.

Or, the eNB maps one set of CSI-RS and/or IMR onto one or two or four subcarriers in subcarriers {0,1,2,3,4,5,6,7,8,9,10,11} of the OFDM symbol pair {3,4}.

Or, the eNB maps one set of CSI-RS and/or IMR onto one or two or four subcarriers in subcarriers {0,1,2,3,4,5,6,7,8,9,10,11} of the OFDM symbol pair {7,8}.

Or, the eNB maps one set of CSI-RS and/or IMR onto one or two or four subcarriers in subcarriers {0,1,2,3,4,5,6,7,8,9,10,11} of the OFDM symbol pair {9,10}.

Or, the eNB maps one set of CSI-RS and/or IMR onto one or two or four subcarriers in subcarriers {2,3,8,9} of the OFDM symbol pair {5,6}.

Or, the eNB maps one set of CSI-RS and/or IMR onto one or two or four subcarriers in subcarriers {2,3,8,9} of the OFDM symbol pair {12,13}.

The terminal receives the CSI-RS and/or the IMR on at least one of the following OFDM symbol pairs, wherein the OFDM symbol pairs include: OFDM symbol pairs {0,1}, {3,4}, {5,6}, {7,8}, {9,10} and {12,13}.

The terminal receives the CSI-RS and/or the IMR on one or two or four subcarriers in subcarriers {0,1,2,3,4,5,6,7,8,9,10,11} of the OFDM symbol pair {0,1}.

Or, the terminal receives the CSI-RS and/or the IMR on one or two or four subcarriers in subcarriers {0,1,2,3,4,5,6,7,8,9,10,11} of the OFDM symbol pair {3,4}.

Or, the terminal receives the CSI-RS and/or the IMR on one or two or four subcarriers in subcarriers {0,1,2,3,4,5,6,7,8,9,10,11} of the OFDM symbol pair {7,8}.

Or,
the terminal receives the CSI-RS and/or the IMR on one or two or four subcarriers in subcarriers {0,1,2,3,4,5,6,7,8,9,10,11} of the OFDM symbol pair {9,10}.

Or,
the terminal receives the CSI-RS and/or the IMR on one or two or four subcarriers in subcarriers {2,3,8,9} of the OFDM symbol pair {5,6}.

Or,
the terminal receives the CSI-RS and/or the IMR on one or two or four subcarriers in subcarriers {2,3,8,9} of the OFDM symbol pair {12,13}.

One resource element pair (two resource elements) on the same subcarriers of one OFDM symbol pair is able to bear one CSI-RS port or multiplex two CSI-RS ports in a manner of OCC code division. When the number of borne CSI-RS ports is 4, the CSI-RS occupies four resource elements on two same subcarriers of one OFDM symbol pair, one resource element pair on the Nth subcarrier of one OFDM symbol pair bears CSI-RS port {15,16}, and one resource element pair on the (N−6)th subcarrier of the OFDM symbol pair bears CSI-RS port {17,18}. When the number of the borne ports is 8, the CSI-RS occupies eight resource elements on four same subcarriers of one OFDM symbol pair, one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}.

Numbers in FIG. 6 represent indexes of resource element pairs for CSI-RS mapping and receiving, and the sum of a maximum identification index number and 1 is a maximum multiplexing factor of the pattern for two CSI-RS ports as well as the maximum number of the resource element pairs multiplexing the two CSI-RS ports in one sub-frame. A practical index sequence may be different from that shown in FIG. 6, and what is shown in the figure is not intended to limit the inventive idea of the embodiments of the present disclosure.

Example Embodiment 3

Figure 7:
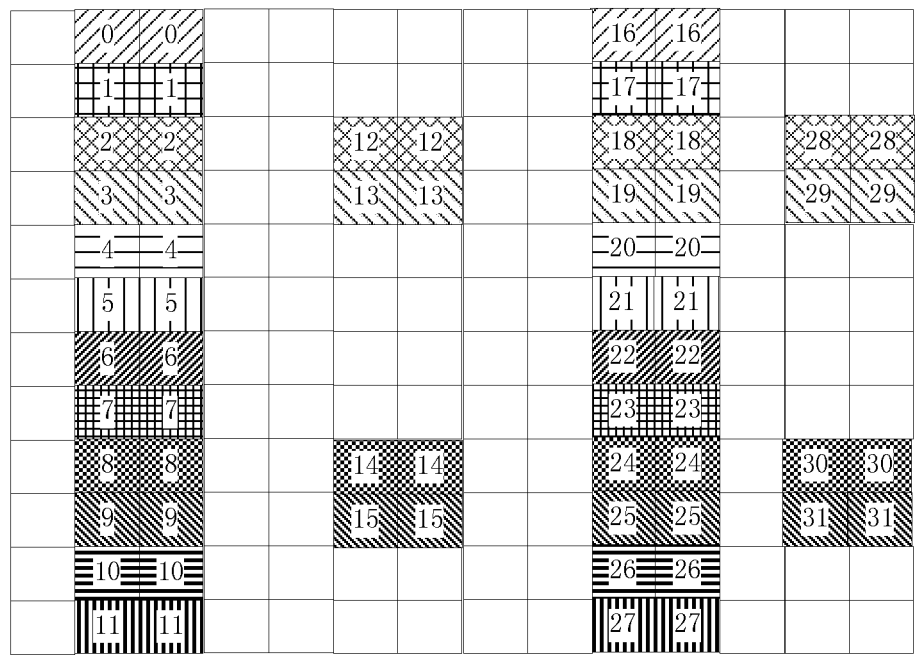
FIG. 7 is a diagram of a mapping pattern 3 of a normal CP CSI-RS according to example embodiment 3 of the present disclosure.

FIG. 7 is a diagram of a mapping pattern 3 of a normal CP CSI-RS according to example embodiment 3 of the present disclosure. FIG. 7 specifically shows a pattern of a group of pilots of the CSI-RS on one PRB pair in a CSI-RS sub-frame with a normal CP. An eNB sends the CSI-RS at a location bearing the CSI-RS, and a terminal receives and detects the CSI-RS at the location bearing the CSI-RS.

The eNB maps the CSI-RS and/or an IMR on the following OFDM symbol pairs, wherein the OFDM symbol pairs include: OFDM symbol pairs {1,2}, {5,6}, {9,10} and {12,13}.

The eNB maps one set of CSI-RS and/or IMR onto one or two or four subcarriers in subcarriers {0,1,2,3,4,5,6,7,8,9,10,11} of the OFDM symbol pair {1,2}.

The eNB maps one set of CSI-RS and/or IMR onto one or two or four subcarriers in subcarriers {2,3,8,9} of the OFDM symbol pair {5,6}.

The eNB maps one set of CSI-RS and/or IMR onto one or two or four subcarriers in subcarriers {0,1,2,3,4,5,6,7,8,9,10,11} of the OFDM symbol pair {9,10}.

The eNB maps one set of CSI-RS and/or IMR onto one or two or four subcarriers in subcarriers {2,3,8,9} of the OFDM symbol pair {12,13}.

The terminal receives the CSI-RS and/or the IMR on the following OFDM symbol pairs, wherein the OFDM symbol pairs include: OFDM symbol pairs {1,2}, {5,6}, {9,10} and {12,13}.

The terminal receives the CSI-RS and/or the IMR on one or two or four subcarriers in subcarriers {0,1,2,3,4,5,6,7,8,9,10,11} of the OFDM symbol pair {1,2}.

The terminal receives the CSI-RS and/or the IMR on one or two or four subcarriers in subcarriers {2,3,8,9} of the OFDM symbol pair {5,6}.

The terminal receives the CSI-RS and/or the IMR on one or two or four subcarriers in subcarriers {0,1,2,3,4,5,6,7,8,9,10,11} of the OFDM symbol pair {9,10}.

The terminal receives the CSI-RS and/or the IMR on one or two or four subcarriers in subcarriers {2,3,8,9} of the OFDM symbol pair {12,13}.

One resource element pair (two resource elements) on the same subcarriers of one OFDM symbol pair is able to bear one CSI-RS port or multiplex two CSI-RS ports in a manner of OCC code division. When the number of borne CSI-RS ports is 4, the CSI-RS occupies four resource elements on two same subcarriers of one OFDM symbol pair, one resource element pair on the Nth subcarrier of one OFDM symbol pair bears CSI-RS port {15,16}, and one resource element pair on the (N−6)th subcarrier of the OFDM symbol pair bears CSI-RS port {17,18}. When the number of the borne ports is 8, the CSI-RS occupies eight resource elements on four same subcarriers of one OFDM symbol pair, one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}.

Numbers in FIG. 7 represent indexes of resource element pairs for CSI-RS mapping and receiving, and the sum of a maximum identification index number and 1 is a maximum multiplexing factor of the pattern for two CSI-RS ports as well as the maximum number of the resource element pairs multiplexing the two CSI-RS ports in one sub-frame. A practical index sequence may be different from that shown in FIG. 7, and what is shown in the figure is not intended to limit the inventive idea of the embodiments of the present disclosure.

Example Embodiment 4

Figure 8:
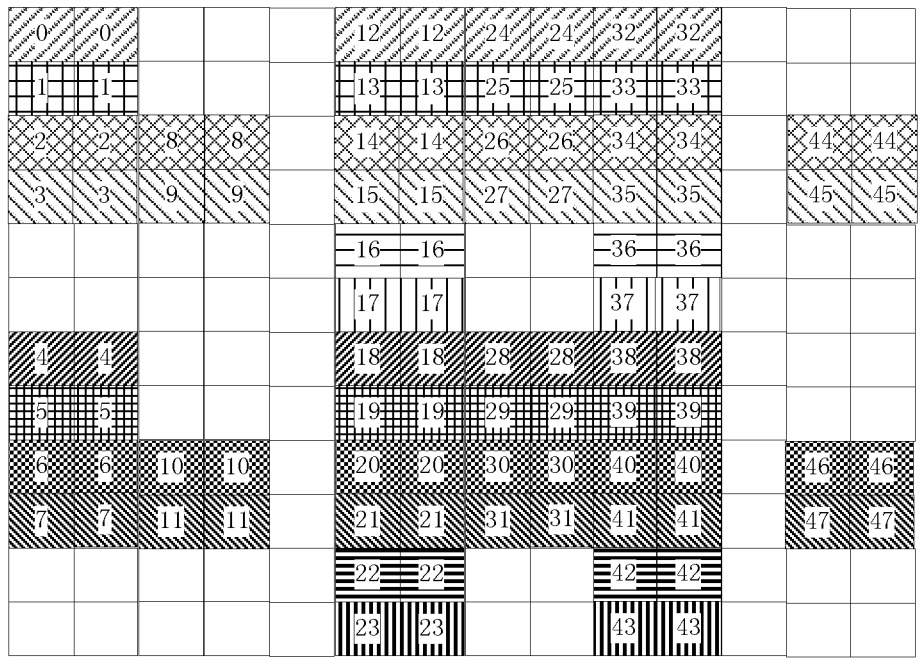
FIG. 8 is a diagram of a mapping pattern 4 of a normal CP CSI-RS according to example embodiment 4 of the present disclosure.

FIG. 8 is a diagram of a mapping pattern 4 of a normal CP CSI-RS according to example embodiment 4 of the present disclosure. FIG. 8 specifically shows a pattern of a group of pilots of the CSI-RS on one PRB pair in a CSI-RS sub-frame with a normal CP. An eNB sends the CSI-RS at a location bearing the CSI-RS, and a terminal receives and detects the CSI-RS at the location bearing the CSI-RS.

The eNB maps the CSI-RS and/or an IMR on the following OFDM symbol pairs, wherein the OFDM symbol pairs include: OFDM symbol pairs {0,1}, {2,3}, {5,6}, {7,8}, {9,10} and {12,13}.

The eNB maps the CSI-RS and/or the IMR onto one or two or four subcarriers in subcarriers {2,3,4,5,8,9,10,11} of the OFDM symbol pair {0,1}.

Or,
the eNB maps one set of CSI-RS and/or IMR onto one or two or four subcarriers in subcarriers {2,3,8,9} of the OFDM symbol pair {2,3}.

Or, the eNB maps one set of CSI-RS and/or IMR onto one or two or four subcarriers in subcarriers {0,1,2,3,4,5,6,7,8,9,10,11} of the OFDM symbol pair {5,6}.

Or, the eNB maps one set of CSI-RS and/or IMR onto one or two or four subcarriers in subcarriers {2,3,4,5,8,9,10,11} of the OFDM symbol pair {7,8}.

Or, the eNB maps one set of CSI-RS and/or IMR onto one or two or four subcarriers in subcarriers {0,1,2,3,4,5,6,7,8,9,10,11} of the OFDM symbol pair {9,10}.

Or, the eNB maps one set of CSI-RS and/or IMR onto one or two or four subcarriers in subcarriers {2,3,8,9} of the OFDM symbol pair {12,13}.

The terminal receives the CSI-RS and/or the IMR on the following OFDM symbol pairs, wherein the OFDM symbol pairs include: OFDM symbol pairs {0,1}, {2,3}, {5,6}, {7,8}, {9,10} and {12,13}.

The terminal receives the CSI-RS and/or the IMR on one or two or four subcarriers in subcarriers {2,3,4,5,8,9,10,11} of the OFDM symbol pair {0,1}.

Or, the terminal receives the CSI-RS and/or the IMR on one or two or four subcarriers in subcarriers {2,3,8,9} of the OFDM symbol pair {2,3}.

Or, the terminal receives the CSI-RS and/or the IMR on one or two or four subcarriers in subcarriers {0,1,2,3,4,5,6,7,8,9,10,11} of the OFDM symbol pair {5,6}.

Or, the terminal receives the CSI-RS and/or the IMR on one or two or four subcarriers in subcarriers {2,3,4,5,8,9,10,11} of the OFDM symbol pair {7,8}.

Or, the terminal receives the CSI-RS and/or the IMR on one or two or four subcarriers in subcarriers {0,1,2,3,4,5,6,7,8,9,10,11} of the OFDM symbol pair {9,10}.

Or, the terminal receives the CSI-RS and/or the IMR on one or two or four subcarriers in subcarriers {2,3,8,9} of the OFDM symbol pair {12,13}.

One resource element pair (two resource elements) on the same subcarriers of one OFDM symbol pair is able to bear one CSI-RS port or multiplex two CSI-RS ports in a manner of OCC code division. When the number of borne CSI-RS ports is 4, the CSI-RS occupies four resource elements on two same subcarriers of one OFDM symbol pair, one resource element pair on the Nth subcarrier of one OFDM symbol pair bears CSI-RS port {15,16}, and one resource element pair on the (N−6)th subcarrier of the OFDM symbol pair bears CSI-RS port {17,18}. When the number of the borne ports is 8, the CSI-RS occupies eight resource elements on four same subcarriers of one OFDM symbol pair, one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}.

Numbers in FIG. 8 represent indexes of resource element pairs for CSI-RS mapping and receiving, and the sum of a maximum identification index number and 1 is a maximum multiplexing factor of the pattern for two CSI-RS ports as well as the maximum number of the resource element pairs multiplexing the two CSI-RS ports in one sub-frame. A practical index sequence may be different from that shown in FIG. 8, and what is shown in the figure is not intended to limit the inventive idea of the embodiments of the present disclosure.

Example Embodiment 5

Figure 9:
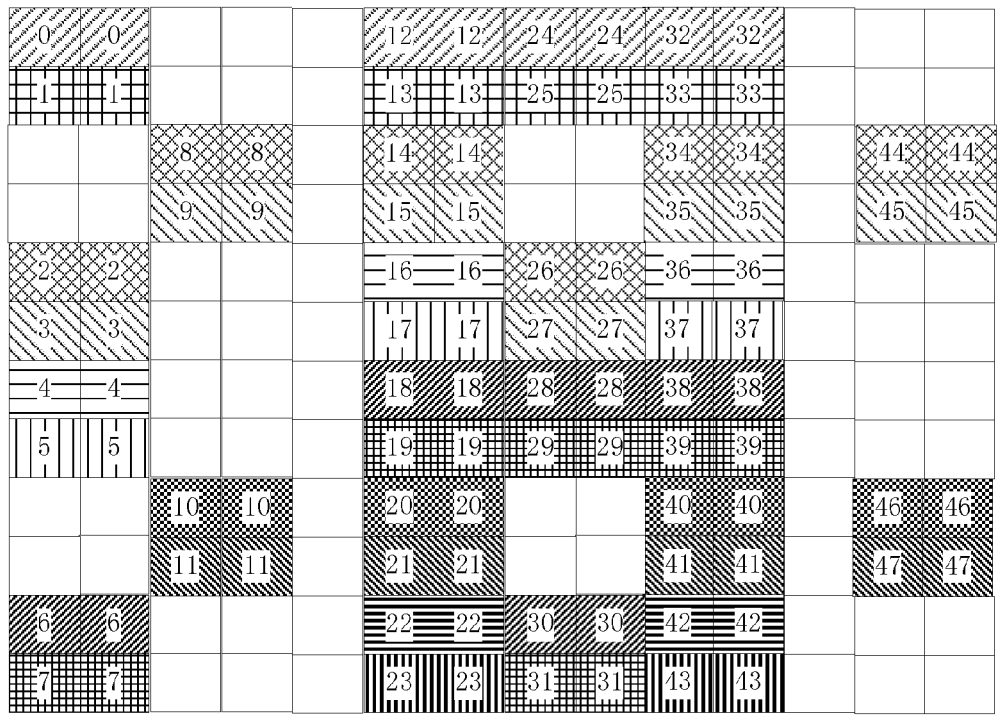
FIG. 9 is a diagram of a mapping pattern 5 of a normal CP CSI-RS according to example embodiment 5 of the present disclosure.

FIG. 9 is a diagram of a mapping pattern 5 of a normal CP CSI-RS according to example embodiment 5 of the present disclosure. FIG. 9 specifically shows a pattern of a group of pilots of the CSI-RS on one PRB pair in a CSI-RS sub-frame with a normal CP. An eNB sends the CSI-RS at a location bearing the CSI-RS, and a terminal receives and detects the CSI-RS at the location bearing the CSI-RS.

The eNB maps the CSI-RS and/or an IMR on the following OFDM symbol pairs, wherein the OFDM symbol pairs include: OFDM symbol pairs {0,1}, {2,3}, {5,6}, {7,8}, {9,10} and {12,13}.

The eNB maps the CSI-RS and/or the IMR onto one or two or four subcarriers in subcarriers {0,1,4,5,6,7,10,11} of the OFDM symbol pair {0,1}.

Or, the eNB maps one set of CSI-RS and/or IMR onto one or two or four subcarriers in subcarriers {2,3,8,9} of the OFDM symbol pair {2,3}.

Or, the eNB maps one set of CSI-RS and/or IMR onto one or two or four subcarriers in subcarriers {0,1,2,3,4,5,6,7,8,9,10,11} of the OFDM symbol pair {5, 6}.

Or, the eNB maps one set of CSI-RS and/or IMR onto one or two or four subcarriers in subcarriers {0,1,4,5,6,7,10,11} of the OFDM symbol pair {7,8}.

Or, the eNB maps one set of CSI-RS and/or IMR onto one or two or four subcarriers in subcarriers {0,1,2,3,4,5,6,7,8,9,10,11} of the OFDM symbol pair {9,10}.

Or, the eNB maps one set of CSI-RS and/or IMR onto one or two or four subcarriers in subcarriers {2,3,8,9} of the OFDM symbol pair {12,13}.

The terminal receives the CSI-RS and/or the IMR on the following OFDM symbol pairs, wherein the OFDM symbol pairs include: OFDM symbol pairs {0,1}, {2,3}, {5,6}, {7,8}, {9,10} and {12,13}.

The terminal receives the CSI-RS and/or the IMR on one or two or four subcarriers in subcarriers {0,1,4,5,6,7,10,11} of the OFDM symbol pair {0,1}.

Or, the terminal receives the CSI-RS and/or the IMR on one or two or four subcarriers in subcarriers {2,3,8,9} of the OFDM symbol pair {2,3}.

Or, the terminal receives the CSI-RS and/or the IMR on one or two or four subcarriers in subcarriers {0,1,2,3,4,5,6,7,8,9,10,11} of the OFDM symbol pair {5,6}.

Or, the terminal receives the CSI-RS and/or the IMR on one or two or four subcarriers in subcarriers {0,1,4,5,6,7,10,11} of the OFDM symbol pair {7,8}.

Or, the terminal receives the CSI-RS and/or the IMR on one or two or four subcarriers in subcarriers {0,1,2,3,4,5,6,7,8,9,10,11} of the OFDM symbol pair {9,10}.

Or, the terminal receives the CSI-RS and/or the IMR on one or two or four subcarriers in subcarriers {2,3,8,9} of the OFDM symbol pair {12,13}.

One resource element pair (two resource elements) on the same subcarriers of one OFDM symbol pair is able to bear one CSI-RS port or multiplex two CSI-RS ports in a manner of OCC code division. When the number of borne CSI-RS ports is 4, the CSI-RS occupies four resource elements on two same subcarriers of one OFDM symbol pair, one resource element pair on the Nth subcarrier of one OFDM symbol pair bears CSI-RS port {15,16}, and one resource element pair on the (N−6)th subcarrier of the OFDM symbol pair bears CSI-RS port {17,18}. When the number of the borne ports is 8, the CSI-RS occupies eight resource elements on four same subcarriers of one OFDM symbol pair, one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}.

Numbers in FIG. 9 represent indexes of resource element pairs for CSI-RS mapping and receiving, and the sum of a maximum identification index number and 1 is a maximum multiplexing factor of the pattern for two CSI-RS ports as well as the maximum number of the resource element pairs multiplexing the two CSI-RS ports in one sub-frame. A practical index sequence may be different from that shown in FIG. 9, and what is shown in the figure is not intended to limit the inventive idea of the embodiments of the present disclosure.

Example Embodiment 6

Figure 10:
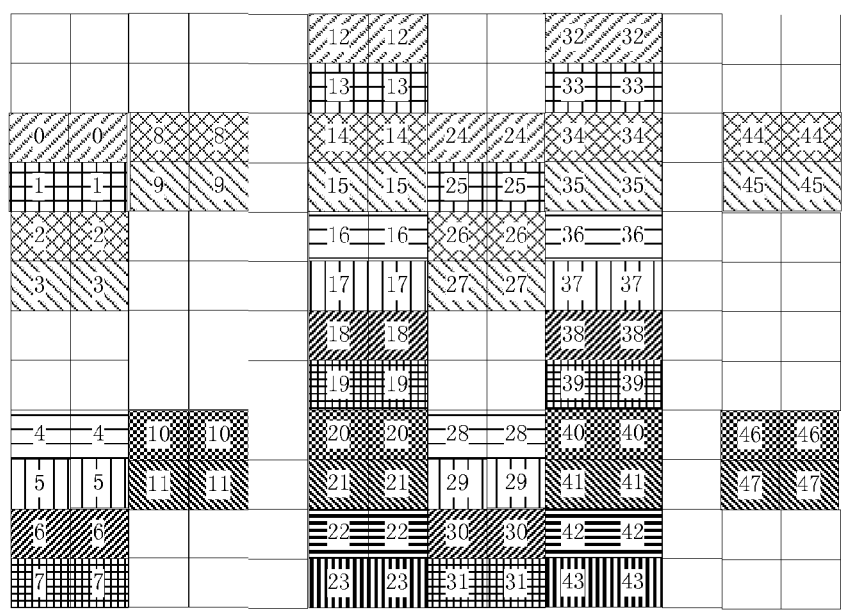
FIG. 10 is a diagram of a mapping pattern 6 of a normal CP CSI-RS according to example embodiment 6 of the present disclosure.

FIG. 10 is a diagram of a mapping pattern 6 of a normal CP CSI-RS according to example embodiment 6 of the present disclosure. FIG. 10 specifically shows a pattern of a group of pilots of the CSI-RS on one PRB pair in a CSI-RS sub-frame with a normal CP. An eNB sends the CSI-RS at a location bearing the CSI-RS, and a terminal receives and detects the CSI-RS at the location bearing the CSI-RS.

The eNB maps the CSI-RS and/or an IMR on the following OFDM symbol pairs, wherein the OFDM symbol pairs include: OFDM symbol pairs {0,1}, {2,3}, {5,6}, {7,8}, {9,10} and {12,13}.

The eNB maps the CSI-RS and/or the IMR onto one or two or four subcarriers in subcarriers {0,1,2,3,6,7,8,9} of the OFDM symbol pair {0,1}.

Or, the eNB maps one set of CSI-RS and/or IMR onto one or two or four subcarriers in subcarriers {2,3,8,9} of the OFDM symbol pair {2,3}.

Or, the eNB maps one set of CSI-RS and/or IMR onto one or two or four subcarriers in subcarriers {0,1,2,3,4,5,6,7,8,9,10,11} of the OFDM symbol pair {5,6}.

Or, the eNB maps one set of CSI-RS and/or IMR onto one or two or four subcarriers in subcarriers {0,1,2,3,6,7,8,9} of the OFDM symbol pair {7,8}.

Or, the eNB maps one set of CSI-RS and/or IMR onto one or two or four subcarriers in subcarriers {0,1,2,3,4,5,6,7,8,9,10,11} of the OFDM symbol pair {9,10}.

Or, the eNB maps one set of CSI-RS and/or IMR onto one or two or four subcarriers in subcarriers {2,3,8,9} of the OFDM symbol pair {12,13}.

The terminal receives the CSI-RS and/or the IMR on the following OFDM symbol pairs, wherein the OFDM symbol pairs include: OFDM symbol pairs {0,1}, {2,3}, {5,6}, {7,8}, {9,10} and {12,13}.

The terminal receives the CSI-RS and/or the IMR on one or two or four subcarriers in subcarriers {0,1,2,3,6,7,8,9} of the OFDM symbol pair {0,1}.

Or, the terminal receives the CSI-RS and/or the IMR on one or two or four subcarriers in subcarriers {2,3,8,9} of the OFDM symbol pair {2,3}.

Or, the terminal receives the CSI-RS and/or the IMR on one or two or four subcarriers in subcarriers {0,1,2,3,4,5,6,7,8,9,10,11} of the OFDM symbol pair {5,6}.

Or, the terminal receives the CSI-RS and/or the IMR on one or two or four subcarriers in subcarriers {0,1,2,3,6,7,8,9} of the OFDM symbol pair {7,8}.

Or, the terminal receives the CSI-RS and/or the IMR on one or two or four subcarriers in subcarriers {0,1,2,3,4,5,6,7,8,9,10,11} of the OFDM symbol pair {9,10}.

Or, the terminal receives the CSI-RS and/or the IMR on one or two or four subcarriers in subcarriers {2,3,8,9} of the OFDM symbol pair {12,13}.

One resource element pair (two resource elements) on the same subcarriers of one OFDM symbol pair is able to bear one CSI-RS port or multiplex two CSI-RS ports in a manner of OCC code division. When the number of borne CSI-RS ports is 4, the CSI-RS occupies four resource elements on two same subcarriers of one OFDM symbol pair, one resource element pair on the Nth subcarrier of one OFDM symbol pair bears CSI-RS port {15,16}, and one resource element pair on the (N−6)th subcarrier of the OFDM symbol pair bears CSI-RS port {17,18}. When the number of the borne ports is 8, the CSI-RS occupies eight resource elements on four same subcarriers of one OFDM symbol pair, one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}.

Numbers in FIG. 10 represent indexes of resource element pairs for CSI-RS mapping and receiving, and the sum of a maximum identification index number and 1 is a maximum multiplexing factor of the pattern for two CSI-RS ports as well as the maximum number of the resource element pairs multiplexing the two CSI-RS ports in one sub-frame. A practical index sequence may be different from that shown in FIG. 10, and what is shown in the figure is not intended to limit the inventive idea of the embodiments of the present disclosure.

Example Embodiment 7

Figure 11:
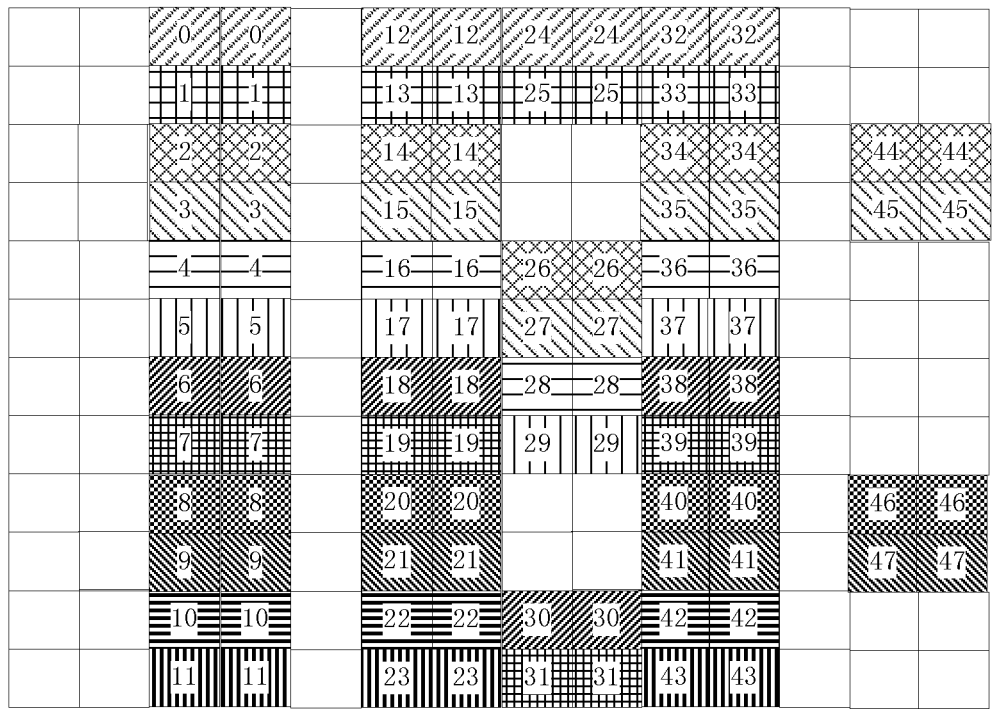
FIG. 11 is a diagram of a mapping pattern 7 of a normal CP CSI-RS according to example embodiment 7 of the present disclosure.

FIG. 11 is a diagram of a mapping pattern 7 of a normal CP CSI-RS according to example embodiment 7 of the present disclosure. FIG. 11 specifically shows a pattern of a group of pilots of the CSI-RS on one PRB pair in a CSI-RS sub-frame with a normal CP. An eNB sends the CSI-RS at a location bearing the CSI-RS, and a terminal receives and detects the CSI-RS at the location bearing the CSI-RS.

The eNB maps the CSI-RS and/or an IMR on the following OFDM symbol pairs, wherein the OFDM symbol pairs include: OFDM symbol pairs {2,3}, {5,6}, {7,8}, {9,10} and {12,13}.

The eNB maps the CSI-RS and/or the IMR onto one or two or four subcarriers in subcarriers {0,1,2,3,4,5,6,7,8,9,10,11} of the OFDM symbol pair {2,3}.

Or, the eNB maps one set of CSI-RS and/or IMR onto one or two or four subcarriers in subcarriers {0,1,2,3,4,5,6,7,8,9,10,11} of the OFDM symbol pair {5,6}.

Or, the eNB maps one set of CSI-RS and/or IMR onto one or two or four subcarriers in subcarriers {0,1,4,5,6,7,10,11} of the OFDM symbol pair {7,8}.

Or, the eNB maps one set of CSI-RS and/or IMR onto one or two or four subcarriers in subcarriers {0,1,2,3,4,5,6,7,8,9,10,11} of the OFDM symbol pair {9,10}.

Or, the eNB maps one set of CSI-RS and/or IMR onto one or two or four subcarriers in subcarriers {2,3,8,9} of the OFDM symbol pair {12,13}.

The terminal receives the CSI-RS and/or the IMR on the following OFDM symbol pairs, wherein the OFDM symbol pairs include: OFDM symbol pairs {2,3}, {5,6}, {7,8}, {9,10} and {12,13}. (Claim 25)

The terminal receives the CSI-RS and/or the IMR on one or two or four subcarriers in subcarriers {0,1,2,3,4,5,6,7,8,9,10,11} of the OFDM symbol pair {2,3}.

Or, the terminal receives the CSI-RS and/or the IMR on one or two or four subcarriers in subcarriers {0,1,2,3,4,5,6,7,8,9,10,11} of the OFDM symbol pair {5,6}.

Or, the terminal receives the CSI-RS and/or the IMR on one or two or four subcarriers in subcarriers {0,1,4,5,6,7,10,11} of the OFDM symbol pair {7,8}.

Or, the terminal receives the CSI-RS and/or the IMR on one or two or four subcarriers in subcarriers {0,1,2,3,4,5,6,7,8,9,10,11} of the OFDM symbol pair {9,10}.

Or, the terminal receives the CSI-RS and/or the IMR on one or two or four subcarriers in subcarriers {2,3,8,9} of the OFDM symbol pair {12,13}.

One resource element pair (two resource elements) on the same subcarriers of one OFDM symbol pair is able to bear one CSI-RS port or multiplex two CSI-RS ports in a manner of OCC code division. When the number of borne CSI-RS ports is 4, the CSI-RS occupies four resource elements on two same subcarriers of one OFDM symbol pair, one resource element pair on the Nth subcarrier of one OFDM symbol pair bears CSI-RS port {15,16}, and one resource element pair on the (N−6)th subcarrier of the OFDM symbol pair bears CSI-RS port {17,18}. When the number of the borne ports is 8, the CSI-RS occupies eight resource elements on four same subcarriers of one OFDM symbol pair, one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}.

Numbers in FIG. 11 represent indexes of resource element pairs for CSI-RS mapping and receiving, and the sum of a maximum identification index number and 1 is a maximum multiplexing factor of the pattern for two CSI-RS ports as well as the maximum number of the resource element pairs multiplexing the two CSI-RS ports in one sub-frame. A practical index sequence may be different from that shown in FIG. 11, and what is shown in the figure is not intended to limit the inventive idea of the embodiments of the present disclosure.

Example Embodiment 8

Figure 12:
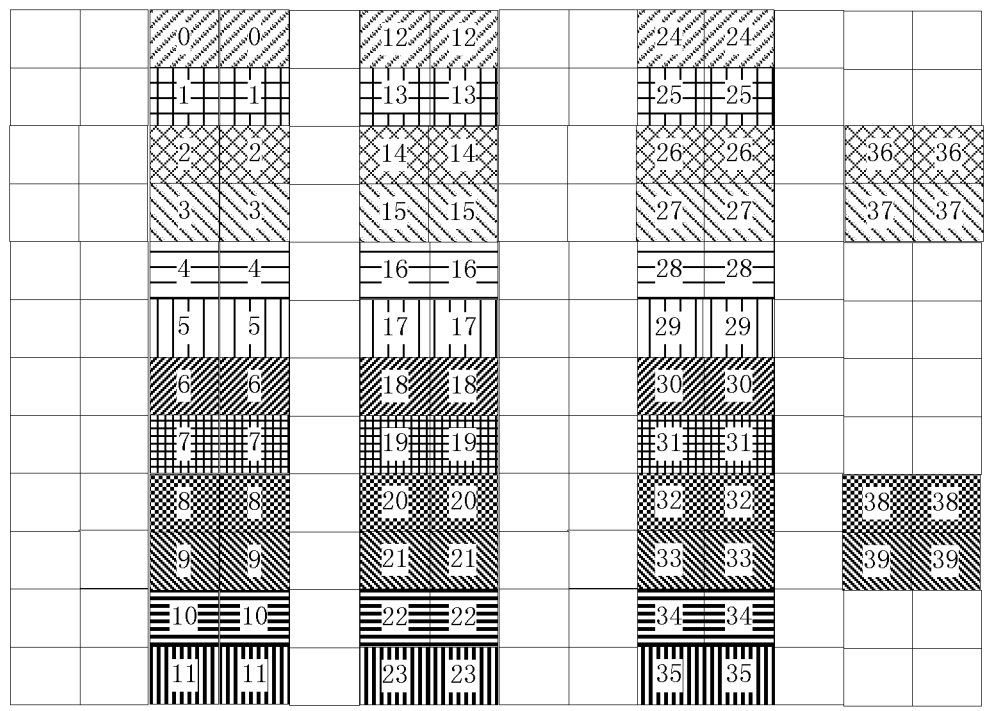
FIG. 12 is a diagram of a mapping pattern 8 of a normal CP CSI-RS according to example embodiment 8 of the present disclosure.

FIG. 12 is a diagram of a mapping pattern 8 of a normal CP CSI-RS according to example embodiment 8 of the present disclosure FIG. 12 specifically shows a pattern of a group of pilots of the CSI-RS on one PRB pair in a CSI-RS sub-frame with a normal CP. An eNB sends the CSI-RS at a location bearing the CSI-RS, and a terminal receives and detects the CSI-RS at the location bearing the CSI-RS.

The eNB maps the CSI-RS and/or an IMR on the following OFDM symbol pairs, wherein the OFDM symbol pairs include: OFDM symbol pairs {2,3}, {5,6}, {9,10} and {12,13}.

The eNB maps the CSI-RS and/or the IMR onto one or two or four subcarriers in subcarriers {0,1,2,3,4,5,6,7,8,9,10,11} of the OFDM symbol pair {2,3}.

Or, the eNB maps one set of CSI-RS and/or IMR onto one or two or four subcarriers in subcarriers {0,1,2,3,4,5,6,7,8,9,10,11} of the OFDM symbol pair {5,6}.

Or, the eNB maps one set of CSI-RS and/or IMR onto one or two or four subcarriers in subcarriers {0,1,2,3,4,5,6,7,8,9,10,11} of the OFDM symbol pair {9,10}.

Or, the eNB maps one set of CSI-RS and/or IMR onto one or two or four subcarriers in subcarriers {2,3,8,9} of the OFDM symbol pair {12,13}.

The terminal receives the CSI-RS and/or the IMR on the following OFDM symbol pairs, wherein the OFDM symbol pairs include: OFDM symbol pairs {2,3}, {5,6}, {9,10} and {12,13}.

The terminal receives the CSI-RS and/or the IMR on one or two or four subcarriers in subcarriers {0,1,2,3,4,5,6,7,8,9,10,11} of the OFDM symbol pair {2,3}.

Or, the terminal receives the CSI-RS and/or the IMR on one or two or four subcarriers in subcarriers {0,1,2,3,4,5,6,7,8,9,10,11} of the OFDM symbol pair {5,6}.

Or, the terminal receives the CSI-RS and/or the IMR on one or two or four subcarriers in subcarriers {0,1,2,3,4,5,6,7,8,9,10,11} of the OFDM symbol pair {9,10}.

Or, the terminal receives the CSI-RS and/or the IMR on one or two or four subcarriers in subcarriers {2,3,8,9} of the OFDM symbol pair {12,13}.

One resource element pair (two resource elements) on the same subcarriers of one OFDM symbol pair is able to bear one CSI-RS port or multiplex two CSI-RS ports in a manner of OCC code division. When the number of borne CSI-RS ports is 4, the CSI-RS occupies four resource elements on two same subcarriers of one OFDM symbol pair, one resource element pair on the Nth subcarrier of one OFDM symbol pair bears CSI-RS port {15,16}, and one resource element pair on the (N−6)th subcarrier of the OFDM symbol pair bears CSI-RS port {17,18}. When the number of the borne ports is 8, the CSI-RS occupies eight resource elements on four same subcarriers of one OFDM symbol pair, one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}.

Numbers in FIG. 12 represent indexes of resource element pairs for CSI-RS mapping and receiving, and the sum of a maximum identification index number and 1 is a maximum multiplexing factor of the pattern for two CSI-RS ports as well as the maximum number of the resource element pairs multiplexing the two CSI-RS ports in one sub-frame. A practical index sequence may be different from that shown in FIG. 12, and what is shown in the figure is not intended to limit the inventive idea of the embodiments of the present disclosure.

Example Embodiment 9

Figure 13:
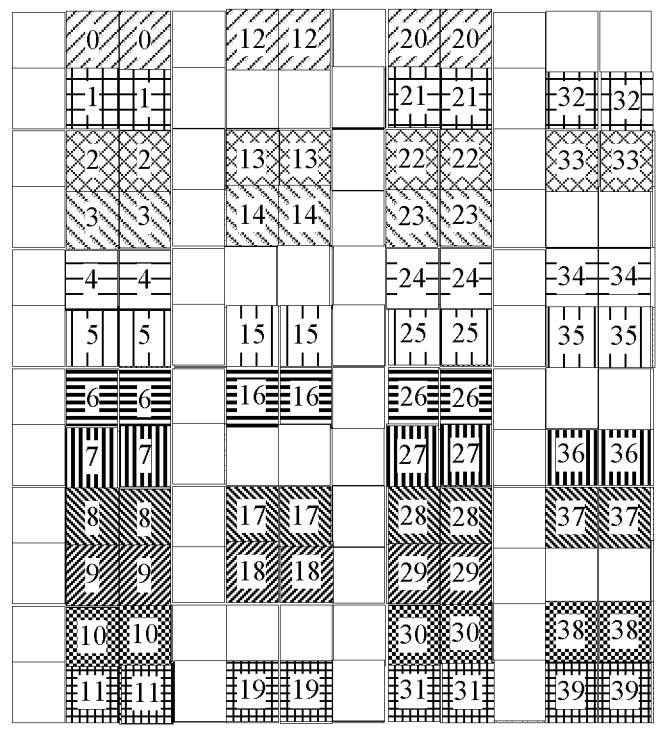
FIG. 13 is a diagram of a mapping pattern 9 of an extended CP CSI-RS according to example embodiment 9 of the present disclosure.

FIG. 13 is a diagram of a mapping pattern 9 of an extended CP CSI-RS according to example embodiment 9 of the present disclosure. FIG. 13 specifically shows a pattern of a group of pilots of the CSI-RS on one PRB pair in a CSI-RS sub-frame with an extended CP. An eNB sends the CSI-RS at a location bearing the CSI-RS, and a terminal receives and detects the CSI-RS at the location bearing the CSI-RS.

The eNB maps the CSI-RS and/or an IMR on the following OFDM symbol pairs, wherein the OFDM symbol pairs include: OFDM symbol pairs {1,2}, {4,5}, {7,8} and {10,11}.

The eNB maps the CSI-RS and/or the IMR onto one or two or four subcarriers in subcarriers {0,1,2,3,4,5,6,7,8,9,10,11} of the OFDM symbol pair {1,2}.

The eNB maps the CSI-RS and/or the IMR onto one or two or four subcarriers in subcarriers {0,2,3,5,6,8,9,11} of the OFDM symbol pair {4,5}.

The eNB maps the CSI-RS and/or the IMR onto one or two or four subcarriers in subcarriers {0,1,2,3,4,5,6,7,8,9,10,11} of the OFDM symbol pair {7,8}.

The eNB maps the CSI-RS and/or the IMR onto one or two or four subcarriers in subcarriers {0,1,3,4,6,7,9,10} of the OFDM symbol pair {10,11}.

The terminal receives the CSI-RS and/or the IMR on the following OFDM symbol pairs, wherein the OFDM symbol pairs include: OFDM symbol pairs {1,2}, {4,5}, {7,8} and {10,11}.

The terminal receives the CSI-RS and/or the IMR on one or two or four subcarriers in subcarriers {0,1,2,3,4,5,6,7,8,9,10,11} of the OFDM symbol pair {1,2}.

The terminal receives the CSI-RS and/or the IMR on one or two or four subcarriers in subcarriers {0,2,3,5,6,8,9,11} of the OFDM symbol pair {4,5}.

The terminal receives the CSI-RS and/or the IMR on one or two or four subcarriers in subcarriers {0,1,2,3,4,5,6,7,8,9,10,11} of the OFDM symbol pair {7,8}.

The terminal receives the CSI-RS and/or the IMR on one or two or four subcarriers in subcarriers {0,1,3,4,6,7,9,10} of the OFDM symbol pair {10,11}.

One resource element pair (two resource elements) on the same subcarriers of one OFDM symbol pair is able to bear one CSI-RS port or multiplex two CSI-RS ports in a manner of OCC code division. When the number of borne CSI-RS ports is 4, the CSI-RS occupies four resource elements on two same subcarriers of one OFDM symbol pair, one resource element pair on the Nth subcarrier of one OFDM symbol pair bears CSI-RS port {15,16}, and one resource element pair on the (N−3)th subcarrier of the OFDM symbol pair bears CSI-RS port {17,18}. When the number of the borne ports is 8, the CSI-RS occupies eight resource elements on four same subcarriers of one OFDM symbol pair, one resource element pair on the Nth subcarrier of one OFDM symbol pair bears CSI-RS port {15,16}, one resource element pair on the (N−3)th subcarrier of the OFDM symbol pair bears CSI-RS port {17,18}, one resource element pair on the (N−6)th subcarrier of the OFDM symbol pair bears CSI-RS port {19,20}, and one resource element pair on the (N−9)th subcarrier of the OFDM symbol pair bears CSI-RS port {21,22}.

Numbers in FIG. 13 represent indexes of resource element pairs for CSI-RS mapping and receiving, and the sum of a maximum identification index number and 1 is a maximum multiplexing factor of the pattern for two CSI-RS ports as well as the maximum number of the resource element pairs multiplexing the two CSI-RS ports in one sub-frame. A practical index sequence may be different from that shown in FIG. 13, and what is shown in the figure is not intended to limit the inventive idea of the embodiments of the present disclosure.

Example Embodiment 10

Figure 14:
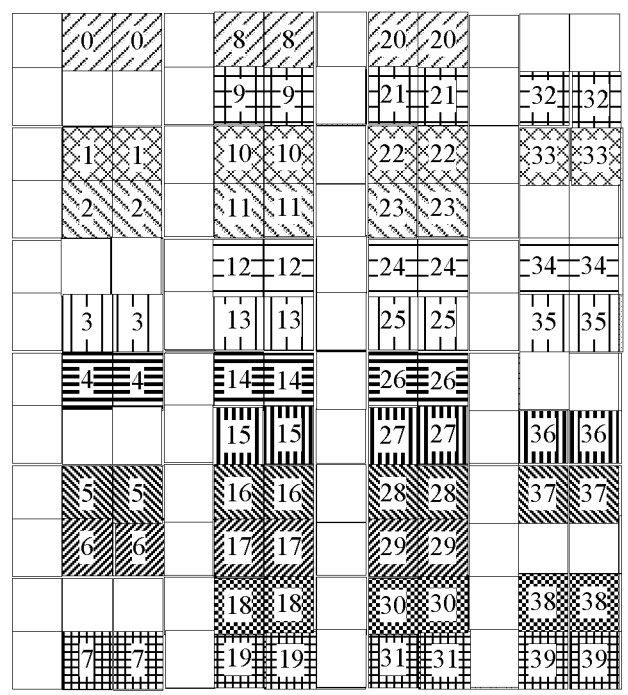
FIG. 14 is a diagram of a mapping pattern 10 of an extended CP CSI-RS according to example embodiment 10 of the present disclosure.

FIG. 14 is a diagram of a mapping pattern 10 of an extended CP CSI-RS according to example embodiment 10 of the present disclosure. FIG. 14 specifically shows a pattern of a group of pilots of the CSI-RS on one PRB pair in a CSI-RS sub-frame with an extended CP. An eNB sends the CSI-RS at a location bearing the CSI-RS, and a terminal receives and detects the CSI-RS at the location bearing the CSI-RS.

The eNB maps the CSI-RS and/or an IMR on the following OFDM symbol pairs, wherein the OFDM symbol pairs include: OFDM symbol pairs {1,2}, {4,5}, {7,8} and {10,11}.

The eNB maps the CSI-RS and/or the IMR onto one or two or four subcarriers in subcarriers {0,2,3,5,6,8,9,11} of the OFDM symbol pair {1,2}.

The eNB maps the CSI-RS and/or the IMR onto one or two or four subcarriers in subcarriers {0,1,2,3,4,5,6,7,8,9,10,11} of the OFDM symbol pair {4,5}.

The eNB maps the CSI-RS and/or the IMR onto one or two or four subcarriers in subcarriers {0,1,2,3,4,5,6,7,8,9,10,11} of the OFDM symbol pair {7,8}.

The eNB maps the CSI-RS and/or the IMR onto one or two or four subcarriers in subcarriers {0,1,3,4,6,7,9,10} of the OFDM symbol pair {10,11}.

The terminal receives the CSI-RS and/or the IMR on the following OFDM symbol pairs, wherein the OFDM symbol pairs include: OFDM symbol pairs {1,2}. {4,5}, {7,8} and {10,11}.

The terminal receives the CSI-RS and/or the IMR on one or two or four subcarriers in subcarriers {0,2,3,5,6,8,9,11} of the OFDM symbol pair {1,2}.

The terminal receives the CSI-RS and/or the IMR on one or two or four subcarriers in subcarriers {0,1,2,3,4,5,6,7,8,9,10,11} of the OFDM symbol pair {4,5}.

The terminal receives the CSI-RS and/or the IMR on one or two or four subcarriers in subcarriers {0,1,2,3,4,5,6,7,8,9,10,11} of the OFDM symbol pair {7,8}.

The terminal receives the CSI-RS and/or the IMR on one or two or four subcarriers in subcarriers {0,1,3,4,6,7,9,10} of the OFDM symbol pair {10,11}.

One resource element pair (two resource elements) on the same subcarriers of one OFDM symbol pair is able to bear one CSI-RS port or multiplex two CSI-RS ports in a manner of OCC code division. When the number of borne CSI-RS ports is 4, the CSI-RS occupies four resource elements on two same subcarriers of one OFDM symbol pair, one resource element pair on the Nth subcarrier of one OFDM symbol pair bears CSI-RS port {15,16}, and one resource element pair on the (N−3)th subcarrier of the OFDM symbol pair bears CSI-RS port {17,18}. When the number of the borne ports is 8, the CSI-RS occupies eight resource elements on four same subcarriers of one OFDM symbol pair, one resource element pair on the Nth subcarrier of one OFDM symbol pair bears CSI-RS port {15,16}, one resource element pair on the (N−3)th subcarrier of the OFDM symbol pair bears CSI-RS port {17,18}, one resource element pair on the (N−6)th subcarrier of the OFDM symbol pair bears CSI-RS port {19,20}, and one resource element pair on the (N−9)th subcarrier of the OFDM symbol pair bears CSI-RS port {21,22}.

Numbers in FIG. 14 represent indexes of resource element pairs for CSI-RS mapping and receiving, and the sum of a maximum identification index number and 1 is a maximum multiplexing factor of the pattern for two CSI-RS ports as well as the maximum number of the resource element pairs multiplexing the two CSI-RS ports in one sub-frame. A practical index sequence may be different from that shown in FIG. 14, and what is shown in the figure is not intended to limit the inventive idea of the embodiments of the present disclosure.

Example Embodiment 11

Figures 15, 16:
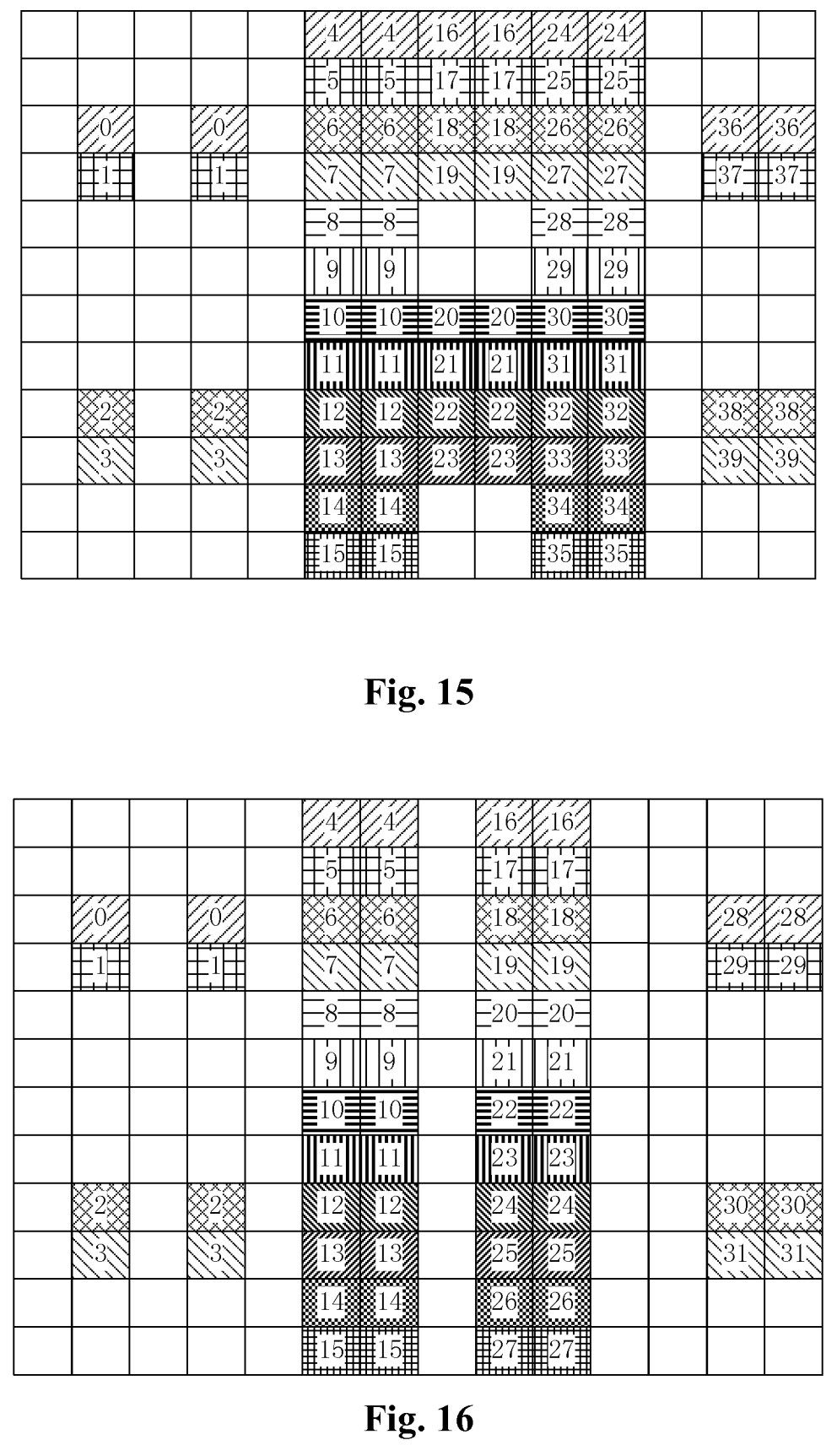

FIG. 15 is a diagram of a mapping pattern 11 of a normal CP CSI-RS according to example embodiment 11 of the present disclosure. FIG. 15 specifically shows a pattern of a group of pilots of the CSI-RS on one PRB pair in a CSI-RS sub-frame with a normal CP. An eNB sends the CSI-RS at a location bearing the CSI-RS, and a terminal receives and detects the CSI-RS at the location bearing the CSI-RS.

When the type of a CP of a sub-frame is a normal CP, the eNB maps the CSI-RS and/or an IMR onto one of the following OFDM symbol pairs:

{1,3}, {5,6}, {7,8}, {9,10} and {12,13}.

The eNB maps the CSI-RS and/or the IMR onto one or two or four subcarriers in subcarriers {2,3,8,9} of the OFDM symbol pair {1,3};

or, the eNB maps the CSI-RS and/or the IMR onto one or two or four subcarriers in subcarriers {0,1,2,3,4,5,6,7,8,9,10,11} of the OFDM symbol pair {5,6};

or, the eNB maps the CSI-RS and/or the IMR onto one or two or four subcarriers in subcarriers {2,3,4,5,8,9,10,11} of the OFDM symbol pair {7,8};

or, the eNB maps the CSI-RS and/or the IMR onto one or two or four subcarriers in subcarriers {0,1,2,3,4,5,6,7,8,9,10,11} of the OFDM symbol pair {9,10};

or, the eNB maps the CSI-RS and/or the IMR onto one or two or four subcarriers in subcarriers {2,3,8,9} of the OFDM symbol pair {12,13}, wherein all the OFDM symbol pairs and all the subcarriers corresponding to the OFDM symbol pairs form a candidate resource set for mapping the CSI-RS by the eNB.

One resource element pair on the same subcarriers of one OFDM symbol pair is able to bear one CSI-RS port or multiplex two CSI-RS ports in a manner of OCC code division;

when the number of borne CSI-RS ports is 1 or 2, the eNB selects one subcarrier from multiple optional subcarriers of one OFDM symbol pair to map the CSI-RS; when the number of the borne CSI-RS ports is 4, the eNB selects two subcarriers for bearing the CSI-RS from multiple optional subcarriers of one OFDM symbol pair in a manner as follows: one resource element pair on the Nth subcarrier of one OFDM symbol pair bears CSI-RS port {15,16}, and one resource element pair on the (N−6)th subcarrier of the OFDM symbol pair bears CSI-RS port {17,18}; and when the number of the borne ports is 8, the eNB selects four subcarriers for bearing the CSI-RS from multiple optional subcarriers of one OFDM symbol pair in a manner as follows: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}.

When the terminal detects that a type of a CP of a sub-frame is a normal CP, the terminal receives the CSI-RS and/or the IMR on one of the following OFDM symbol pairs:

{1,3}, {5,6}, {7,8}, {9,10} and {12,13}.

The terminal receives the CSI-RS and/or the IMR on one or two or four subcarriers in subcarriers {2,3,8,9} of the OFDM symbol pair {1,3};

or, the terminal receives the CSI-RS and/or the IMR on one or two or four subcarriers in subcarriers {0,1,2,3,4,5,6,7,8,9,10,11} of the OFDM symbol pair {5,6};

or, the terminal receives the CSI-RS and/or the IMR on one or two or four subcarriers in subcarriers {2,3,4,5,8,9,10,11} of the OFDM symbol pair {7,8};

or, the terminal receives the CSI-RS and/or the IMR on one or two or four subcarriers in subcarriers {0,1,2,3,4,5,6,7,8,9,10,11} of the OFDM symbol pair {9,10};

or, the terminal receives the CSI-RS and/or the IMR on one or two or four subcarriers in subcarriers {2,3,8,9} of the OFDM symbol pair {12,13}, wherein all the OFDM symbol pairs and all the subcarriers corresponding to the OFDM symbol pairs form a candidate resource set used for receiving the CSI-RS by the terminal.

One resource element pair on the same subcarriers of one OFDM symbol pair is able to bear one CSI-RS port or multiplex two CSI-RS ports in a manner of OCC code division;

One resource element pair on the same subcarriers of one OFDM symbol pair is able to bear one CSI-RS port or multiplex two CSI-RS ports in a manner of OCC code division;

when the number of the CSI-RS ports is 1 or 2, the terminal selects one subcarrier from multiple optional subcarriers of one OFDM symbol pair to receive one set of CSI-RS; when the number of the borne CSI-RS ports is 4, the terminal selects two subcarriers consistent with the following rules from the multiple operational subcarriers of one OFDM symbol pair to receive one set of CSI-RS: one resource element pair on the Nth subcarrier of one OFDM symbol pair bears CSI-RS port {15,16}, one resource element pair on the (N−6)th subcarrier of the OFDM symbol pair bears CSI-RS port {17,18}; and when the number of the borne ports is 8, the terminal selects four subcarriers consistent with the following rules from the multiple optional subcarriers of one OFDM symbol pair to receive one set of CSI-RS: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, one resource element pair on the (N−7)th subcarrier of the OFDM symbol pair bears CSI-RS port {21,22}, wherein each resource element pair includes two resource elements, and N is a value within a range from 0 to 11.

Example Embodiment 12

FIG. 16 is a diagram of a mapping pattern 12 of a normal CP CSI-RS according to example embodiment 12 of the present disclosure. FIG. 16 specifically shows a pattern of a group of pilots of the CSI-RS on one PRB pair in a CSI-RS sub-frame with a normal CP. An eNB sends the CSI-RS at a location bearing the CSI-RS, and a terminal receives and detects the CSI-RS at the location bearing the CSI-RS.

When the type of a CP of a sub-frame is a normal CP, the eNB maps the CSI-RS and/or an IMR onto one of the following OFDM symbol pairs:
{1,3}, {5,6}, {8,9} and {12,13}.

The eNB maps the CSI-RS and/or the IMR onto one or two or four subcarriers in subcarriers {2,3,8,9} of the OFDM symbol pair {1,2}.

or, the eNB maps the CSI-RS and/or the IMR onto one or two or four subcarriers in subcarriers {0,1,2,3,4,5,6,7,8,9,10,11} of the OFDM symbol pair {5,6};

or, the eNB maps the CSI-RS and/or the IMR onto one or two or four subcarriers in subcarriers {0,1,2,3,4,5,6,7,8,9,10,11} of the OFDM symbol pair {8,9};

or, the eNB maps the CSI-RS and/or the IMR onto one or two or four subcarriers in subcarriers {2,3,8,9} of the OFDM symbol pair {12,13}, wherein all the OFDM symbol pairs and all the subcarriers corresponding to the OFDM symbol pairs form a candidate resource set for mapping the CSI-RS by the eNB.

One resource element pair on the same subcarriers of one OFDM symbol pair is able to bear one CSI-RS port or multiplex two CSI-RS ports in a manner of OCC code division;

when the number of borne CSI-RS ports is 1 or 2, the eNB selects one subcarrier from multiple optional subcarriers of one OFDM symbol pair to map the CSI-RS; when the number of the borne CSI-RS ports is 4, the eNB selects two subcarriers for bearing the CSI-RS from multiple optional subcarriers of one OFDM symbol pair in a manner as follows: one resource element pair on the Nth subcarrier of one OFDM symbol pair bears CSI-RS port {15,16}, and one resource element pair on the (N−6)th subcarrier of the OFDM symbol pair bears CSI-RS port {17,18}; and when the number of the borne ports is 8, the eNB selects four subcarriers for bearing the CSI-RS from multiple optional subcarriers of one OFDM symbol pair in a manner as follows: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}.

When the terminal detects that a type of a CP of a sub-frame is a normal CP, the terminal receives the CSI-RS and/or the IMR on one of the following OFDM symbol pairs:
{1,3}, {5,6}, {8,9} and {12,13}.

The terminal receives the CSI-RS and/or the IMR on one or two or four subcarriers in subcarriers {2,3,8,9} of the OFDM symbol pair {1,3};

or, the terminal receives the CSI-RS and/or the IMR on one or two or four subcarriers in subcarriers {0,1,2,3,4,5,6,7,8,9,10,11} of the OFDM symbol pair {5,6};

or, the terminal receives the CSI-RS and/or the IMR on one or two or four subcarriers in subcarriers {0,1,2,3,4,5,6,7,8,9,10,11} of the OFDM symbol pair {8,9};

or, the terminal receives the CSI-RS and/or the IMR on one or two or four subcarriers in subcarriers {2,3,8,9} of the OFDM symbol pair {12,13}, wherein all the OFDM symbol pairs and all the subcarriers corresponding to the OFDM symbol pairs form a candidate resource set used for receiving the CSI-RS by the terminal.

One resource element pair on the same subcarriers of one OFDM symbol pair is able to bear one CSI-RS port or multiplex two CSI-RS ports in a manner of OCC code division;

when the number of the CSI-RS ports is 1 or 2, the terminal selects one subcarrier from multiple optional subcarriers of one OFDM symbol pair to receive one set of CSI-RS; when the number of the borne CSI-RS ports is 4, the terminal selects two subcarriers consistent with the following rules from the multiple operational subcarriers of one OFDM symbol pair to receive one set of CSI-RS: one resource element pair on the Nth subcarrier of one OFDM symbol pair bears CSI-RS port {15,16}, one resource element pair on the (N−6)th subcarrier of the OFDM symbol pair bears CSI-RS port {17,18}; and when the number of the borne ports is 8, the terminal selects four subcarriers consistent with the following rules from the multiple optional subcarriers of one OFDM symbol pair to receive one set of CSI-RS: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, one resource element pair on the (N−7)th subcarrier of the OFDM symbol pair bears CSI-RS port {21,22}, wherein each resource element pair includes two resource elements, and N is a value within a range from 0 to 11.

Example Embodiment 13

Figure 17:
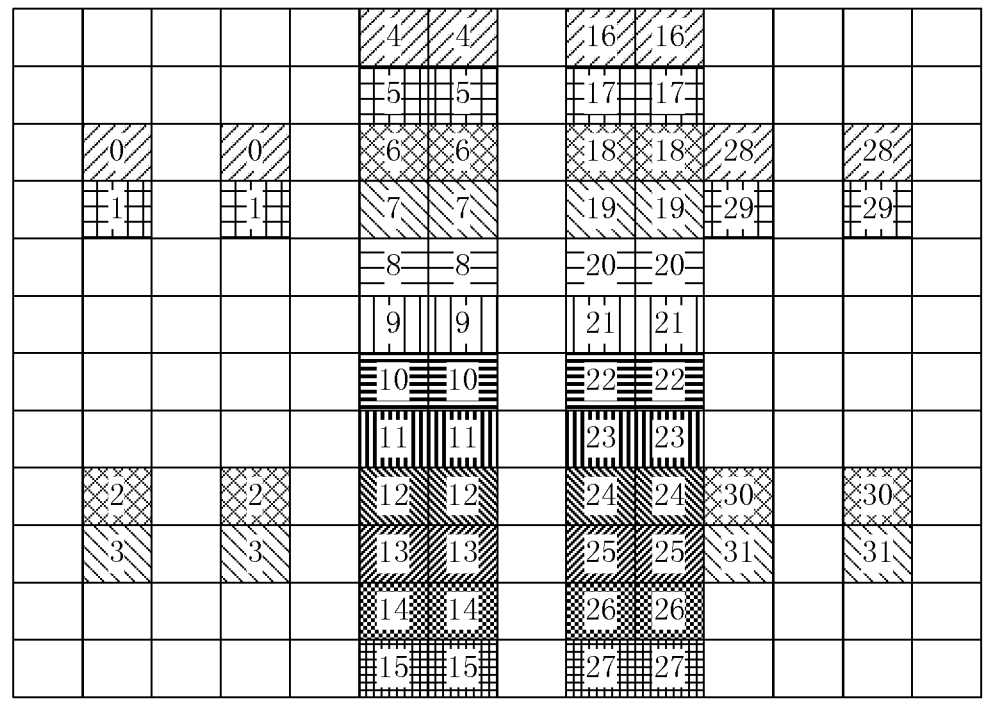
FIG. 17 is a diagram of a mapping pattern 13 of a normal CP CSI-RS according to example embodiment 13 of the present disclosure.

FIG. 17 is a diagram of a mapping pattern 13 of a normal CP CSI-RS according to example embodiment 13 of the present disclosure. FIG. 17 specifically shows a pattern of a group of pilots of the CSI-RS on one PRB pair in a CSI-RS sub-frame with a normal CP. An eNB sends the CSI-RS at a location bearing the CSI-RS, and a terminal receives and detects the CSI-RS at the location bearing the CSI-RS.

When the type of a CP of a sub-frame is a normal CP, the eNB maps the CSI-RS and/or an IMR onto one of the following OFDM symbol pairs:

{1,3}, {5,6}, {8,9} and {10,12}.

The eNB maps the CSI-RS and/or the IMR onto one or two or four subcarriers in subcarriers {2,3,8,9} of the OFDM symbol pair {1,3};

or, the eNB maps the CSI-RS and/or the IMR onto one or two or four subcarriers in subcarriers {0,1,2,3,4,5,6,7,8,9,10,11} of the OFDM symbol pair {5,6};

or, the eNB maps the CSI-RS and/or the IMR onto one or two or four subcarriers in subcarriers {0,1,2,3,4,5,6,7,8,9,10,11} of the OFDM symbol pair {8,9};

or, the eNB maps the CSI-RS and/or the IMR onto one or two or four subcarriers in subcarriers {2,3,8,9} of the OFDM symbol pair {10,12}, wherein all the OFDM symbol pairs and all the subcarriers corresponding to the OFDM symbol pairs form a candidate resource set for mapping the CSI-RS by the eNB.

When the terminal detects that a type of a CP of a sub-frame is a normal CP, the terminal receives the CSI-RS and/or the IMR on one of the following OFDM symbol pairs:

{1,3}, {5,6}, {8,9} and {10,12}.

The terminal receives the CSI-RS and/or the IMR on one or two or four subcarriers in subcarriers {2,3,8,9} of the OFDM symbol pair {1,3};

or, the terminal receives the CSI-RS and/or the IMR on one or two or four subcarriers in subcarriers {0,1,2,3,4,5,6,7,8,9,10,11} of the OFDM symbol pair {5,6};

or, the terminal receives the CSI-RS and/or the IMR on one or two or four subcarriers in subcarriers {0,1,2,3,4,5,6,7,8,9,10,11} of the OFDM symbol pair {8, 9};

or, the terminal receives the CSI-RS and/or the IMR on one or two or four subcarriers in subcarriers {2,3,8,9} of the OFDM symbol pair {10,12}, wherein all the OFDM symbol pairs and all the subcarriers corresponding to the OFDM symbol pairs form a candidate resource set used for receiving the CSI-RS by the terminal.

One resource element pair on the same subcarriers of one OFDM symbol pair is able to bear one CSI-RS port or multiplex two CSI-RS ports in a manner of OCC code division;

when the number of CSI-RS ports is 1 or 2, the terminal selects one subcarrier from multiple optional subcarriers of one OFDM symbol pair to receive one set of CSI-RS; when the number of the borne CSI-RS ports is 4, the terminal selects two subcarriers consistent with the following rules from the multiple operational subcarriers of one OFDM symbol pair to receive one set of CSI-RS: one resource element pair on the Nth subcarrier of one OFDM symbol pair bears CSI-RS port {15,16}, one resource element pair on the (N−6)th subcarrier of the OFDM symbol pair bears CSI-RS port {17,18}; and when the number of the borne ports is 8, the terminal selects four subcarriers consistent with the following rules from the multiple optional subcarriers of one OFDM symbol pair to receive one set of CSI-RS: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, one resource element pair on the (N−7)th subcarrier of the OFDM symbol pair bears CSI-RS port {21,22}, wherein each resource element pair includes two resource elements, and N is a value within a range from 0 to 11.

Example Embodiment 14

Figure 18:
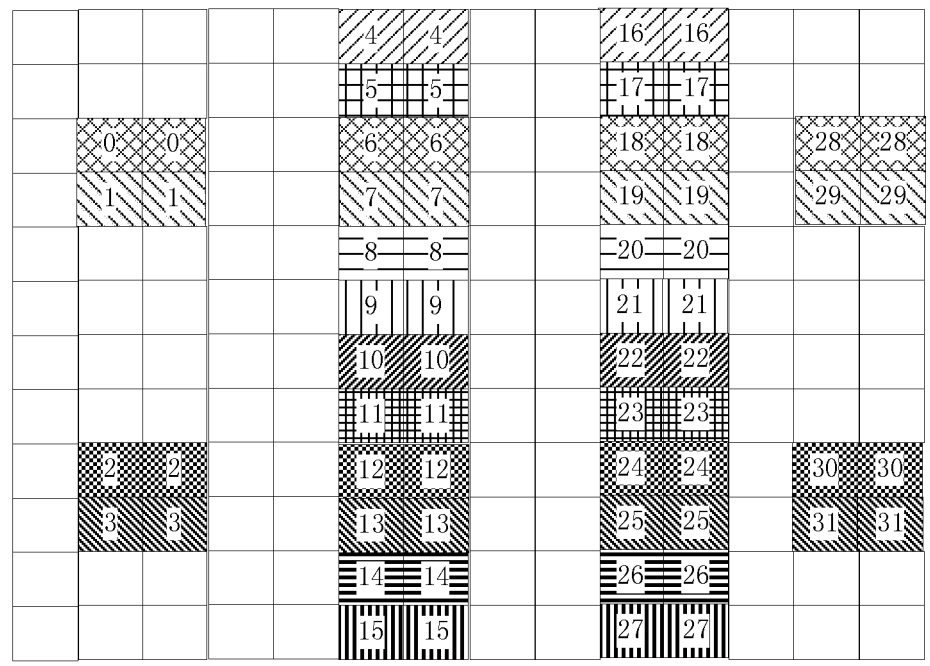
FIG. 18 is a diagram of a mapping pattern 14 of a normal CP CSI-RS according to example embodiment 14 of the present disclosure.

FIG. 18 is a diagram of a mapping pattern 14 of a normal CP CSI-RS according to example embodiment 14 of the present disclosure. FIG. 18 specifically shows a pattern of a group of pilots of the CSI-RS on one PRB pair in a CSI-RS sub-frame with a normal CP. An eNB sends the CSI-RS at a location bearing the CSI-RS, and a terminal receives and detects the CSI-RS at the location bearing the CSI-RS.

When the type of a CP of a sub-frame is a normal CP, the eNB maps the CSI-RS and/or an IMR onto one or two or four subcarriers in subcarriers {2,3,8,9} of an OFDM symbol pair {1,2};

or, the eNB maps the CSI-RS and/or the IMR onto one or two or four subcarriers in subcarriers {0,1,2,3,4,5,6,7,8,9,10,11} of an OFDM symbol pair {5, 6};

or, the eNB maps the CSI-RS and/or the IMR onto one or two or four subcarriers in subcarriers {0,1,2,3,4,5,6,7,8,9,10,11} of an OFDM symbol pair {9,10};

or, the eNB maps the CSI-RS and/or the IMR onto one or two or four subcarriers in subcarriers {2,3,8,9} of an OFDM symbol pair {12,13}.

The combination of all the OFDM symbol pairs and the corresponding subcarriers forms a candidate resource set which may selected by the eNB to send the CSI-RS.

One resource element pair on the same subcarriers of one OFDM symbol pair is able to bear one CSI-RS port or multiplex two CSI-RS ports in a manner of OCC code division;

when the number of borne CSI-RS ports is 1 or 2, the eNB selects one subcarrier from multiple optional subcarriers of one OFDM symbol pair to map the CSI-RS; when the number of the borne CSI-RS ports is 4, the eNB selects two subcarriers for bearing the CSI-RS from multiple optional subcarriers of one OFDM symbol pair in a manner as follows: one resource element pair on the Nth subcarrier of one OFDM symbol pair bears CSI-RS port {15,16}, and one resource element pair on the (N−6)th subcarrier of the OFDM symbol pair bears CSI-RS port {17,18}; and when the number of the borne ports is 8, the eNB selects four subcarriers for bearing the CSI-RS from multiple optional subcarriers of one OFDM symbol pair in a manner as follows: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}.

When the terminal detects that a type of a CP of a sub-frame is a normal CP, the terminal receives the CSI-RS and/or the IMR on one of the following OFDM symbol pairs:

{1,2}, {5,6}, {9,10} and {12,13}.

The terminal receives the CSI-RS and/or the IMR on one or two or four subcarriers in subcarriers {2,3,8,9} of the OFDM symbol pair {1,2};

or, the terminal receives the CSI-RS and/or the IMR on one or two or four subcarriers in subcarriers {0,1,2,3,4,5,6,7,8,9,10,11} of the OFDM symbol pair {5,6};

or, the terminal receives the CSI-RS and/or the IMR on one or two or four subcarriers in subcarriers {0,1,2,3,4,5,6,7,8,9,10,11} of the OFDM symbol pair {9,10};

or, the terminal receives the CSI-RS and/or the IMR on one or two or four subcarriers in subcarriers {2,3,8,9} of the OFDM symbol pair {12,13}.

The combination of all the OFDM symbol pairs and the corresponding subcarriers forms a resource set which may be configured for the terminal to receive one set of CSI-RS.

One resource element pair on the same subcarriers of one OFDM symbol pair is able to bear one CSI-RS port or multiplex two CSI-RS ports in a manner of OCC code division;

when the number of CSI-RS ports is 1 or 2, the terminal selects one subcarrier from multiple optional subcarriers of one OFDM symbol pair to receive one set of CSI-RS; when the number of the borne CSI-RS ports is 4, the terminal selects two subcarriers consistent with the following rules from the multiple operational subcarriers of one OFDM symbol pair to receive one set of CSI-RS: one resource element pair on the Nth subcarrier of one OFDM symbol pair bears CSI-RS port {15,16}, one resource element pair on the (N−6)th subcarrier of the OFDM symbol pair bears CSI-RS port {17,18}; and when the number of the borne ports is 8, the terminal selects four subcarriers consistent with the following rules from multiple optional subcarriers of one OFDM symbol pair to receive one set of CSI-RS: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, one resource element pair on the (N−7)th subcarrier of the OFDM symbol pair bears CSI-RS port {21,22}, wherein each resource element pair includes two resource elements, and N is a value within a range from 0 to 11.

Example Embodiment 15

Figure 19:
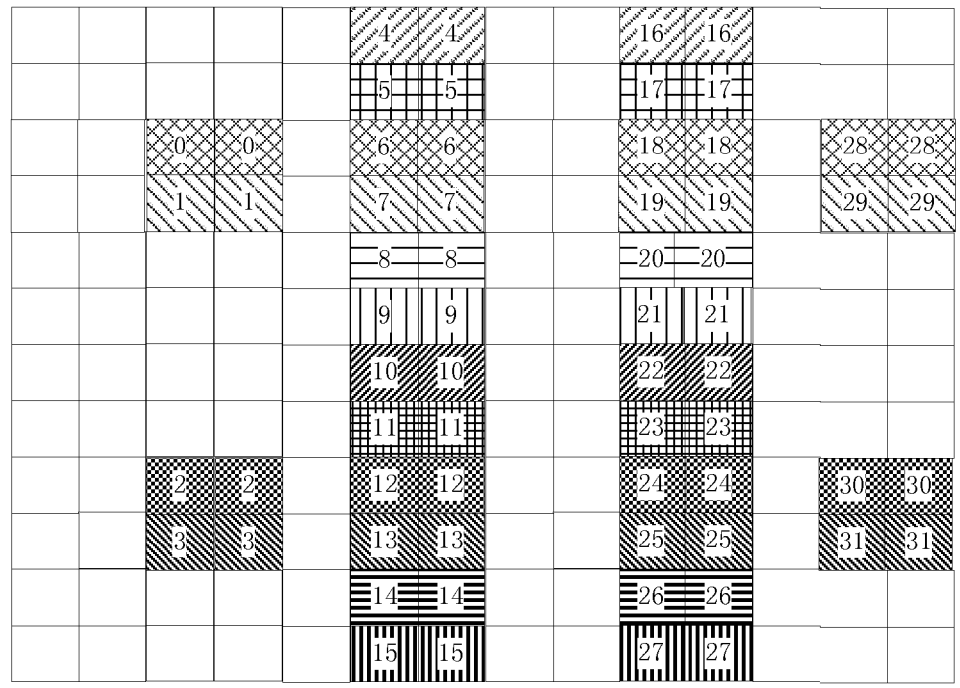
FIG. 19 is a diagram of a mapping pattern 15 of a normal CP CSI-RS according to example embodiment 15 of the present disclosure.

FIG. 19 is a diagram of a mapping pattern 15 of a normal CP CSI-RS according to example embodiment 15 of the present disclosure. FIG. 19 specifically shows a pattern of a group of pilots of the CSI-RS on one PRB pair in a CSI-RS sub-frame with a normal CP. An eNB sends the CSI-RS at a location bearing the CSI-RS, and a terminal receives and detects the CSI-RS at the location bearing the CSI-RS.

The eNB maps the CSI-RS and/or an IMR onto one or two or four subcarriers in subcarriers {2,3,8,9} of an OFDM symbol pair {2,3};

or, the eNB maps the CSI-RS and/or the IMR onto one or two or four subcarriers in subcarriers {0,1,2,3,4,5,6,7,8,9,10,11} of an OFDM symbol pair {5,6};

or, the eNB maps the CSI-RS and/or the IMR onto one or two or four subcarriers in subcarriers {0,1,2,3,4,5,6,7,8,9,10,11} of an OFDM symbol pair {9,10};

or, the eNB maps the CSI-RS and/or the IMR onto one or two or four subcarriers in subcarriers {2,3,8,9} of an OFDM symbol pair {12,13}.

The combination of all the OFDM symbol pairs and the corresponding subcarriers forms a resource set which may be selected by the eNB to send one set of CSI-RS.

One resource element pair on the same subcarriers of one OFDM symbol pair is able to bear one CSI-RS port or multiplex two CSI-RS ports in a manner of OCC code division;

when the number of CSI-RS ports configured by the eNB is 1 or 2, one subcarrier is selected from multiple optional subcarriers of one OFDM symbol pair to map the CSI-RS; when the number of the borne CSI-RS ports is 4, the eNB selects two subcarriers consistent with the following rules from multiple optional subcarriers of one OFDM symbol pair to map the CSI-RS: one resource element pair on the Nth subcarrier of one OFDM symbol pair bears CSI-RS port {15,16}, one resource element pair on the (N−6)th subcarrier of the OFDM symbol pair bears CSI-RS port {17,18}; and when the number of the borne ports is 8, the eNB selects four subcarriers consistent with the following rules from multiple optional subcarriers of one OFDM symbol pair to map the CSI-RS: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, one resource element pair on the (N−7)th subcarrier of the OFDM symbol pair bears CSI-RS port {21,22}, wherein each resource element pair includes two resource elements, and N is a value within a range from 0 to 11.

The terminal receives the CSI-RS and/or the IMR on one or two or four subcarriers in subcarriers {2,3,8,9} of the OFDM symbol pair {2,3};

or, the terminal receives the CSI-RS and/or the IMR on one or two or four subcarriers in subcarriers {0,1,2,3,4,5,6,7,8,9,10,11} of the OFDM symbol pair {5,6};

or, the terminal receives the CSI-RS and/or the IMR on one or two or four subcarriers in subcarriers {0,1,2,3,4,5,6,7,8,9,10,11} of the OFDM symbol pair {9,10};

or, the terminal receives the CSI-RS and/or the IMR on one or two or four subcarriers in subcarriers {2,3,8,9} of the OFDM symbol pair {12,13}.

The combination of all the OFDM symbol pairs and the corresponding subcarriers forms a resource set which may be selected by the terminal to receive one set of CSI-RS.

One resource element pair on the same subcarriers of one OFDM symbol pair is able to bear one CSI-RS port or multiplex two CSI-RS ports in a manner of OCC code division;

when the number of the CSI-RS ports is 1 or 2, the terminal selects one subcarrier from multiple optional subcarriers of one OFDM symbol pair to receive one set of CSI-RS; when the number of the borne CSI-RS ports is 4, the terminal selects two subcarriers consistent with the following rules from the multiple operational subcarriers of the OFDM symbol pair to receive one set of CSI-RS: one resource element pair on the Nth subcarrier of one OFDM symbol pair bears CSI-RS port {15,16}, one resource element pair on the (N−6)th subcarrier of the OFDM symbol pair bears CSI-RS port {17,18}; and when the number of the borne ports is 8, the terminal selects four subcarriers consistent with the following rules from multiple optional subcarriers of one OFDM symbol pair to receive one set of CSI-RS: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, one resource element pair on the (N−7)th subcarrier of the OFDM symbol pair bears CSI-RS port {21,22}, wherein each resource element pair includes two resource elements, and N is a value within a range from 0 to 11.

Example Embodiment 16

Figure 20:
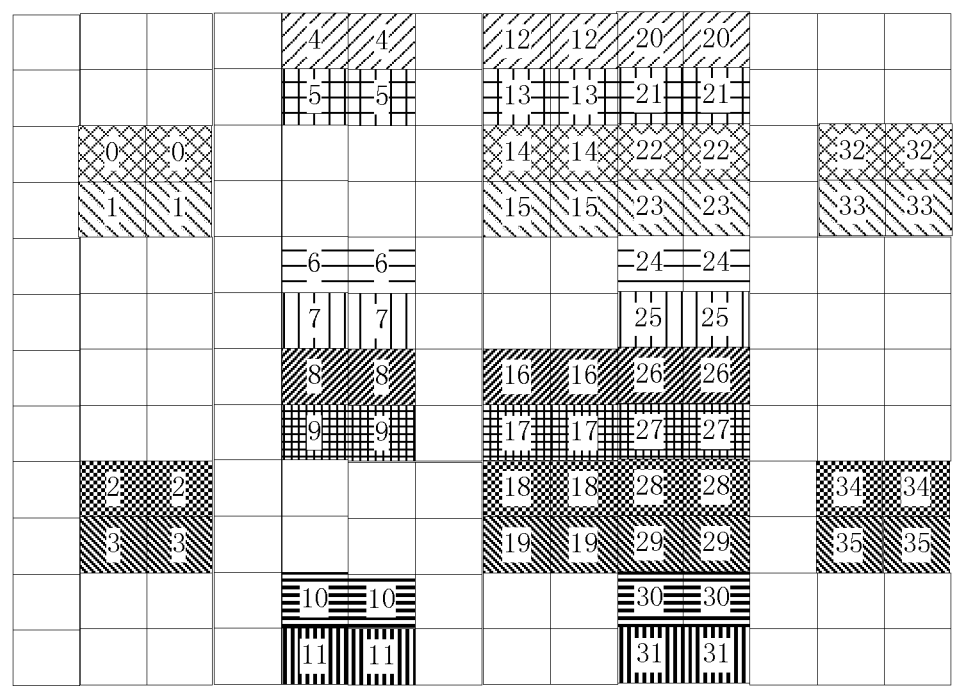
FIG. 20 is a diagram of a mapping pattern 16 of a normal CP CSI-RS according to example embodiment 16 of the present disclosure.

FIG. 20 is a diagram of a mapping pattern 16 of a normal CP CSI-RS according to example embodiment 16 of the present disclosure. FIG. 20 specifically shows a pattern of a group of pilots of the CSI-RS on one PRB pair in a CSI-RS sub-frame with a normal CP. An eNB sends the CSI-RS at a location bearing the CSI-RS, and a terminal receives and detects the CSI-RS at the location bearing the CSI-RS.

The eNB maps the CSI-RS and/or an IMR onto one or two or four subcarriers in subcarriers {2,3,8,9} of an OFDM symbol pair {1,2};

or, the eNB maps the CSI-RS and/or the IMR onto one or two or four subcarriers in subcarriers {0,1,4,5,6,7,10,11} of an OFDM symbol pair {4,5};

or, the eNB maps the CSI-RS and/or the IMR onto one or two or four subcarriers in subcarriers {2,3,4,5,8,9,10,11} of an OFDM symbol pair {7,8};

or, the eNB maps the CSI-RS and/or the IMR onto one or two or four subcarriers in subcarriers {0,1,2,3,4,5,6,7,8,9,10,11} of an OFDM symbol pair {9,10};

or, the eNB maps the CSI-RS and/or the IMR onto one or two or four subcarriers in subcarriers {2,3,8,9} of an OFDM symbol pair {12,13}.

The combination of all the OFDM symbol pairs and the corresponding subcarriers forms a resource set which may be selected by the eNB to send one set of CSI-RS.

One resource element pair on the same subcarriers of one OFDM symbol pair is able to bear one CSI-RS port or multiplex two CSI-RS ports in a manner of OCC code division;

when the number of CSI-RS ports configured by the eNB is 1 or 2, one subcarrier is selected from multiple optional subcarriers of one OFDM symbol pair to map the CSI-RS; when the number of the borne CSI-RS ports is 4, the eNB selects two subcarriers consistent with the following rules from multiple optional subcarriers of one OFDM symbol pair to map the CSI-RS: one resource element pair on the Nth subcarrier of one OFDM symbol pair bears CSI-RS port {15,16}, one resource element pair on the (N−6)th subcarrier of the OFDM symbol pair bears CSI-RS port {17,18}; and when the number of the borne ports is 8, the eNB selects four subcarriers consistent with the following rules from multiple optional subcarriers of one OFDM symbol pair to map the CSI-RS: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, one resource element pair on the (N−7)th subcarrier of the OFDM symbol pair bears CSI-RS port {21,22}, wherein each resource element pair includes two resource elements, and N is a value within a range from 0 to 11.

The terminal receives the CSI-RS and/or the IMR on one or two or four subcarriers in subcarriers {2,3,8,9} of the OFDM symbol pair {1,2};

or, the terminal receives the CSI-RS and/or the IMR on one or two or four subcarriers in subcarriers {0,1,4,5,6,7,10,11} of the OFDM symbol pair {4,5};

or, the terminal receives the CSI-RS and/or the IMR on one or two or four subcarriers in subcarriers {2,3,4,5,8,9,10,11} of the OFDM symbol pair {7,8};

or, the terminal receives the CSI-RS and/or the IMR on one or two or four subcarriers in subcarriers {0,1,2,3,4,5,6,7,8,9,10,11} of the OFDM symbol pair {9,10};

or, the terminal receives the CSI-RS and/or the IMR on one or two or four subcarriers in subcarriers {2,3,8,9} of the OFDM symbol pair {12,13}.

The combination of all the OFDM symbol pairs and the corresponding subcarriers forms a resource set which may be selected by the terminal to receive one set of CSI-RS.

One resource element pair on the same subcarriers of one OFDM symbol pair is able to bear one CSI-RS port or multiplex two CSI-RS ports in a manner of OCC code division;

when the number of the CSI-RS ports is 1 or 2, the terminal selects one subcarrier from multiple optional subcarriers of one OFDM symbol pair to receive one set of CSI-RS; when the number of the borne CSI-RS ports is 4, the terminal selects two subcarriers consistent with the following rules from the multiple operational subcarriers of the OFDM symbol pair to receive one set of CSI-RS: one resource element pair on the Nth subcarrier of one OFDM symbol pair bears CSI-RS port {15,16}, one resource element pair on the (N−6)th subcarrier of the OFDM symbol pair bears CSI-RS port {17,18}; and when the number of the borne ports is 8, the terminal selects four subcarriers consistent with the following rules from multiple optional subcarriers of one OFDM symbol pair to receive one set of CSI-RS: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, one resource element pair on the (N−7)th subcarrier of the OFDM symbol pair bears CSI-RS port {21,22}, wherein each resource element pair includes two resource elements, and N is a value within a range from 0 to 11.

Figure 21:
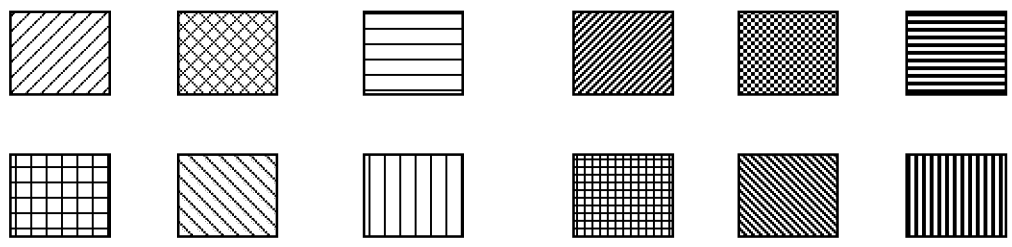
FIG. 21 is a diagram of optional CSI-RS/IMR resource pairs according to example embodiment 1 to example embodiment 16 of the present disclosure.

It is important to note here that the resource element pairs for bearing the CSI-RS/IMR in example embodiment 1 to example embodiment 16 refer to FIG. 21 (FIG. 21 is a diagram of optional CSI-RS/IMR resource pairs according to example embodiment 1 to example embodiment 16 of the present disclosure).

By the resource mapping method and device and the resource receiving method and device provided by the abovementioned embodiments, the problem of a lack of a CSI-RS pattern with a large multiplexing factor in evolution situations of gradual replacement of a compatible carrier with an NCT and the like in the related technology is solved, and the effects of improving measurement performance of a system, ensuring more accurate adaptive transmission and improving spectral efficiency of the system are further achieved.

Figure 22:
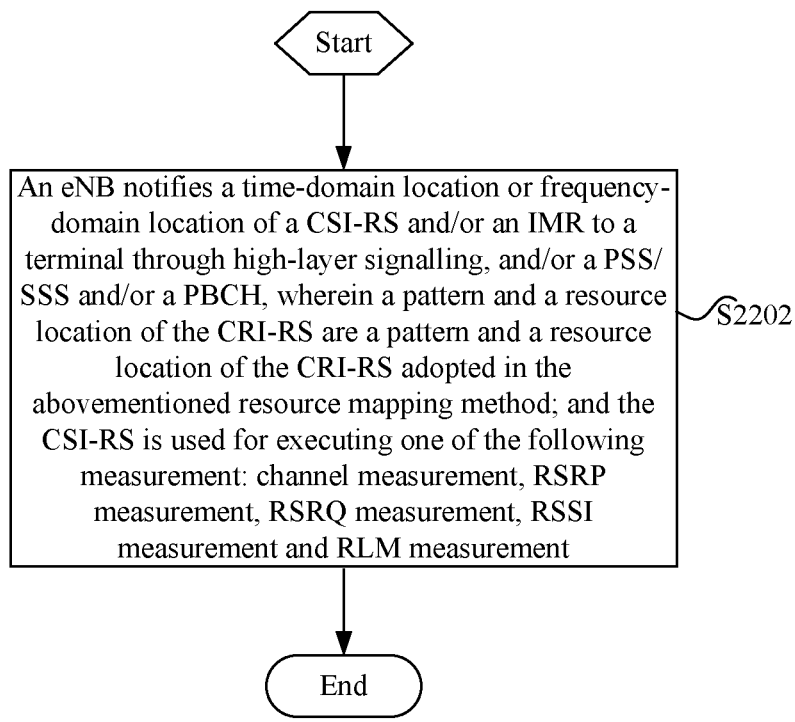
FIG. 22 is a flowchart of a signalling notification method according to an embodiment of the present disclosure.

FIG. 22 is a flowchart of a signalling notification method according to an embodiment of the present disclosure. As shown in FIG. 22, the method mainly includes the following step:

Step 2202: an eNB notifies a time-domain location or frequency-domain location of a CSI-RS and/or an IMR to a terminal through high-layer signalling, and/or a PSS/SSS and/or a PBCH, wherein a pattern and a resource location of the CRI-RS are a pattern and a resource location of the CRI-RS adopted in the abovementioned resource mapping method; and the CSI-RS is used for executing one of the following measurement: channel measurement, RSRP measurement, RSRQ measurement, RSSI measurement and RLM measurement.

In the embodiment, when the eNB notifies the time-domain location or frequency-domain location of the CSI-RS to the terminal through the high-layer signalling, a signalling content of the high-layer signalling includes at least one of: the number of antenna ports, a time-frequency resource location of a CSI-RS in each resource element block in each CSI-RS sub-frame, a cycle and sub-frame offset, and a power compensation factor of the CSI-RS, wherein the time-frequency resource location includes: an OFDM index and a subcarrier index; and the number of the antenna ports includes at least one of: 1, 2, 4, 8, 16, 32, 64 and 128.

In the embodiment, when the eNB notifies the time-domain location or frequency-domain location of the IMR to the terminal through the high-layer signalling, a signalling content of the high-layer signalling includes: a bitmap sequence and configurations about a cycle and a sub-frame offset, wherein each bit in the bitmap sequence represents a location of a time-frequency resource pair of the CSI-RS in each resource element block, and the length of the bitmap sequence represents a maximum number of CSI-RS resource pairs which are able to be borne by each CSI-RS resource element block.

In the embodiment, when the eNB notifies the time-domain location or frequency-domain location of the IMR to the terminal through the high-layer signalling, a signalling content of the high-layer signalling includes: a bitmap sequence and configurations about a cycle and a sub-frame offset, wherein each bit in the bitmap sequence represents a location of a four-port CSI-RS time-frequency resource pair in each resource element block, and the length of the bitmap sequence represents a maximum number of four-port CSI-RS resource pairs which are able to be borne by each CSI-RS resource element block.

In the embodiment, the length of the bitmap sequence is one of the followings: 60 bits, 56 bits, 32 bits, 48 bits, 40 bits, 30 bits, 28 bits, 16 bits, 24 bits and 20 bits.

In the embodiment, in a procedure that the eNB notifies the time-domain location or frequency-domain location of the CSI-RS to the terminal through the high-layer signalling, and/or the PSS/SSS and/or the PBCH, the method further includes that: the eNB notifies information about at least one of 504 configurations of the CSI-RS to the terminal through the PSS/SSS, wherein information about each configuration includes at least one of the following information: the number of antenna ports of the CSI-RS, a time-frequency resource location of the CSI-RS in each resource element block in each CSI-RS sub-frame, and a cycle and sub-frame offset of the CSI-RS sub-frame.

In the embodiment, in a procedure that the eNB notifies the time-domain location or frequency-domain location of the CSI-RS to the terminal through the high-layer signalling, and/or the PSS/SSS and/or the PBCH, the method further includes that: the eNB notifies configuration information of the CSI-RS to the terminal through the PBCH, wherein the configuration information includes at least one of the following information: the number of antenna ports of the CSI-RS, a time-frequency resource location of the CSI-RS in each resource element block in each CSI-RS sub-frame, and a cycle and sub-frame offset of the CSI-RS sub-frame.

In the embodiment, the eNB maps the CSI-RS or the IMR on the full bandwidth; or, the eNB maps the CSI-RS or the IMR on a part of the bandwidth, wherein a frequency-domain width and/or frequency-domain location of the part of the bandwidth is notified to the terminal through the high-layer signalling or physical-layer signalling or in a predetermined manner; or, the eNB maps the CSI-RS or the IMR on a part of PRB pairs on the full bandwidth, wherein the number and/or frequency-domain locations and/or frequency-domain intervals of the part of PRB pairs are notified to the terminal through the high-layer signalling or physical-layer signalling or in a predetermined manner.

Figure 23:
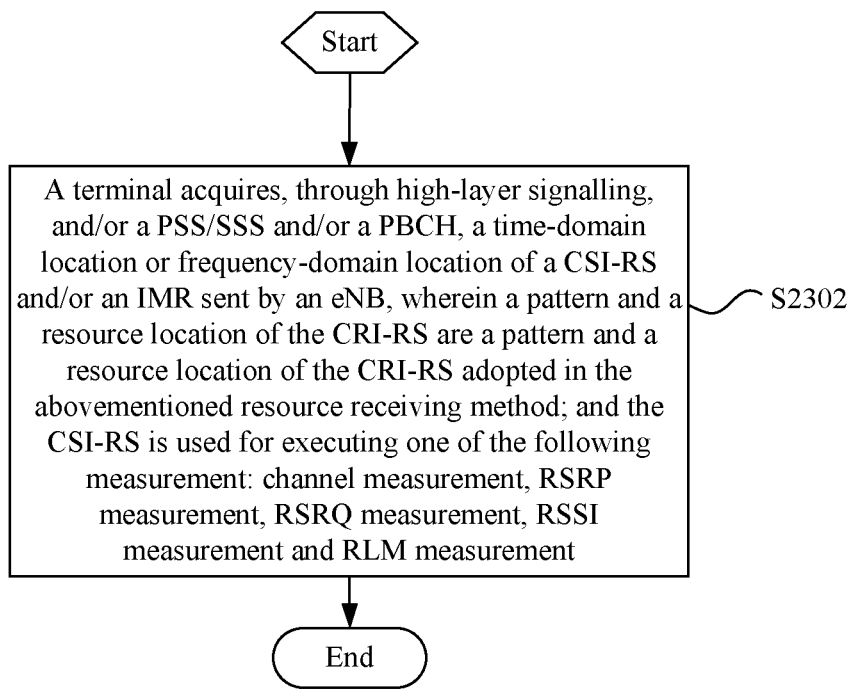
FIG. 23 is a flowchart of a signalling acquisition method according to an embodiment of the present disclosure.

FIG. 23 is a flowchart of a signalling acquisition method according to an embodiment of the present disclosure. As shown in FIG. 23, the method mainly includes the following step:

Step 2302: a terminal acquires, through high-layer signalling, and/or a PSS/SSS and/or a PBCH, a time-domain location or frequency-domain location of a CSI-RS and/or an IMR sent by an eNB, wherein a pattern and a resource location of the CRI-RS are a pattern and a resource location of the CRI-RS adopted in the abovementioned resource receiving method; and the CSI-RS is used for executing one of the following measurement: channel measurement, RSRP measurement, RSRQ measurement, RSSI measurement and RLM measurement.

In the embodiment, when the terminal acquires the time-domain location or frequency-domain location of the CSI-RS through the high-layer signalling, a signalling content of the high-layer signalling includes at least one of: the number of antenna ports, a time-frequency resource location of a CSI-RS in each resource element block in each CSI-RS sub-frame, a cycle and sub-frame offset, and a power compensation factor of the CSI-RS, wherein the time-frequency resource location includes: an OFDM index and a subcarrier index; and the number of the antenna ports includes at least one of: 1, 2, 4, 8, 16, 32, 64 and 128.

In the embodiment, when the terminal acquires the time-domain location or frequency-domain location of the IMR through the high-layer signalling, a signalling content of the high-layer signalling includes: a bitmap sequence and configurations about a cycle and a sub-frame offset, wherein each bit in the bitmap sequence represents a location of a time-frequency resource pair of the CSI-RS in each resource element block, and the length of the bitmap sequence represents a maximum number of CSI-RS resource pairs which are able to be borne by each CSI-RS resource element block.

In the embodiment, when the terminal acquires the time-domain location or frequency-domain location of the IMR through the high-layer signalling, a signalling content of the high-layer signalling includes: a bitmap sequence and configurations about a cycle and a sub-frame offset, wherein each bit in the bitmap sequence represents a location of a four-port CSI-RS time-frequency resource pair in each resource element block, and the length of the bitmap sequence represents a maximum number of four-port CSI-RS resource pairs which are able to be borne by each CSI-RS resource element block.

In the embodiment, the length of the bitmap sequence is one of the followings: 60 bits, 56 bits, 32 bits, 48 bits, 40 bits, 30 bits, 28 bits, 16 bits, 24 bits and 20 bits.

In the embodiment, during a procedure that the terminal acquires, through the high-layer signalling, and/or the PSS/SSS and/or the PBCH, the time-domain location or frequency-domain location of the CSI-RS sent by the eNB, the method further includes that: the terminal receives information about at least one of 504 configurations of the CSI-RS sent by the eNB through the PSS/SSS, wherein information about each configuration includes at least one of the following information: the number of antenna ports of the CSI-RS, a time-frequency resource location of the CSI-RS in each resource element block in each CSI-RS sub-frame, and a cycle and sub-frame offset of the CSI-RS sub-frame.

In the embodiment, during a procedure that the terminal acquires, through the high-layer signalling, and/or the PSS/SSS and/or the PBCH, the time-domain location or frequency-domain location of the CSI-RS sent by the eNB, the method further includes that: the terminal receives configuration information of the CSI-RS sent by the eNB through the PBCH, wherein the configuration information includes at least one of the following information: the number of antenna ports of the CSI-RS, a time-frequency resource location of the CSI-RS in each resource element block in each CSI-RS sub-frame, and a cycle and sub-frame offset of the CSI-RS sub-frame.

In the embodiment, the terminal receives the CSI-RS or the IMR on the full bandwidth; or, the terminal receives the CSI-RS or the IMR on a part of the bandwidth, wherein a frequency-domain width and/or frequency-domain location of the part of the bandwidth is obtained through the high-layer signalling or physical-layer signalling or in a predetermined manner; or, the terminal receives the CSI-RS or the IMR on a part of PRB pairs on the full bandwidth, wherein the number and/or frequency-domain locations and/or frequency-domain intervals of the part of PRB pairs are obtained through the high-layer signalling or physical-layer signalling or in a predetermined manner.

Figure 24:
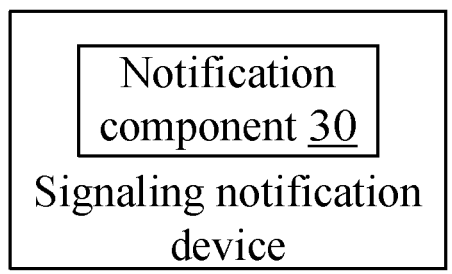
FIG. 24 is a structure diagram of a signalling notification device according to an embodiment of the present disclosure.

FIG. 24 is a structure diagram of a signalling notification device according to an embodiment of the present disclosure, the device is located in an eNB, and is configured to implement the signalling notification method provided by the abovementioned embodiment. As shown in FIG. 24, the device mainly includes: a notification component 30, configured to notify a time-domain location or frequency-domain location of a CSI-RS and/or an IMR to a terminal through high-layer signalling, and/or a PSS/SSS and/or a PBCH, wherein a pattern and a resource location of the CRI-RS are a pattern and a resource location of the CRI-RS adopted in the abovementioned resource mapping method; and the CSI-RS is used for executing one of the following measurement: channel measurement, RSRP measurement, RSRQ measurement, RSSI measurement and RLM measurement.

In the embodiment, when the notification component notifies the time-domain location or frequency-domain location of the CSI-RS to the terminal through the high-layer signalling, a signalling content of the high-layer signalling includes at least one of: the number of antenna ports, a time-frequency resource location of a CSI-RS in each resource element block in each CSI-RS sub-frame, a cycle and sub-frame offset, and a power compensation factor of the CSI-RS, wherein the time-frequency resource location includes: an OFDM index and a subcarrier index; and the number of the antenna ports includes at least one of: 1, 2, 4, 8, 16, 32, 64 and 128.

In the embodiment, when the notification component 30 notifies the time-domain location or frequency-domain location of the IMR to the terminal through the high-layer signalling, a signalling content of the high-layer signalling includes: a bitmap sequence and configurations about a cycle and a sub-frame offset, wherein each bit in the bitmap sequence represents a location of a time-frequency resource pair of the CSI-RS in each resource element block, and the length of the bitmap sequence represents a maximum number of CSI-RS resource pairs which are able to be borne by each CSI-RS resource element block.

In the embodiment, when the notification component 30 notifies the time-domain location or frequency-domain location of the IMR to the terminal through the high-layer signalling, a signalling content of the high-layer signalling includes: a bitmap sequence and configurations about a cycle and a sub-frame offset, wherein each bit in the bitmap sequence represents a location of a four-port CSI-RS time-frequency resource pair in each resource element block, and the length of the bitmap sequence represents a maximum number of four-port CSI-RS resource pairs which are able to be borne by each CSI-RS resource element block.

In the embodiment, the length of the bitmap sequence is one of the followings: 60 bits, 56 bits, 32 bits, 48 bits, 40 bits, 30 bits, 28 bits, 16 bits, 24 bits and 20 bits.

In the embodiment, the notification component 30 is further configured to notify information about at least one of 504 configurations of the CSI-RS to the terminal through the PSS/SSS, wherein information about each configuration includes at least one of the following information: the number of antenna ports of the CSI-RS, a time-frequency resource location of the CSI-RS in each resource element block in each CSI-RS sub-frame, and a cycle and sub-frame offset of the CSI-RS sub-frame.

In the embodiment, the notification component 30 is further configured to notify configuration information of the CSI-RS to the terminal through the PBCH, wherein the configuration information includes at least one of the following information: the number of antenna ports of the CSI-RS, a time-frequency resource location of the CSI-RS in each resource element block in each CSI-RS sub-frame, and a cycle and sub-frame offset of the CSI-RS sub-frame.

In the embodiment, the eNB maps the CSI-RS or the IMR on the full bandwidth; or, the eNB maps the CSI-RS or the IMR on a part of the bandwidth, wherein a frequency-domain width and/or frequency-domain location of the part of the bandwidth is notified to the terminal by virtue of the notification component 30 through the high-layer signalling or physical-layer signalling or in a predetermined manner; or, the eNB maps the CSI-RS or the IMR on a part of PRB pairs on the full bandwidth, wherein the number and/or frequency-domain locations and/or frequency-domain intervals of the part of PRB pairs are notified to the terminal by the notification component through the high-layer signalling or physical-layer signalling or in a predetermined manner.

Figure 25:
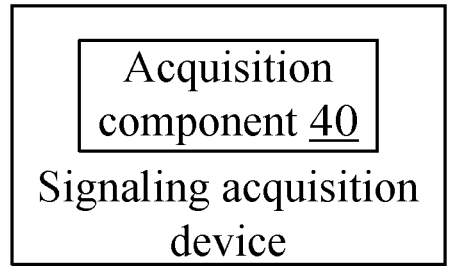
FIG. 25 is a structure diagram of a signalling acquisition device according to an embodiment of the present disclosure.

FIG. 25 is a structure diagram of a signalling acquisition device according to an embodiment of the present disclosure, and the device is located in a terminal, and is configured to implement the signalling acquisition method provided by the abovementioned embodiment. As shown in FIG. 25, the device mainly includes: an acquisition component 40, configured to acquire, through high-layer signalling, and/or a PSS/SSS and/or a PBCH, a time-domain location or frequency-domain location of a CSI-RS and/or an IMR sent by an eNB, wherein a pattern and a resource location of the CRI-RS are a pattern and a resource location of the CRI-RS adopted in the abovementioned resource receiving method; and the CSI-RS is used for executing one of the following measurement: channel measurement, RSRP measurement, RSRQ measurement, RSSI measurement and RLM measurement.

In the embodiment, when the acquisition component 40 acquires the time-domain location or frequency-domain location of the CSI-RS through the high-layer signalling, a signalling content of the high-layer signalling includes at least one of: the number of antenna ports, a time-frequency resource location of a CSI-RS in each resource element block in each CSI-RS sub-frame, a cycle and sub-frame offset, and a power compensation factor of the CSI-RS, wherein the time-frequency resource location includes: an OFDM index and a subcarrier index; and the number of the antenna ports includes at least one of: 1, 2, 4, 8, 16, 32, 64 and 128.

In the embodiment, when the acquisition component 40 acquires the time-domain location or frequency-domain location of the IMR through the high-layer signalling, a signalling content of the high-layer signalling includes: a bitmap sequence and configurations about a cycle and a sub-frame offset, wherein each bit in the bitmap sequence represents a location of a time-frequency resource pair of the CSI-RS in each resource element block, and the length of the bitmap sequence represents a maximum number of CSI-RS resource pairs which are able to be borne by each CSI-RS resource element block.

In the embodiment, when the acquisition component 40 acquires the time-domain location or frequency-domain location of the IMR through the high-layer signalling, a signalling content of the high-layer signalling includes: a bitmap sequence and configurations about a cycle and a sub-frame offset, wherein each bit in the bitmap sequence represents a location of a four-port CSI-RS time-frequency resource pair in each resource element block, and the length of the bitmap sequence represents a maximum number of four-port CSI-RS resource pairs which are able to be borne by each CSI-RS resource element block.

In the embodiment, the length of the bitmap sequence is one of the followings: 60 bits, 56 bits, 32 bits, 48 bits, 40 bits, 30 bits, 28 bits, 16 bits, 24 bits and 20 bits.

In the embodiment, the acquisition component 40 is further configured to receive, through the PSS/SSS, information about at least one of 504 configurations of the CSI-RS sent by the eNB, wherein information about each configuration includes at least one of the following information: the number of antenna ports of the CSI-RS, a time-frequency resource location of the CSI-RS in each resource element block in each CSI-RS sub-frame, and a cycle and sub-frame offset of the CSI-RS sub-frame.

In the embodiment, the acquisition component 40 is further configured to receive, through the PBCH, configuration information of the CSI-RS sent by the eNB, wherein the configuration information includes at least one of the following information: the number of antenna ports of the CSI-RS, a time-frequency resource location of the CSI-RS in each resource element block in each CSI-RS sub-frame, and a cycle and sub-frame offset of the CSI-RS sub-frame.

In the embodiment, the terminal receives the CSI-RS or the IMR on the full bandwidth; or, the terminal receives the CSI-RS or the IMR on a part of the bandwidth, wherein a frequency-domain width and/or frequency-domain location of the part of the bandwidth is obtained by virtue of the acquisition component 40 through the high-layer signalling or physical-layer signalling or in a predetermined manner; or, the terminal receives the CSI-RS or the IMR on a part of PRB pairs on the full bandwidth, wherein the number and/or frequency-domain locations and/or frequency-domain intervals of the part of PRB pairs are obtained by virtue of the acquisition component through the high-layer signalling or physical-layer signalling or in a predetermined manner.

The signalling notification method provided by the abovementioned embodiment and the signalling acquisition method provided by the abovementioned embodiment are further described below with reference to example embodiment 17 to example embodiment 21.

Example Embodiment 17

The eNB notifies the time-domain and frequency-domain locations of the CSI-RS by configuring high-layer signalling, wherein the adopted high-layer signalling includes at least one of the following signalling contents: the number of antenna ports, a time-frequency resource location of the CSI-RS in each resource element block in each CSI-RS sub-frame, the cycle and sub-frame offset, and the power compensation factor of the CSI-RS, wherein the number of the antenna ports may be configured to be at least one of: at least one of: 1, 2, 4, 8, 16, 32, 64 and 128.

The terminal obtains the time-domain and frequency-domain locations of the CSI-RS through the high-layer signalling, wherein the obtained high-layer signalling includes at least one of the following signalling contents: the number of the antenna ports, a time-frequency resource location of the CSI-RS in each resource element block in each CSI-RS sub-frame, the cycle and sub-frame offset, and the power compensation factor of the CSI-RS, wherein the number of the antenna ports may be configured to be at least one of: at least one of: 1, 2, 4, 8, 16, 32, 64 and 128. Therefore, the CSI-RS is received at the corresponding location, and one or more operations of channel measurement, RSRP measurement, RLM measurement and the like are performed.

Example Embodiment 18

The eNB notifies the time-domain and frequency-domain locations of the IMR by configuring high-layer signalling, wherein the adopted high-layer signalling includes the bitmap sequence and the configurations about a cycle and a sub-frame offset, wherein each bit in the bitmap sequence represents a location of a time-frequency resource pair of the CSI-RS in each resource element block, and the length of the bitmap sequence represents a maximum number of CSI-RS resource pairs which are able to be borne by each CSI-RS resource element block.

The terminal obtains the time-domain and frequency-domain locations of the IMR through the high-layer signalling, wherein the obtained high-layer signalling includes the bitmap sequence and the configurations about a cycle and a sub-frame offset, wherein each bit in the bitmap sequence represents a location of a time-frequency resource pair of the CSI-RS in each resource element block, and the length of the bitmap sequence represents a maximum number of CSI-RS resource pairs which are able to be borne by each CSI-RS resource element block.

The bitmap sequent may adopt one of the following lengths: 60 bits, 56 bits, 32 bits, 48 bits, 40 bits, 30 bits, 28 bits, 16 bits, 24 bits and 20 bits.

Example Embodiment 19

The eNB notifies configuration information of the CSI-RS to the terminal through the PSS/SSS. The PSS/SSS may notify one of 504 possible configurations of the CSI-RS to the terminal, and each possible configuration may include at least one of the following information: the number of the antenna ports of the CSI-RS, a time-frequency resource location of the CSI-RS in each resource element block in each CSI-RS sub-frame, and a cycle and sub-frame offset of the CSI-RS sub-frame.

The terminal obtains the configuration information of the CSI-RS through the PSS/SSS. The terminal may obtain one of 504 possible configurations of the CSI-RS through the PSS/SSS, and each possible configuration may include at least one of the following information: the number of the antenna ports of the CSI-RS, a time-frequency resource location of the CSI-RS in each resource element block in each CSI-RS sub-frame, and a cycle and sub-frame offset of the CSI-RS sub-frame.

Example Embodiment 20

The eNB notifies the configuration information of the CSI-RS through the PBCH. Bits in the PBCH may notify at least one of the following information to the terminal: the number of the antenna ports of the CSI-RS, a time-frequency resource location of the CSI-RS in each resource element block in each CSI-RS sub-frame, and a cycle and sub-frame offset of the CSI-RS sub-frame.

The terminal obtains the configuration information of the CSI-RS through the PBCH. The terminal may obtain at least one of the following information through the bits in the PBCH: the number of the antenna ports of the CSI-RS, a time-frequency resource location of the CSI-RS in each resource element block in each CSI-RS sub-frame, and a cycle and sub-frame offset of the CSI-RS sub-frame.

Example Embodiment 21

The eNB maps the CSI-RS or the IMR on the full bandwidth. The terminal receives the CSI-RS or the IMR on the full bandwidth.

Or, the eNB maps the CSI-RS or the IMR on a part of the bandwidth, wherein the frequency-domain width and/or frequency-domain location of the part of the bandwidth are/is notified to the terminal through the high-layer signalling or physical-layer signalling or in a predetermined manner; and the terminal receives the CSI-RS or the IMR on a part of the bandwidth, wherein the frequency-domain width and/or frequency-domain location of the part of the bandwidth are/is obtained through the high-layer signalling or physical-layer signalling or in a predetermined manner.

Or, the eNB maps the CSI-RS or the IMR on a part of PRB pairs on the full bandwidth, wherein the number and/or frequency-domain locations and/or frequency-domain intervals of the part of PRB pairs may be notified to the terminal through the high-layer signalling or physical-layer signalling or in a predetermined manner; and the terminal receives the CSI-RS or the IMR on a part of PRB pairs on the full bandwidth, wherein the number and/or frequency-domain locations and/or frequency-domain intervals of the part of PRB pairs may be obtained through the high-layer signalling or physical-layer signalling or in a predetermined manner.

By the signalling notification method and device and the signalling acquisition method and device provided by the abovementioned embodiments, the problem of a lack of a CSI-RS pattern with a large multiplexing factor in evolution situations of gradual replacement of a compatible carrier with an NCT and the like in the related technology is solved, and the effects of improving measurement performance of a system, ensuring more accurate adaptive transmission and improving spectral efficiency of the system are further achieved.

From the above, it can be seen that the present disclosure achieves the following technical effects: multiplexing of the CSI-RS and the IMR may be expanded, collision of the CSI-RS with another channel or signal such as a DMRS and an RCRS is avoided, accuracy of channel measurement, RSRP measurement, RSRQ measurement, RLM measurement and interference measurement is ensured, the measurement performance of the system is improved, more accurate adaptive transmission is ensured, and the spectral efficiency of the system is improved.

Obviously, those skilled in the art should know that each component or step of the present disclosure may be implemented by a universal computing device, and the components or steps may be concentrated on a single computing device or distributed on a network formed by multiple computing devices, and may optionally be implemented by programmable codes executable for the computing devices, so that the components or steps may be stored in a storage device for execution with the computing devices, the shown or described steps may be executed in a sequence different from the sequence here under a certain condition, or the components or steps form each integrated circuit component, or multiple components or steps therein may form a single integrated circuit component for implementation. As a consequence, the present disclosure is not limited to any specific hardware and software combination.

The above is only the example embodiment of the present disclosure and not intended to limit the present disclosure, and for those skilled in the art, the present disclosure may have various modifications and variations. Any modifications, equivalent replacements, improvements and the like within the principle of the present disclosure shall fall within the scope of protection defined by the claims of the present disclosure.

What is claimed is:

1. A resource mapping method, comprising:
  mapping, by an evolved NodeB (eNB), a Channel State Information Reference Signal (CSI-RS) onto multiple resource elements in a manner of frequency division multiplexing and/or time division multiplexing and/or code division multiplexing; and/or
  mapping, by the eNB, an Interference Measure Resource (IMR) onto multiple resource elements in a manner of frequency division multiplexing and/or time division multiplexing;

wherein when a type of a Cyclic Prefix (CP) of a sub-frame is a normal CP, the eNB maps the CSI-RS and/or the IMR onto one of the following Orthogonal Frequency Division Multiplexing (OFDM) symbol pairs:
{0,1}, {9,10} and {12,13};
or, when a type of a Cyclic Prefix (CP) of a sub-frame is a normal CP, the eNB maps the CSI-RS and/or the IMR onto the following Orthogonal Frequency Division Multiplexing (OFDM) symbol pairs:
{0,1}, {3,4}, {5,6}, {7,8}, {9,10} and {12,13};
or, when a type of a CP of a sub-frame is a normal CP, the eNB maps the CSI-RS and/or the IMR onto one of the following OFDM symbol pairs:
{1,2}, {5,6}, {9,10} and {12,13};
or, when a type of a CP of a sub-frame is a normal CP, the eNB maps the CSI-RS and/or the IMR onto the following OFDM symbol pairs:
{1,2}, {5,6}, {9,10} and {12,13};
or, when a type of a CP of a sub-frame is a normal CP, the eNB maps the CSI-RS and/or the IMR onto one of the following OFDM symbol pairs:
{0,1}, {9,10} and {12,13};
or, when a type of a CP of a sub-frame is a normal CP, the eNB maps the CSI-RS and/or the IMR onto the following OFDM symbol pairs:
{0,1}, {2,3}, {5,6}, {7,8}, {9,10} and {12,13};
or, when a type of a CP of a sub-frame is a normal CP, the eNB maps the CSI-RS and/or the IMR onto one of the following OFDM symbol pairs:
{1,2}, {9,10} and {12,13};
or, when a type of a CP of a sub-frame is a normal CP, the eNB maps the CSI-RS and/or the IMR onto the following OFDM symbol pairs:
{1,2}, {4,5}, {7,8}, {9,10} and {12,13};
or, when a type of a CP of a sub-frame is an extended CP, the eNB maps the CSI-RS and/or the IMR onto the following OFDM symbol pair:
{1,2};
or, when a type of a CP of a sub-frame is an extended CP, the eNB maps the CSI-RS and/or the IMR onto the following OFDM symbol pairs:
{1,2}, {4,5}, {7,8} and {10,11};
or, when a type of a CP of a sub-frame is a normal CP, the eNB maps the CSI-RS and/or the IMR onto one of the following OFDM symbol pairs:
{1,3}, {9,10} and {12,13};
or, when a type of a CP of a sub-frame is a normal CP, the eNB maps the CSI-RS and/or the IMR onto the following OFDM symbol pairs:
{1,3}, {5,6}, {7,8}, {9,10} and {12,13};
or, when a type of a CP of a sub-frame is a normal CP, the eNB maps the CSI-RS and/or the IMR onto one of the following OFDM symbol pairs:
{1,3}, {8,9} and {12,13};
or, when a type of a CP of a sub-frame is a normal CP, the eNB maps the CSI-RS and/or the IMR onto the following OFDM symbol pairs:
{1,3}, {5,6}, {8,9} and {12,13};
or, when a type of a CP of a sub-frame is a normal CP, the eNB maps the CSI-RS and/or the IMR onto one of the following OFDM symbol pairs:
{1,3}, {8,9} and {10,12};
or, when a type of a CP of a sub-frame is a normal CP, the eNB maps the CSI-RS and/or the IMR onto the following OFDM symbol pairs:
{1,3}, {5,6}, {8,9} and {10,12};
or, when a type of a CP of a sub-frame is a normal CP, the eNB maps the CSI-RS and/or the IMR onto the following OFDM symbol pairs:
{2,3}, {5,6}, {7,8}, {9,10} and {12,13};
or, when a type of a CP of a sub-frame is a normal CP, the eNB maps the CSI-RS and/or the IMR onto the following OFDM symbol pairs:
{2,3}, {5,6}, {9,10} and {12,13}.

2. The method according to claim 1, wherein when the eNB maps the CSI-RS and/or the IMR onto one of the following OFDM symbol pairs: {0,1}, {3,4}, {9,10} and {12,13}, or when a type of a Cyclic Prefix (CP) of a sub-frame is a normal CP, the eNB maps the CSI-RS and/or the IMR onto the following Orthogonal Frequency Division Multiplexing (OFDM) symbol pairs: {0,1}, {3,4}, {5,6}, {7,8}, {9,10} and {12,13},
the eNB maps the CSI-RS and/or the IMR onto one or two or four subcarriers in subcarriers {0,1,2,3,4,5,6,7,8,9,10,11} of the OFDM symbol pair {0,1};
or,
the eNB maps the CSI-RS and/or the IMR onto one or two or four subcarriers in subcarriers {0,1,2,3,4,5,6,7,8,9,10,11} of the OFDM symbol pair {3,4};
or,
the eNB maps the CSI-RS and/or the IMR onto one or two or four subcarriers in subcarriers {0,1,2,3,4,5,6,7,8,9,10,11} of the OFDM symbol pair {7,8};
or,
the eNB maps the CSI-RS and/or the IMR onto one or two or four subcarriers in subcarriers {0,1,2,3,4,5,6,7,8,9,10,11} of the OFDM symbol pair {9,10};
or,
the eNB maps the CSI-RS and/or the IMR onto one or two or four subcarriers in subcarriers {2,3,4,7,8,9} of the OFDM symbol pair {5,6};
or,
the eNB maps the CSI-RS and/or the IMR onto one or two or four subcarriers in subcarriers {2,3,4,7,8,9} of the OFDM symbol pair {12,13},
wherein all the OFDM symbol pairs and all the subcarriers corresponding to the OFDM symbol pairs form a candidate resource set for mapping the CSI-RS by the eNB.

3. The method according to claim 1, wherein when the eNB maps the CSI-RS and/or the IMR onto one of the following OFDM symbol pairs: {1,2}, {9,10} and {12,13}, or when the eNB maps the CSI-RS and/or the IMR onto the following OFDM symbol pairs: {1,2}, {5,6}, {9,10} and {12,13}, the eNB maps the CSI-RS and/or the IMR onto one or two or four subcarriers in subcarriers {0,1,2,3,4,5,6,7,8,9,10,11} of the OFDM symbol pair {1,2};
or,
the eNB maps the CSI-RS and/or the IMR onto one or two or four subcarriers in subcarriers {0,1,2,3,4,5,6,7,8,9,10,11} of the OFDM symbol pair {5,6};
or,
the eNB maps the CSI-RS and/or the IMR onto one or two or four subcarriers in subcarriers {0,1,2,3,4,5,6,7,8,9,10,11} of the OFDM symbol pair {9,10};
or,
the eNB maps the CSI-RS and/or the IMR onto one or two or four subcarriers in subcarriers {2,3,8,9} of the OFDM symbol pair {12,13},
wherein all the OFDM symbol pairs and all the subcarriers corresponding to the OFDM symbol pairs form a candidate resource set for mapping the CSI-RS by the eNB.

4. The method according to claim 1, wherein when the eNB maps the CSI-RS and/or the IMR onto one of the following OFDM symbol pairs: {0,1}, {2,3}, {9,10} and {12,13}, or when the eNB maps the CSI-RS and/or the IMR onto the following OFDM symbol pairs: {0,1}, {2,3}, {5,6}, {7,8}, {9,10} and {12,13},
the eNB maps the CSI-RS and/or the IMR onto one or two or four subcarriers in subcarriers {2,3,4,5,8,9,10,11} of the OFDM symbol pair {0,1};
or,
the eNB maps the CSI-RS and/or the IMR onto one or two or four subcarriers in subcarriers {0,1,4,5,6,7,10,11} of the OFDM symbol pair {0,1};
or,
the eNB maps the CSI-RS and/or the IMR onto one or two or four subcarriers in subcarriers {0,1,2,3,6,7,8,9} of the OFDM symbol pair {0,1};
or,
the eNB maps the CSI-RS and/or the IMR onto one or two or four subcarriers in subcarriers {0,1,2,3,4,5,6,7,8,9,10,11} of the OFDM symbol pair {2,3};
or,
the eNB maps the CSI-RS and/or the IMR onto one or two or four subcarriers in subcarriers {0,1,2,3,4,5,6,7,8,9,10,11} of the OFDM symbol pair {5,6};
or,
the eNB maps the CSI-RS and/or the IMR onto one or two or four subcarriers in subcarriers {2,3,4,5,8,9,10,11} of the OFDM symbol pair {7,8};
or,
the eNB maps the CSI-RS and/or the IMR onto one or two or four subcarriers in subcarriers {0,1,4,5,6,7,10,11} of the OFDM symbol pair {7,8};
or,
the eNB maps the CSI-RS and/or the IMR onto one or two or four subcarriers in subcarriers {0,1,2,3,6,7,8,9} of the OFDM symbol pair {7,8};
or,
the eNB maps the CSI-RS and/or the IMR onto one or two or four subcarriers in subcarriers {0,1,2,3,4,5,6,7,8,9,10,11} of the OFDM symbol pair {9,10};
or,
the eNB maps the CSI-RS and/or the IMR onto one or two or four subcarriers in subcarriers {2,3,8,9} of the OFDM symbol pair {12,13},
wherein all the OFDM symbol pairs and all the subcarriers corresponding to the OFDM symbol pairs form a candidate resource set for mapping the CSI-RS by the eNB.

5. The method according to claim 1, wherein when the eNB maps the CSI-RS and/or the IMR onto one of the following OFDM symbol pairs: {1,2}, {9,10} and {12,13}, or when the eNB maps the CSI-RS and/or the IMR onto the following OFDM symbol pairs: {1,2}, {4,5}, {7,8}, {9,10} and {12,13},
the eNB maps the CSI-RS and/or the IMR onto one or two or four subcarriers in subcarriers {2,3,8,9} of the OFDM symbol pair {1,2};
or,
the eNB maps the CSI-RS and/or the IMR onto one or two or four subcarriers in subcarriers {0,1,4,5,6,7,10,11} of the OFDM symbol pair {4,5};
or,
the eNB maps the CSI-RS and/or the IMR onto one or two or four subcarriers in subcarriers {2,3,4,5,8,9,10,11} of the OFDM symbol pair {7,8};
or,
the eNB maps the CSI-RS and/or the IMR onto one or two or four subcarriers in subcarriers {0,1,2,3,4,5,6,7,8,9,10,11} of the OFDM symbol pair {9,10};
or,
the eNB maps the CSI-RS and/or the IMR onto one or two or four subcarriers in subcarriers {2,3,8,9} of the OFDM symbol pair {12,13},
wherein all the OFDM symbol pairs and all the subcarriers corresponding to the OFDM symbol pairs form a candidate resource set for mapping the CSI-RS by the eNB.

6. The method according to claim 1, wherein when the eNB maps the CSI-RS and/or the IMR onto one of the following OFDM symbol pairs: {1,2} and {10,11}, or when the eNB maps the CSI-RS and/or the IMR onto the following OFDM symbol pairs: {1,2}, {4,5}, {7,8} and {10,11},
the eNB maps the CSI-RS and/or the IMR onto one or two or four subcarriers in subcarriers {0,1,2,3,4,5,6,7,8,9,10,11} of the OFDM symbol pair {1,2};
or,
the eNB maps the CSI-RS and/or the IMR onto one or two or four subcarriers in subcarriers {0,1,2,3,4,5,6,7,8,9,10,11} of the OFDM symbol pair {4,5};
or,
the eNB maps the CSI-RS and/or the IMR onto one or two or four subcarriers in subcarriers {0,1,2,3,4,5,6,7,8,9,10,11} of the OFDM symbol pair {7,8};
or,
the eNB maps the CSI-RS and/or the IMR onto one or two or four subcarriers in subcarriers {0,1,3,4,6,7,9,10} of the OFDM symbol pair {10,11},
wherein all the OFDM symbol pairs and all the subcarriers corresponding to the OFDM symbol pairs form a candidate resource set for mapping the CSI-RS by the eNB.

7. The method according to claim 1, wherein when the eNB maps the CSI-RS and/or the IMR onto one of the following OFDM symbol pairs: {1,3}, {9,10} and {12,13}, or when the eNB maps the CSI-RS and/or the IMR onto the following OFDM symbol pairs: {1,3}, {5,6}, {7,8}, {9,10} and {12,13},
the eNB maps the CSI-RS and/or the IMR onto one or two or four subcarriers in subcarriers {2,3,8,9} of the OFDM symbol pair {1,3};

or,
the eNB maps the CSI-RS and/or the IMR onto one or two or four subcarriers in subcarriers {0,1,2,3,4,5,6,7,8,9,10,11} of the OFDM symbol pair {5,6};
or,
the eNB maps the CSI-RS and/or the IMR onto one or two or four subcarriers in subcarriers {2,3,4,5,8,9,10,11} of the OFDM symbol pair {7,8};
or,
the eNB maps the CSI-RS and/or the IMR onto one or two or four subcarriers in subcarriers {0,1,2,3,4,5,6,7,8,9,10,11} of the OFDM symbol pair {9,10};
or,
the eNB maps the CSI-RS and/or the IMR onto one or two or four subcarriers in subcarriers {2,3,8,9} of the OFDM symbol pair {12,13},
wherein all the OFDM symbol pairs and all the subcarriers corresponding to the OFDM symbol pairs form a candidate resource set for mapping the CSI-RS by the eNB.

8. The method according to claim 1, wherein when the eNB maps the CSI-RS and/or the IMR onto one of the following OFDM symbol pairs: {1,3}, {8,9} and {12,13}, or when the eNB maps the CSI-RS and/or the IMR onto the following OFDM symbol pairs: {1,3}, {5,6}, {8,9} and {12,13},
the eNB maps the CSI-RS and/or the IMR onto one or two or four subcarriers in subcarriers {2,3,8,9} of the OFDM symbol pair {1,3};
or,
the eNB maps the CSI-RS and/or the IMR onto one or two or four subcarriers in subcarriers {0,1,2,3,4,5,6,7,8,9,10,11} of the OFDM symbol pair {5,6};
or,
the eNB maps the CSI-RS and/or the IMR onto one or two or four subcarriers in subcarriers {0,1,2,3,4,5,6,7,8,9,10,11} of the OFDM symbol pair {8,9};
or,
the eNB maps the CSI-RS and/or the IMR onto one or two or four subcarriers in subcarriers {2,3,8,9} of the OFDM symbol pair {12,13},
wherein all the OFDM symbol pairs and all the subcarriers corresponding to the OFDM symbol pairs form a candidate resource set for mapping the CSI-RS by the eNB.

9. The method according to claim 1, wherein when the eNB maps the CSI-RS and/or the IMR onto one of the following OFDM symbol pairs: {1,3}, {8,9} and {10,12}, or when the eNB maps the CSI-RS and/or the IMR onto the following OFDM symbol pairs: {1,3}, {5,6}, {8,9} and {10,12},
the eNB maps the CSI-RS and/or the IMR onto one or two or four subcarriers in subcarriers {2,3,8,9} of the OFDM symbol pair {1,3};
or,
the eNB maps the CSI-RS and/or the IMR onto one or two or four subcarriers in subcarriers {0,1,2,3,4,5,6,7,8,9,10,11} of the OFDM symbol pair {5,6};
or,
the eNB maps the CSI-RS and/or the IMR onto one or two or four subcarriers in subcarriers {0,1,2,3,4,5,6,7,8,9,10,11} of the OFDM symbol pair {8,9};
or,
the eNB maps the CSI-RS and/or the IMR onto one or two or four subcarriers in subcarriers {2,3,8,9} of the OFDM symbol pair {10,12},
wherein all the OFDM symbol pairs and all the subcarriers corresponding to the OFDM symbol pairs form a candidate resource set for mapping the CSI-RS by the eNB.

10. A resource receiving method, comprising:
receiving, by a terminal, a Channel State Information Reference Signal (CSI-RS), wherein the CSI-RS is mapped onto multiple resource elements by an evolved NodeB (eNB) in a manner of frequency division multiplexing and/or time division multiplexing and/or code division multiplexing; and/or
receiving, by the terminal, an Interference Measure Resource (IMR), wherein the IMR is mapped onto multiple resource elements by the eNB in a manner of frequency division multiplexing and/or time division multiplexing;
wherein
when the terminal detects that a type of a Cyclic Prefix (CP) of a sub-frame is a normal CP, the terminal receives the CSI-RS and/or the IMR on one of the following Orthogonal Frequency Division Multiplexing (OFDM) symbol pairs:
{0,1}, {9,10} and {12,13};
or,
when the terminal detects that a type of a Cyclic Prefix (CP) of a sub-frame is a normal CP, the terminal receives the CSI-RS and/or the IMR on the following OFDM symbol pairs:
{0,1}, {3,4}, {5,6}, {7,8}, {9,10} and {12,13};
or,
when the terminal detects that a type of a CP of a sub-frame is a normal CP, the terminal receives the CSI-RS and/or the IMR on one of the following OFDM symbol pairs:
{1,2}, {9,10} and {12,13};
or,
when the terminal detects that a type of a CP of a sub-frame is a normal CP, the terminal receives the CSI-RS and/or the IMR on the following OFDM symbol pairs:
{1,2}, {5,6}, {9,10} and {12,13};
or,
when the terminal detects that a type of a CP of a sub-frame is a normal CP, the terminal receives the CSI-RS and/or the IMR on one of the following OFDM symbol pairs:
{0,1}, {9,10} and {12,13};
or,
when the terminal detects that a type of a CP of a sub-frame is a normal CP, the terminal receives the CSI-RS and/or the IMR on the following OFDM symbol pairs:
{0,1}, {2,3}, {5,6}, {7,8}, {9,10} and {12,13};
or,
when the terminal detects that a type of a CP of a sub-frame is a normal CP, the terminal receives the CSI-RS and/or the IMR on one of the following OFDM symbol pairs:
{1,2}, {9,10} and {12,13};
or,
when the terminal detects that a type of a CP of a sub-frame is a normal CP, the terminal receives the CSI-RS and/or the IMR on the following OFDM symbol pairs:
{1,2}, {4,5}, {7,8}, {9,10} and {12,13};

or,
when the terminal detects that a type of a CP of a sub-frame is an extended CP, the terminal receives the CSI-RS and/or the IMR on one of the following OFDM symbol pair:

{1,2};

or, when the terminal detects that a type of a CP of a sub-frame is an extended CP, the terminal receives the CSI-RS and/or the IMR on the following OFDM symbol pairs:

{1,2}, {4,5}, {7,8} and {10,11};

or, when the terminal detects that a type of a CP of a sub-frame is a normal CP, the terminal receives the CSI-RS and/or the IMR on one of the following OFDM symbol pairs:

{1,3}, {9,10} and {12,13};

or, when the terminal detects that a type of a CP of a sub-frame is a normal CP, the terminal receives the CSI-RS and/or the IMR on the following OFDM symbol pairs:

{1,3}, {5,6}, {7,8}, {9,10} and {12,13};

or, when the terminal detects that a type of a CP of a sub-frame is a normal CP, the terminal receives the CSI-RS and/or the IMR on one of the following OFDM symbol pairs:

{1,3}, {8,9} and {12,13};

or, when the terminal detects that a type of a CP of a sub-frame is a normal CP, the terminal receives the CSI-RS and/or the IMR on the following OFDM symbol pairs:

{1,3}, {5,6}, {8,9} and {12,13};

or, when the terminal detects that a type of a CP of a sub-frame is a normal CP, the terminal receives the CSI-RS and/or the IMR on one of the following OFDM symbol pairs:

{1,3}, {8,9} and {10,12};

or, when the terminal detects that a type of a CP of a sub-frame is a normal CP, the terminal receives the CSI-RS and/or the IMR on the following OFDM symbol pairs:

{1,3}, {5,6}, {8,9} and {10,12};

or, when the terminal detects that a type of a CP of a sub-frame is a normal CP, the terminal receives the CSI-RS and/or the IMR on the following OFDM symbol pairs:

{2,3}, {5,6}, {7,8}, {9,10} and {12,13};

or, when the terminal detects that a type of a CP of a sub-frame is a normal CP, the terminal receives the CSI-RS and/or the IMR on the following OFDM symbol pairs:

{2,3}, {5,6}, {9,10} and {12,13}.

11. The method according to claim 10, wherein when the terminal receives the CSI-RS and/or the IMR on one of the following Orthogonal Frequency Division Multiplexing (OFDM) symbol pairs: {0,1}, {3,4}, {9,10} and {12,13}, or when the terminal receives the CSI-RS and/or the IMR on the following OFDM symbol pairs: {0,1}, {3,4}, {5,6}, {7,8}, {9,10} and {12,13}, the terminal receives the CSI-RS and/or the IMR on one or two or four subcarriers in subcarriers {0,1,2,3,4,5,6,7,8,9,10,11} of the OFDM symbol pair {0,1};

or, the terminal receives the CSI-RS and/or the IMR on one or two or four subcarriers in subcarriers {0,1,2,3,4,5,6,7,8,9,10,11} of the OFDM symbol pair {3,4};

or, the terminal receives the CSI-RS and/or the IMR on one or two or four subcarriers in subcarriers {0,1,2,3,4,5,6,7,8,9,10,11} of the OFDM symbol pair {7,8};

or, the terminal receives the CSI-RS and/or the IMR on one or two or four subcarriers in subcarriers {0,1,2,3,4,5,6,7,8,9,10,11} of the OFDM symbol pair {9,10};

or, the terminal receives the CSI-RS and/or the IMR on one or two or four subcarriers in subcarriers {2,3,4,7,8,9} of the OFDM symbol pair {5,6};

the terminal receives the CSI-RS and/or the IMR on one or two or four subcarriers in subcarriers {2,3,4,7,8,9} of the OFDM symbol pair {12,13}, wherein all the OFDM symbol pairs and all the subcarriers corresponding to the OFDM symbol pairs form a candidate resource set used for receiving the CSI-RS by the terminal.

12. The method according to claim 10, wherein when the terminal receives the CSI-RS and/or the IMR on one of the following OFDM symbol pairs: {1,2}, {9,10} and {12,13}, or when the terminal receives the CSI-RS and/or the IMR on the following OFDM symbol pairs: {1,2}, {5,6}, {9,10} and {12,13}, the terminal receives the CSI-RS and/or the IMR on one or two or four subcarriers in subcarriers {0,1,2,3,4,5,6,7,8,9,10,11} of the OFDM symbol pair {1,2};

or, the terminal receives the CSI-RS and/or the IMR on one or two or four subcarriers in subcarriers {0,1,2,3,4,5,6,7,8,9,10,11} of the OFDM symbol pair {5,6};

or, the terminal receives the CSI-RS and/or the IMR on one or two or four subcarriers in subcarriers {0,1,2,3,4,5,6,7,8,9,10,11} of the OFDM symbol pair {9,10};

or, the terminal receives the CSI-RS and/or the IMR on one or two or four subcarriers in subcarriers {2,3,8,9} of the OFDM symbol pair {12,13}, wherein all the OFDM symbol pairs and all the subcarriers corresponding to the OFDM symbol pairs form a candidate resource set used for receiving the CSI-RS by the terminal.

13. The method according to claim 10, wherein when the terminal receives the CSI-RS and/or the IMR on one of the following OFDM symbol pairs: {0,1}, {2,3}, {9,10} and {12,13}, or when the terminal receives the CSI-RS and/or the IMR on the following OFDM symbol pairs: {0,1}, {2,3}, {5,6}, {7,8}, {9,10} and {12,13}, the terminal receives the CSI-RS and/or the IMR on one or two or four subcarriers in subcarriers {2,3,4,5,8,9,10,11} of the OFDM symbol pair {0,1};

or, the terminal receives the CSI-RS and/or the IMR on one or two or four subcarriers in subcarriers {0,1,4,5,6,7,10,11} of the OFDM symbol pair {0,1};

or,
the terminal receives the CSI-RS and/or the IMR on one or two or four subcarriers in subcarriers {0,1,2,3,6,7,8,9} of the OFDM symbol pair {0,1};
or,
the terminal receives the CSI-RS and/or the IMR on one or two or four subcarriers in subcarriers {0,1,2,3,4,5,6,7,8,9,10,11} of the OFDM symbol pair {2,3};
or,
the terminal receives the CSI-RS and/or the IMR on one or two or four subcarriers in subcarriers {0,1,2,3,4,5,6,7,8,9,10,11} of the OFDM symbol pair {5,6};
or,
the terminal receives the CSI-RS and/or the IMR on one or two or four subcarriers in subcarriers {2,3,4,5,8,9,10,11} of the OFDM symbol pair {7,8};
or,
the terminal receives the CSI-RS and/or the IMR on one or two or four subcarriers in subcarriers {0,1,4,5,6,7,10,11} of the OFDM symbol pair {7,8};
or,
the terminal receives the CSI-RS and/or the IMR on one or two or four subcarriers in subcarriers {0,1,2,3,6,7,8,9} of the OFDM symbol pair {7,8};
or,
the terminal receives the CSI-RS and/or the IMR on one or two or four subcarriers in subcarriers {0,1,2,3,4,5,6,7,8,9,10,11} of the OFDM symbol pair {9,10};
or,
the terminal receives the CSI-RS and/or the IMR on one or two or four subcarriers in subcarriers {2,3,8,9} of the OFDM symbol pair {12,13},
wherein all the OFDM symbol pairs and all the subcarriers corresponding to the OFDM symbol pairs form a candidate resource set used for receiving the CSI-RS by the terminal.

14. The method according to claim 10, wherein when the terminal receives the CSI-RS and/or the IMR on one of the following OFDM symbol pairs: {1,2}, {9,10} and {12,13}, or when the terminal receives the CSI-RS and/or the IMR on the following OFDM symbol pairs: {1,2}, {4,5}, {7,8}, {9,10} and {12,13},
the terminal receives the CSI-RS and/or the IMR on one or two or four subcarriers in subcarriers {2,3,8,9} of the OFDM symbol pair {1,2};
or,
the terminal receives the CSI-RS and/or the IMR on one or two or four subcarriers in subcarriers {0,1,4,5,6,7,10,11} of the OFDM symbol pair {4,5};
or,
the terminal receives the CSI-RS and/or the IMR on one or two or four subcarriers in subcarriers {2,3,4,5,8,9,10,11} of the OFDM symbol pair {7,8};
or,
the terminal receives the CSI-RS and/or the IMR on one or two or four subcarriers in subcarriers {0,1,2,3,4,5,6,7,8,9,10,11} of the OFDM symbol pair {9,10};
or,
the terminal receives the CSI-RS and/or the IMR on one or two or four subcarriers in subcarriers {2,3,8,9} of the OFDM symbol pair {12,13},
wherein all the OFDM symbol pairs and all the subcarriers corresponding to the OFDM symbol pairs form a candidate resource set used for receiving the CSI-RS by the terminal.

15. The method according to claim 10, wherein when the terminal receives the CSI-RS and/or the IMR on one of the following OFDM symbol pairs: {1,2} and {10,11}, or when the terminal receives the CSI-RS and/or the IMR on the following OFDM symbol pairs: {1,2}, {4,5}, {7,8} and {10,11},
the terminal receives the CSI-RS and/or the IMR on one or two or four subcarriers in subcarriers {0,1,2,3,4,5,6,7,8,9,10,11} of the OFDM symbol pair {1,2};
or,
the terminal receives the CSI-RS and/or the IMR on one or two or four subcarriers in subcarriers {0,1,2,3,4,5,6,7,8,9,10,11} of the OFDM symbol pair {4,5};
or,
the terminal receives the CSI-RS and/or the IMR on one or two or four subcarriers in subcarriers {0,1,2,3,4,5,6,7,8,9,10,11} of the OFDM symbol pair {7,8};
or,
the terminal receives the CSI-RS and/or the IMR on one or two or four subcarriers in subcarriers {0,1,3,4,6,7,9,10} of the OFDM symbol pair {10,11},
wherein all the OFDM symbol pairs and all the subcarriers corresponding to the OFDM symbol pairs form a candidate resource set used for receiving the CSI-RS by the terminal.

16. The method according to claim 10, wherein when the terminal receives the CSI-RS and/or the IMR on one of the following OFDM symbol pairs: {1,3}, {9,10} and {12,13}, or when the terminal receives the CSI-RS and/or the IMR on the following OFDM symbol pairs: {1,3}, {5,6}, {7,8}, {9,10} and {12,13},
the terminal receives the CSI-RS and/or the IMR on one or two or four subcarriers in subcarriers {2,3,8,9} of the OFDM symbol pair {1,3};
or,
the terminal receives the CSI-RS and/or the IMR on one or two or four subcarriers in subcarriers {0,1,2,3,4,5,6,7,8,9,10,11} of the OFDM symbol pair {5,6};
or,
the terminal receives the CSI-RS and/or the IMR on one or two or four subcarriers in subcarriers {2,3,4,5,8,9,10,11} of the OFDM symbol pair {7,8};
or,
the terminal receives the CSI-RS and/or the IMR on one or two or four subcarriers in subcarriers {0,1,2,3,4,5,6,7,8,9,10,11} of the OFDM symbol pair {9,10};
or,
the terminal receives the CSI-RS and/or the IMR on one or two or four subcarriers in subcarriers {2,3,8,9} of the OFDM symbol pair {12,13},
wherein all the OFDM symbol pairs and all the subcarriers corresponding to the OFDM symbol pairs form a candidate resource set used for receiving the CSI-RS by the terminal.

17. The method according to claim 10, wherein when the terminal receives the CSI-RS and/or the IMR on one of the following OFDM symbol pairs: {1,3}, {8,9} and {12,13}, or when the terminal receives the CSI-RS and/or the IMR on the following OFDM symbol pairs: {1,3}, {5,6}, {8,9} and {12,13},
the terminal receives the CSI-RS and/or the IMR on one or two or four subcarriers in subcarriers {2,3,8,9} of the OFDM symbol pair {1,3};
or,
the terminal receives the CSI-RS and/or the IMR on one or two or four subcarriers in subcarriers {0,1,2,3,4,5,6,7,8,9,10,11} of the OFDM symbol pair {5,6};

or,
the terminal receives the CSI-RS and/or the IMR on one or two or four subcarriers in subcarriers {0,1,2,3,4,5,6,7,8,9,10,11} of the OFDM symbol pair {8,9};
or,
the terminal receives the CSI-RS and/or the IMR on one or two or four subcarriers in subcarriers {2,3,8,9} of the OFDM symbol pair {12,13},
wherein all the OFDM symbol pairs and all the subcarriers corresponding to the OFDM symbol pairs form a candidate resource set used for receiving the CSI-RS by the terminal.

18. The method according to claim 10, wherein when the terminal receives the CSI-RS and/or the IMR on one of the following OFDM symbol pairs: {1,3}, {8,9} and {10,12}, or when the terminal receives the CSI-RS and/or the IMR on the following OFDM symbol pairs: {1,3}, {5,6}, {8,9} and {10,12},
the terminal receives the CSI-RS and/or the IMR on one or two or four subcarriers in subcarriers {2,3,8,9} of the OFDM symbol pair {1,3};
or,
the terminal receives the CSI-RS and/or the IMR on one or two or four subcarriers in subcarriers {0,1,2,3,4,5,6,7,8,9,10,11} of the OFDM symbol pair {5,6};
or,
the terminal receives the CSI-RS and/or the IMR on one or two or four subcarriers in subcarriers {0,1,2,3,4,5,6,7,8,9,10,11} of the OFDM symbol pair {8,9};
or,
the terminal receives the CSI-RS and/or the IMR on one or two or four subcarriers in subcarriers {2,3,8,9} of the OFDM symbol pair {10,12},
wherein all the OFDM symbol pairs and all the subcarriers corresponding to the OFDM symbol pairs form a candidate resource set used for receiving the CSI-RS by the terminal.

19. A resource mapping device, located in an evolved NodeB (eNB) and comprising:
a mapping component, configured to map a Channel State Information Reference Signal (CSI-RS) onto multiple resource elements in a manner of frequency division multiplexing and/or time division multiplexing and/or code division multiplexing, and/or map an Interference Measure Resource (IMR) onto multiple resource elements in a manner of frequency division multiplexing and/or time division multiplexing;
wherein
when a type of a Cyclic Prefix (CP) of a sub-frame is a normal CP, the mapping component maps the CSI-RS and/or the IMR onto one of the following Orthogonal Frequency Division Multiplexing (OFDM) symbol pairs:
{0,1}, {9,10} and {12,13};
or,
when a type of a Cyclic Prefix (CP) of a sub-frame is a normal CP, the mapping component maps the CSI-RS and/or the IMR onto the following Orthogonal Frequency Division Multiplexing (OFDM) symbol pairs:
{0,1}, {3,4}, {5,6}, {7,8}, {9,10} and {12,13};
or,
when a type of a CP of a sub-frame is a normal CP, the mapping component maps the CSI-RS and/or the IMR onto one of the following OFDM symbol pairs:
{1,2}, {9,10} and {12,13};
or,
when a type of a CP of a sub-frame is a normal CP, the mapping component maps the CSI-RS and/or the IMR onto the following OFDM symbol pairs:
{1,2}, {5,6}, {9,10} and {12,13};
or,
when a type of a CP of a sub-frame is a normal CP, the mapping component maps the CSI-RS and/or the IMR onto one of the following OFDM symbol pairs:
{0,1}, {9,10} and {12,13};
or,
when a type of a CP of a sub-frame is a normal CP, the mapping component maps the CSI-RS and/or the IMR onto the following OFDM symbol pairs:
{0,1}, {2,3}, {5,6}, {7,8}, {9,10} and {12,13};
or,
when a type of a CP of a sub-frame is a normal CP, the mapping component maps the CSI-RS and/or the IMR onto one of the following OFDM symbol pairs:
{1,2}, {9,10} and {12,13};
or,
when a type of a CP of a sub-frame is a normal CP, the mapping component maps the CSI-RS and/or the IMR onto the following OFDM symbol pairs:
{1,2}, {4,5}, {7,8}, {9,10} and {12,13};
or,
when a type of a CP of a sub-frame is an extended CP, the mapping component maps the CSI-RS and/or the IMR onto the following OFDM symbol pair:
{1,2};
or,
when a type of a CP of a sub-frame is an extended CP, the mapping component maps the CSI-RS and/or the IMR onto the following OFDM symbol pairs:
{1,2}, {4,5}, {7,8} and {10,11};
or,
when a type of a CP of a sub-frame is a normal CP, the mapping component maps the CSI-RS and/or the IMR onto one of the following OFDM symbol pairs:
{1,3}, {9,10} and {12,13};
or,
when a type of a CP of a sub-frame is a normal CP, the mapping component maps the CSI-RS and/or the IMR onto the following OFDM symbol pairs:
{1,3}, {5,6}, {7,8}, {9,10} and {12,13};
or,
when a type of a CP of a sub-frame is a normal CP, the mapping component maps the CSI-RS and/or the IMR onto one of the following OFDM symbol pairs:
{1,3}, {8,9} and {12,13};
or,
when a type of a CP of a sub-frame is a normal CP, the mapping component maps the CSI-RS and/or the IMR onto the following OFDM symbol pairs:
{1,3}, {5,6}, {8,9} and {12,13};
or,
when a type of a CP of a sub-frame is a normal CP, the mapping component maps the CSI-RS and/or the IMR onto one of the following OFDM symbol pairs:
{1,3}, {8,9} and {10,12};
or,
when a type of a CP of a sub-frame is a normal CP, the mapping component maps the CSI-RS and/or the IMR onto the following OFDM symbol pairs:
{1,3}, {5,6}, {8,9} and {10,12};

or,
when a type of a CP of a sub-frame is a normal CP, the mapping component maps the CSI-RS and/or the IMR onto the following OFDM symbol pairs:
{2,3}, {5,6}, {7,8}, {9,10} and {12,13};
or,
when a type of a CP of a sub-frame is a normal CP, the mapping component maps the CSI-RS and/or the IMR onto the following OFDM symbol pairs:
{2,3}, {5,6}, {9,10} and {12,13}.

20. A resource receiving device, located in a terminal and comprising:
a receiving component, configured to receive a Channel State Information Reference Signal (CSI-RS), wherein the CSI-RS is mapped onto multiple resource elements by an evolved NodeB (eNB) in a manner of frequency division multiplexing and/or time division multiplexing and/or code division multiplexing; and/or receive an Interference Measure Resource (IMR), wherein the IMR is mapped onto multiple resource elements by the eNB in a manner of frequency division multiplexing and/or time division multiplexing;
wherein,
when the terminal detects that a type of a Cyclic Prefix (CP) of a sub-frame is a normal CP, the receiving component receives the CSI-RS and/or the IMR on one of the following Orthogonal Frequency Division Multiplexing (OFDM) symbol pairs:
{0,1}, {9,10} and {12,13};
or,
when the terminal detects that a type of a Cyclic Prefix (CP) of a sub-frame is a normal CP, the receiving component receives the CSI-RS and/or the IMR on the following OFDM symbol pairs:
{0,1}, {3,4}, {5,6}, {7,8}, {9,10} and {12,13};
or,
when the terminal detects that a type of a CP of a sub-frame is a normal CP, the receiving component receives the CSI-RS and/or the IMR on one of the following OFDM symbol pairs:
{1,2}, {9,10} and {12,13};
or,
when the terminal detects that a type of a CP of a sub-frame is a normal CP, the receiving component receives the CSI-RS and/or the IMR on the following OFDM symbol pairs:
{1,2}, {5,6}, {9,10} and {12,13};
or,
when the terminal detects that a type of a CP of a sub-frame is a normal CP, the receiving component receives the CSI-RS and/or the IMR on one of the following OFDM symbol pairs:
{0,1}, {9,10} and {12,13};
or,
when the terminal detects that a type of a CP of a sub-frame is a normal CP, the receiving component receives the CSI-RS and/or the IMR on the following OFDM symbol pairs:
{0,1}, {2,3}, {5,6}, {7,8}, {9,10} and {12,13};
or,
when the terminal detects that a type of a CP of a sub-frame is a normal CP, the receiving component receives the CSI-RS and/or the IMR on one of the following OFDM symbol pairs:
{1,2}, {9,10} and {12,13};
or,
when the terminal detects that a type of a CP of a sub-frame is a normal CP, the receiving component receives the CSI-RS and/or the IMR on the following OFDM symbol pairs:
{1,2}, {4,5}, {7,8}, {9,10} and {12,13};
or,
when the terminal detects that a type of a CP of a sub-frame is an extended CP, the receiving component receives the CSI-RS and/or the IMR on one of the following OFDM symbol pair:
{1,2};
or,
when the terminal detects that a type of a CP of a sub-frame is an extended CP, the receiving component receives the CSI-RS and/or the IMR on the following OFDM symbol pairs:
{1,2}, {4,5}, {7,8} and {10,11};
or,
when the terminal detects that a type of a CP of a sub-frame is a normal CP, the receiving component receives the CSI-RS and/or the IMR on one of the following OFDM symbol pairs:
{1,3}, {9,10} and {12,13};
or,
when the terminal detects that a type of a CP of a sub-frame is a normal CP, the receiving component receives the CSI-RS and/or the IMR on the following OFDM symbol pairs:
{1,3}, {5,6}, {7,8}, {9,10} and {12,13};
or,
when the terminal detects that a type of a CP of a sub-frame is a normal CP, the receiving component receives the CSI-RS and/or the IMR on one of the following OFDM symbol pairs:
{1,3}, {8,9} and {12,13};
or,
when the terminal detects that a type of a CP of a sub-frame is a normal CP, the receiving component receives the CSI-RS and/or the IMR on the following OFDM symbol pairs:
{1,3}, {5,6}, {8,9} and {12,13};
or,
when the terminal detects that a type of a CP of a sub-frame is a normal CP, the receiving component receives the CSI-RS and/or the IMR on one of the following OFDM symbol pairs:
{1,3}, {8,9} and {10,12};
or,
when the terminal detects that a type of a CP of a sub-frame is a normal CP, the receiving component receives the CSI-RS and/or the IMR on the following OFDM symbol pairs:
{1,3}, {5,6}, {8,9} and {10,12};
or,
when the terminal detects that a type of a CP of a sub-frame is a normal CP, the receiving component receives the CSI-RS and/or the IMR on the following OFDM symbol pairs:
{2,3}, {5,6}, {7,8}, {9,10} and {12,13};
or,
when the terminal detects that a type of a CP of a sub-frame is a normal CP, the receiving component receives the CSI-RS and/or the IMR on the following OFDM symbol pairs:
{2,3}, {5,6}, {9,10} and {12,13}.

21. A signalling notification method, comprising:
notifying, by an evolved NodeB (eNB), a time-domain location or frequency-domain location of a Channel State Information Reference Signal (CSI-RS) and/or an Interference Measure Resource (IMR) to a terminal through high-layer signalling, and/or a Primary Synchronization Signal/Secondary Synchronization Signal (PSS/SSS) and/or a Physical Broadcast Channel (PBCH),
wherein a pattern and a resource location of the CRI-RS are a pattern and a resource location of the CRI-RS according to claim 1; and
the CSI-RS is used for executing one of the following measurements: channel measurement, Reference Signal Received Power (RSRP) measurement, Reference Signal Received Quality (RSRQ) measurement, Received Signal Strength Indicator (RSSI) measurement and Radio Link Management (RLM) measurement.

22. The method according to claim 21, wherein when the eNB notifies the time-domain location or frequency-domain location of the CSI-RS to the terminal through the high-layer signalling,
a signalling content of the high-layer signalling comprises at least one of: the number of antenna ports, a time-frequency resource location of a CSI-RS in each resource element block in each CSI-RS sub-frame, a cycle and sub-frame offset, and a power compensation factor of the CSI-RS,
wherein the time-frequency resource location comprises: an Orthogonal Frequency Division Multiplexing (OFDM) index and a subcarrier index; and
the number of the antenna ports comprises at least one of: 1, 2, 4, 8, 16, 32, 64 and 128.

23. The method according to claim 21, wherein when the eNB notifies the time-domain location or frequency-domain location of the IMR to the terminal through the high-layer signalling,
a signalling content of the high-layer signalling comprises: a bitmap sequence and configurations about a cycle and a sub-frame offset,
wherein each bit in the bitmap sequence represents a location of a time-frequency resource pair of the CSI-RS in each resource element block, and the length of the bitmap sequence represents a maximum number of CSI-RS resource pairs which are able to be borne by each CSI-RS resource element block.

24. The method according to claim 21, wherein when the eNB notifies the time-domain location or frequency-domain location of the IMR to the terminal through the high-layer signalling,
a signalling content of the high-layer signalling comprises: a bitmap sequence and configurations about a cycle and a sub-frame offset,
wherein each bit in the bitmap sequence represents a location of a four-port CSI-RS time-frequency resource pair in each resource element block, and the length of the bitmap sequence represents a maximum number of four-port CSI-RS resource pairs which are able to be borne by each CSI-RS resource element block.

25. The method according to claim 24, wherein the length of the bitmap sequence is one of the followings:
60 bits, 56 bits, 32 bits, 48 bits, 40 bits, 30 bits, 28 bits, 16 bits, 24 bits and 20 bits.

26. The method according to claim 21, wherein in a procedure of notifying, by the eNB, the time-domain location or frequency-domain location of the CSI-RS to the terminal through the high-layer signalling, and/or the PSS/SSS and/or the PBCH, the method further comprises:
notifying, by the eNB, information about at least one of 504 configurations of the CSI-RS to the terminal through the PSS/SSS, wherein the information about each configuration comprises at least one of the following information:
the number of antenna ports of the CSI-RS, a time-frequency resource location of the CSI-RS in each resource element block in each CSI-RS sub-frame, and a cycle and sub-frame offset of the CSI-RS sub-frame.

27. The method according to claim 21, wherein in a procedure of notifying, by the eNB, the time-domain location or frequency-domain location of the CSI-RS to the terminal through the high-layer signalling, and/or the PSS/SSS and/or the PBCH, the method further comprises:
notifying, by the eNB, configuration information of the CSI-RS to the terminal through the PBCH, wherein the configuration information comprises at least one of the following information:
the number of antenna ports of the CSI-RS, a time-frequency resource location of the CSI-RS in each resource element block in each CSI-RS sub-frame, and a cycle and sub-frame offset of the CSI-RS sub-frame.

28. The method according to claim 21, wherein
the eNB maps the CSI-RS or the IMR on a full bandwidth;
or,
the eNB maps the CSI-RS or the IMR on a part of the bandwidth, wherein a frequency-domain width and/or frequency-domain location of the part of the bandwidth is notified to the terminal through the high-layer signalling or physical-layer signalling or in a predetermined manner;
or,
the eNB maps the CSI-RS or the IMR on a part of Physical Resource Block (PRB) pairs on the full bandwidth, wherein the number and/or frequency-domain locations and/or frequency-domain intervals of the part of PRB pairs are notified to the terminal through the high-layer signalling or physical-layer signalling or in a predetermined manner.

29. A signalling acquisition method, comprising:
acquiring, by a terminal through high-layer signalling, and/or a Primary Synchronization Signal/Secondary Synchronization Signal (PSS/SSS) and/or a Physical Broadcast Channel (PBCH), a time-domain location or frequency-domain location of a Channel State Information Reference Signal (CSI-RS) and/or an Interference Measure Resource (IMR) sent by an evolved NodeB (eNB),
wherein a pattern and a resource location of the CRI-RS are a pattern and a resource location of the CRI-RS according to claim 10; and
the CSI-RS is used for executing one of the following measurements: channel measurement, Reference Signal Received Power (RSRP) measurement, Reference Signal Received Quality (RSRQ) measurement, Received Signal Strength Indicator (RSSI) measurement and Radio Link Management (RLM) measurement.

30. The method according to claim 29, wherein when the terminal acquires the time-domain location or frequency-domain location of the CSI-RS through the high-layer signalling,
a signalling content of the high-layer signalling comprises at least one of: the number of antenna ports, a time-frequency resource location of a CSI-RS in each resource element block in each CSI-RS sub-frame, a cycle and sub-frame offset, and a power compensation factor of the CSI-RS, wherein the time-frequency resource location comprises: an Orthogonal Frequency Division Multiplexing (OFDM) index and a subcarrier index; and the number of the antenna ports comprises at least one of: 1, 2, 4, 8, 16, 32, 64 and 128.

31. The method according to claim 29, wherein when the terminal acquires the time-domain location or frequency-domain location of the IMR through the high-layer signalling, a signalling content of the high-layer signalling comprises: a bitmap sequence and configurations about a cycle and a sub-frame offset, wherein each bit in the bitmap sequence represents a location of a time-frequency resource pair of the CSI-RS in each resource element block, and the length of the bitmap sequence represents a maximum number of CSI-RS resource pairs which are able to be borne by each CSI-RS resource element block.

32. The method according to claim 29, wherein when the terminal acquires the time-domain location or frequency-domain location of the IMR through the high-layer signalling, a signalling content of the high-layer signalling comprises: a bitmap sequence and configurations about a cycle and a sub-frame offset, wherein each bit in the bitmap sequence represents a location of a four-port CSI-RS time-frequency resource pair in each resource element block, and the length of the bitmap sequence represents a maximum number of four-port CSI-RS resource pairs which are able to be borne by each CSI-RS resource element block.

33. The method according to claim 32, wherein the length of the bitmap sequence is one of the followings:

60 bits, 56 bits, 32 bits, 48 bits, 40 bits, 30 bits, 28 bits, 16 bits, 24 bits and 20 bits.

34. The method according to claim 29, during a procedure of acquiring, by the terminal through the high-layer signalling, and/or the PSS/SSS and/or the PBCH, the time-domain location or frequency-domain location of the CSI-RS sent by the eNB, the method further comprises:

receiving, by the terminal through the PSS/SSS, information about at least one of 504 configurations of the CSI-RS sent by the eNB, wherein the information about each configuration comprises at least one of the following information:

the number of antenna ports of the CSI-RS, a time-frequency resource location of the CSI-RS in each resource element block in each CSI-RS sub-frame, and a cycle and sub-frame offset of the CSI-RS sub-frame.

35. The method according to claim 29, during a procedure of acquiring, by the terminal through the high-layer signalling, and/or the PSS/SSS and/or the PBCH, the time-domain location or frequency-domain location of the CSI-RS sent by the eNB, further comprising:

receiving, by the terminal through the PBCH, configuration information of the CSI-RS sent by the eNB, wherein the configuration information comprises at least one of the following information:

the number of antenna ports of the CSI-RS, a time-frequency resource location of the CSI-RS in each resource element block in each CSI-RS sub-frame, and a cycle and sub-frame offset of the CSI-RS sub-frame.

36. The method according to claim 29, wherein the terminal receives the CSI-RS or the IMR on a full bandwidth;

or, the terminal receives the CSI-RS or the IMR on a part of the bandwidth, wherein a frequency-domain width and/or frequency-domain location of the part of the bandwidth is obtained through the high-layer signalling or physical-layer signalling or in a predetermined manner;

or, the terminal receives the CSI-RS or the IMR on a part of Physical Resource Block (PRB) pairs on the full bandwidth, wherein the number and/or frequency-domain locations and/or frequency-domain intervals of the part of PRB pairs are obtained through the high-layer signalling or physical-layer signalling or in a predetermined manner.

37. The method according to claim 1, wherein when the eNB maps the CSI-RS and/or the IMR onto the following OFDM symbol pairs: {2,3}, {5,6}, {7,8}, {9,10} and {12,13}, the eNB maps the CSI-RS and/or the IMR onto one or two or four subcarriers in subcarriers {0,1,2,3,4,5,6,7,8,9,10,11} of the OFDM symbol pair {2,3};

or, the eNB maps the CSI-RS and/or the IMR onto one or two or four subcarriers in subcarriers {0,1,2,3,4,5,6,7,8,9,10,11} of the OFDM symbol pair {5,6};

or, the eNB maps the CSI-RS and/or the IMR onto one or two or four subcarriers in subcarriers {0,1,4,5,6,7,10,11} of the OFDM symbol pair {7,8};

or, the eNB maps the CSI-RS and/or the IMR onto one or two or four subcarriers in subcarriers {0,1,2,3,4,5,6,7,8,9,10,11} of the OFDM symbol pair {9,10}, or, the eNB maps the CSI-RS and/or the IMR onto one or two or four subcarriers in subcarriers {2,3,8,9} of the OFDM symbol pair {12,13}, wherein all the OFDM symbol pairs and all the subcarriers corresponding to the OFDM symbol pairs form a candidate resource set for mapping the CSI-RS by the eNB.

38. The method according to claim 1, wherein when the eNB maps the CSI-RS and/or the IMR onto the following OFDM symbol pairs: {2,3}, {5,6}, {9,10} and {12,13}, the eNB maps the CSI-RS and/or the IMR onto one or two or four subcarriers in subcarriers {0,1,2,3,4,5,6,7,8,9,10,11} or subcarriers {2,3,8,9} of the OFDM symbol pair {2,3};

or, the eNB maps the CSI-RS and/or the IMR onto one or two or four subcarriers in subcarriers {0,1,2,3,4,5,6,7,8,9,10,11} of the OFDM symbol pair {5,6};

or, the eNB maps the CSI-RS and/or the IMR onto one or two or four subcarriers in subcarriers {0,1,2,3,4,5,6,7,8,9,10,11} of the OFDM symbol pair {9,10}, or, the eNB maps the CSI-RS and/or the IMR onto one or two or four subcarriers in subcarriers {2,3,8,9} of the OFDM symbol pair {12,13}, wherein all the OFDM symbol pairs and all the subcarriers corresponding to the OFDM symbol pairs form a candidate resource set for mapping the CSI-RS by the eNB.

39. The method according to claim 10, wherein
when the terminal receives the CSI-RS and/or the IMR on the following OFDM symbol pairs: {2,3}, {5,6}, {7,8}, {9,10} and {12,13},
the terminal receives the CSI-RS and/or the IMR on one or two or four subcarriers in subcarriers {0,1,2,3,4,5, 6,7,8,9,10,11} of the OFDM symbol pair {2,3};
or,
the terminal receives the CSI-RS and/or the IMR on one or two or four subcarriers in subcarriers {0,1,2,3,4,5, 6,7,8,9,10,11} of the OFDM symbol pair {5,6};
or,
the terminal receives the CSI-RS and/or the IMR on one or two or four subcarriers in subcarriers {0,1,4,5,6,7, 10,11} of the OFDM symbol pair {7,8};
or,
the terminal receives the CSI-RS and/or the IMR on one or two or four subcarriers in subcarriers {0,1,2,3,4,5, 6,7,8,9,10,11} of the OFDM symbol pair {9,10},
or,
the terminal receives the CSI-RS and/or the IMR on one or two or four subcarriers in subcarriers {2,3,8,9} of the OFDM symbol pair {12,13},
wherein all the OFDM symbol pairs and all the subcarriers corresponding to the OFDM symbol pairs form a candidate resource set for mapping the CSI-RS by the eNB.

40. The method according to claim 1, wherein when the terminal receives the CSI-RS and/or the IMR on the following OFDM symbol pairs: {2,3}, {5,6}, {9,10} and {12,13},
the terminal receives the CSI-RS and/or the IMR on one or two or four subcarriers in subcarriers {0,1,2,3,4,5, 6,7,8,9,10,11} or subcarriers {2,3,8,9} of the OFDM symbol pair {2,3};
or,
the terminal receives the CSI-RS and/or the IMR on one or two or four subcarriers in subcarriers {0,1,2,3,4,5, 6,7,8,9,10,11} of the OFDM symbol pair {5,6};
or,
the terminal receives the CSI-RS and/or the IMR on one or two or four subcarriers in subcarriers {0,1,2,3,4,5, 6,7,8,9,10,11} of the OFDM symbol pair {9,10},
or,
the terminal receives the CSI-RS and/or the IMR on one or two or four subcarriers in subcarriers {2,3,8,9} of the OFDM symbol pair {12,13},
wherein all the OFDM symbol pairs and all the subcarriers corresponding to the OFDM symbol pairs form a candidate resource set for mapping the CSI-RS by the eNB.

41. A resource mapping method, comprising:
mapping, by an evolved NodeB (eNB), a Channel State Information Reference Signal (CSI-RS) onto multiple resource elements in a manner of frequency division multiplexing and/or time division multiplexing and/or code division multiplexing;
and/or mapping, by the eNB, an Interference Measure Resource (IMR) onto multiple resource elements in a manner of frequency division multiplexing and/or time division multiplexing;
wherein,
one resource element pair on the same subcarriers of one OFDM symbol pair is able to bear one CSI-RS port or multiplex two CSI-RS ports in a manner of Orthogonal Covering Code (OCC) code division;
when the number of borne CSI-RS ports is 1 or 2, the eNB selects one subcarrier from multiple optional subcarriers of one OFDM symbol pair to map the CSI-RS; when the number of the borne CSI-RS ports is 4, the eNB selects two subcarriers for bearing the CSI-RS from multiple optional subcarriers of one OFDM symbol pair in a manner as follows: one resource element pair on the Nth subcarrier of one OFDM symbol pair bears CSI-RS port {15,16}, and one resource element pair on the (N−6)th subcarrier of the OFDM symbol pair bears CSI-RS port {17,18}; and when the number of the borne ports is 8, the eNB selects four subcarriers for bearing the CSI-RS from multiple optional subcarriers of one OFDM symbol pair in a manner as follows: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}, wherein each resource element pair comprises two resource elements, and N is a value within a range from 0 to 11;
or,
one resource element pair on one subcarrier in the same subcarriers of one OFDM symbol pair is able to bear one CSI-RS port or multiplex two CSI-RS ports in a manner of OCC code division;
when the number of borne CSI-RS ports is 1 or 2, the eNB selects one subcarrier from multiple optional subcarriers of one OFDM symbol pair to map the CSI-RS; when the number of the borne CSI-RS ports is 4, the eNB selects two subcarriers for bearing the CSI-RS from multiple optional subcarriers of one OFDM symbol pair in a manner as follows: one resource element pair on the Nth subcarrier of one OFDM symbol pair bears CSI-RS port {15,16}, and one resource element pair on the (N−3)th subcarrier of the OFDM symbol pair bears CSI-RS port {17,18}; and when the number of the borne ports is 8, the eNB selects four subcarriers for bearing the CSI-RS from multiple optional subcarriers of one OFDM symbol pair in a manner as follows: one resource element pair on the Nth subcarrier of one OFDM symbol pair bears CSI-RS port {15,16}, one resource element pair on the (N−3)th subcarrier of the OFDM symbol pair bears CSI-RS port {17,18}, one resource element pair on the (N−6)th subcarrier of the OFDM symbol pair bears CSI-RS port {19,20}, and one resource element pair on the (N−9)th subcarrier of the OFDM symbol pair bears CSI-RS port {21,22}, wherein each resource element pair comprises two resource elements, and N is a value within a range from 0 to 11.

42. A resource receiving method, comprising:
receiving, by a terminal, a Channel State Information Reference Signal (CSI-RS), wherein the CSI-RS is mapped onto multiple resource elements by an evolved NodeB (eNB) in a manner of frequency division multiplexing and/or time division multiplexing and/or code division multiplexing; and/or
receiving, by the terminal, an Interference Measure Resource (IMR), wherein the IMR is mapped onto multiple resource elements by the eNB in a manner of frequency division multiplexing and/or time division multiplexing;

wherein,
one resource element pair on the same subcarriers of one OFDM symbol pair is able to bear one CSI-RS port or multiplex two CSI-RS ports in a manner of Orthogonal Covering Code (OCC) code division;
when the number of borne CSI-RS ports is 1 or 2, the terminal selects one subcarrier from multiple optional subcarriers of one OFDM symbol pair to receive the CSI-RS; when the number of the borne CSI-RS ports is 4, the terminal selects two subcarriers for receiving the CSI-RS from multiple optional subcarriers of one OFDM symbol pair in a manner as follows: one resource element pair on the Nth subcarrier of one OFDM symbol pair bears CSI-RS port {15,16}, and one resource element pair on the (N−6)th subcarrier of the OFDM symbol pair bears CSI-RS port {17,18}; and when the number of the borne ports is 8, the terminal selects four subcarriers for receiving the CSI-RS from multiple optional subcarriers of one OFDM symbol pair in a manner as follows: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}, wherein each resource element pair comprises two resource elements, and N is a value within a range from 0 to 11;

or,
one resource element pair on one subcarrier in the same subcarriers of one OFDM symbol pair is able to bear one CSI-RS port or multiplex two CSI-RS ports in a manner of OCC code division;
when the number of borne CSI-RS ports is 1 or 2, the terminal selects one subcarrier from multiple optional subcarriers of one OFDM symbol pair to receive the CSI-RS; when the number of the borne CSI-RS ports is 4, the terminal selects two subcarriers for receiving the CSI-RS from multiple optional subcarriers of one OFDM symbol pair in a manner as follows: one resource element pair on the Nth subcarrier of one OFDM symbol pair bears CSI-RS port {15,16}, and one resource element pair on the (N−3)th subcarrier of the OFDM symbol pair bears CSI-RS port {17,18}; and when the number of the borne ports is 8, the terminal selects four subcarriers for receiving the CSI-RS from multiple optional subcarriers of one OFDM symbol pair in a manner as follows: one resource element pair on the Nth subcarrier of one OFDM symbol pair bears CSI-RS port {15,16}, one resource element pair on the (N−3)th subcarrier of the OFDM symbol pair bears CSI-RS port {17,18}, one resource element pair on the (N−6)th subcarrier of the OFDM symbol pair bears CSI-RS port {19,20}, and one resource element pair on the (N−9)th subcarrier of the OFDM symbol pair bears CSI-RS port {21,22}, wherein each resource element pair comprises two resource elements, and N is a value within a range from 0 to 11.

43. A resource mapping device, located in an evolved NodeB (eNB) and comprising:
a mapping component, configured to map a Channel State Information Reference Signal (CSI-RS) onto multiple resource elements in a manner of frequency division multiplexing and/or time division multiplexing and/or code division multiplexing, and/or map an Interference Measure Resource (IMR) onto multiple resource elements in a manner of frequency division multiplexing and/or time division multiplexing;
wherein,
one resource element pair on the same subcarriers of one OFDM symbol pair is able to bear one CSI-RS port or multiplex two CSI-RS ports in a manner of Orthogonal Covering Code (OCC) code division;
when the number of borne CSI-RS ports is 1 or 2, the eNB selects one subcarrier from multiple optional subcarriers of one OFDM symbol pair to map the CSI-RS; when the number of the borne CSI-RS ports is 4, the eNB selects two subcarriers for bearing the CSI-RS from multiple optional subcarriers of one OFDM symbol pair in a manner as follows: one resource element pair on the Nth subcarrier of one OFDM symbol pair bears CSI-RS port {15,16}, and one resource element pair on the (N−6)th subcarrier of the OFDM symbol pair bears CSI-RS port {17,18}; and when the number of the borne ports is 8, the eNB selects four subcarriers for bearing the CSI-RS from multiple optional subcarriers of one OFDM symbol pair in a manner as follows: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}, wherein each resource element pair comprises two resource elements, and N is a value within a range from 0 to 11;

or,
one resource element pair on one subcarrier in the same subcarriers of one OFDM symbol pair is able to bear one CSI-RS port or multiplex two CSI-RS ports in a manner of OCC code division;
when the number of borne CSI-RS ports is 1 or 2, the eNB selects one subcarrier from multiple optional subcarriers of one OFDM symbol pair to map the CSI-RS; when the number of the borne CSI-RS ports is 4, the eNB selects two subcarriers for bearing the CSI-RS from multiple optional subcarriers of one OFDM symbol pair in a manner as follows: one resource element pair on the Nth subcarrier of one OFDM symbol pair bears CSI-RS port {15,16}, and one resource element pair on the (N−3)th subcarrier of the OFDM symbol pair bears CSI-RS port {17,18}; and when the number of the borne ports is 8, the eNB selects four subcarriers for bearing the CSI-RS from multiple optional subcarriers of one OFDM symbol pair in a manner as follows: one resource element pair on the Nth subcarrier of one OFDM symbol pair bears CSI-RS port {15,16}, one resource element pair on the (N−3)th subcarrier of the OFDM symbol pair bears CSI-RS port {17,18}, one resource element pair on the (N−6)th subcarrier of the OFDM symbol pair bears CSI-RS port {19,20}, and one resource element pair on the (N−9)th subcarrier of the OFDM symbol pair bears CSI-RS port {21,22}, wherein each resource element pair comprises two resource elements, and N is a value within a range from 0 to 11.

44. A resource receiving device, located in a terminal and comprising:
a receiving component, configured to receive a Channel State Information Reference Signal (CSI-RS), wherein the CSI-RS is mapped onto multiple resource elements by an evolved NodeB (eNB) in a manner of frequency division multiplexing and/or time division multiplexing and/or code division multiplexing; and/or receive an Interference Measure Resource (IMR), wherein the IMR is mapped onto multiple resource elements by the eNB in a manner of frequency division multiplexing and/or time division multiplexing;

wherein, one resource element pair on the same subcarriers of one OFDM symbol pair is able to bear one CSI-RS port or multiplex two CSI-RS ports in a manner of Orthogonal Covering Code (OCC) code division;

when the number of borne CSI-RS ports is 1 or 2, the terminal selects one subcarrier from multiple optional subcarriers of one OFDM symbol pair to receive the CSI-RS; when the number of the borne CSI-RS ports is 4, the terminal selects two subcarriers for receiving the CSI-RS from multiple optional subcarriers of one OFDM symbol pair in a manner as follows: one resource element pair on the Nth subcarrier of one OFDM symbol pair bears CSI-RS port {15,16}, and one resource element pair on the (N−6)th subcarrier of the OFDM symbol pair bears CSI-RS port {17,18}; and when the number of the borne ports is 8, the terminal selects four subcarriers for receiving the CSI-RS from multiple optional subcarriers of one OFDM symbol pair in a manner as follows: one resource element pair on the Nth subcarrier of one OFDM symbol pair bears CSI-RS port {15,16}, one resource element pair on the (N−6)th subcarrier of the OFDM symbol pair bears CSI-RS port {17,18}, one resource element pair on the (N−1)th subcarrier of the OFDM symbol pair bears CSI-RS port {19,20}, and one resource element pair on the (N−7)th subcarrier of the OFDM symbol pair bears CSI-RS port {21,22}, wherein each resource element pair comprises two resource elements, and N is a value within a range from 0 to 11;

or, one resource element pair on one subcarrier in the same subcarriers of one OFDM symbol pair is able to bear one CSI-RS port or multiplex two CSI-RS ports in a manner of OCC code division;

when the number of borne CSI-RS ports is 1 or 2, the terminal selects one subcarrier from multiple optional subcarriers of one OFDM symbol pair to receive the CSI-RS; when the number of the borne CSI-RS ports is 4, the terminal selects two subcarriers for receiving the CSI-RS from multiple optional subcarriers of one OFDM symbol pair in a manner as follows: one resource element pair on the Nth subcarrier of one OFDM symbol pair bears CSI-RS port {15,16}, and one resource element pair on the (N−3)th subcarrier of the OFDM symbol pair bears CSI-RS port {17,18}; and when the number of the borne ports is 8, the terminal selects four subcarriers for receiving the CSI-RS from multiple optional subcarriers of one OFDM symbol pair in a manner as follows: one resource element pair on the Nth subcarrier of one OFDM symbol pair bears CSI-RS port {15,16}, one resource element pair on the (N−3)th subcarrier of the OFDM symbol pair bears CSI-RS port {17,18}, one resource element pair on the (N−6)th subcarrier of the OFDM symbol pair bears CSI-RS port {19,20}, and one resource element pair on the (N−9)th subcarrier of the OFDM symbol pair bears CSI-RS port {21,22}, wherein each resource element pair comprises two resource elements, and N is a value within a range from 0 to 11.

* * * * *